United States Patent
Barday et al.

(10) Patent No.: US 10,565,236 B1
(45) Date of Patent: Feb. 18, 2020

(54) DATA PROCESSING SYSTEMS FOR GENERATING AND POPULATING A DATA INVENTORY

(71) Applicant: OneTrust, LLC, Atlanta, GA (US)

(72) Inventors: Kabir A. Barday, Atlanta, GA (US); Mihir S. Karanjkar, Marietta, GA (US); Steven W. Finch, Kennesaw, GA (US); Ken A. Browne, Johns Creek, GA (US); Nathan W. Heard, Marietta, GA (US); Aakash H. Patel, Norcross, GA (US); Jason L. Sabourin, Brookhaven, GA (US); Richard L. Daniel, Atlanta, GA (US); Dylan D. Patton-Kuhl, Atlanta, GA (US); Jonathan Blake Brannon, Smyrna, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 16/593,634

(22) Filed: Oct. 4, 2019

Related U.S. Application Data

(63) Continuation-in-part of application No. 16/404,439, filed on May 6, 2019, now Pat. No. 10,437,860, (Continued)

(51) Int. Cl.
*G06F 17/30* (2006.01)
*G06F 16/28* (2019.01)
(Continued)

(52) U.S. Cl.
CPC ............ *G06F 16/288* (2019.01); *G06F 15/76* (2013.01); *G06F 16/254* (2019.01);
(Continued)

(58) Field of Classification Search
CPC ...... G06F 16/288; G06F 16/254; G06F 15/76; G06F 17/248; G06F 21/552; G06N 20/00;
(Continued)

(56) References Cited

U.S. PATENT DOCUMENTS 5,193,162 A 3/1993 Bordsen et al.
5,276,735 A 1/1994 Boebert et al.
(Continued)

FOREIGN PATENT DOCUMENTS

EP 1394698 3/2004
EP 2031540 3/2009
(Continued)

OTHER PUBLICATIONS

International Search Report, dated Mar. 14, 2019, from corresponding International Application No. PCT/US2018/055736.
(Continued)

*Primary Examiner* — Jared M Bibbee
(74) *Attorney, Agent, or Firm* — Brient IP Law, LLC

(57) ABSTRACT

In particular embodiments, a data processing data inventory generation system is configured to: (1) generate a data model (e.g., a data inventory) for one or more data assets utilized by a particular organization; (2) generate a respective data inventory for each of the one or more data assets; and (3) map one or more relationships between one or more aspects of the data inventory, the one or more data assets, etc. within the data model. In particular embodiments, a data asset (e.g., data system, software application, etc.) may include, for example, any entity that collects, processes, contains, and/or transfers personal data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

20 Claims, 34 Drawing Sheets

Related U.S. Application Data which is a continuation of application No. 16/226,272, filed on Dec. 19, 2018, now Pat. No. 10,282,370, which is a continuation of application No. 16/041,545, filed on Jul. 20, 2018, now Pat. No. 10,204,154, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017.

(51) Int. Cl.
| | | |
|---|---|---|
| *H04L 29/06* | (2006.01) | |
| *G06F 17/24* | (2006.01) | |
| *G06N 20/00* | (2019.01) | |
| *G06F 16/25* | (2019.01) | |
| *H04W 12/02* | (2009.01) | |
| *G06F 15/76* | (2006.01) | |
| *G06Q 10/06* | (2012.01) | |
| *H04L 29/08* | (2006.01) | |
| *G06F 21/55* | (2013.01) | |

(52) U.S. Cl.
CPC .......... *G06F 17/248* (2013.01); *G06F 21/552* (2013.01); *G06N 20/00* (2019.01); *G06Q 10/06* (2013.01); *H04L 63/04* (2013.01); *H04L 63/101* (2013.01); *H04L 63/20* (2013.01); *H04L 67/306* (2013.01); *H04W 12/02* (2013.01)

(58) Field of Classification Search
CPC ....... G06Q 10/06; H04L 63/04; H04L 63/101; H04L 63/20; H04L 67/306; H04W 12/02
See application file for complete search history.

(56) References Cited

U.S. PATENT DOCUMENTS

| | | | |
|---|---|---|---|
| 5,535,393 | A | 7/1996 | Reeve et al. |
| 5,560,005 | A | 9/1996 | Hoover et al. |
| 5,668,986 | A | 9/1997 | Nilsen et al. |
| 5,761,529 | A | 6/1998 | Raji |
| 6,016,394 | A | 1/2000 | Walker |
| 6,122,627 | A | 9/2000 | Carey et al. |
| 6,148,342 | A | 11/2000 | Ho |
| 6,253,203 | B1 | 6/2001 | Oflaherty et al. |
| 6,272,631 | B1 | 8/2001 | Thomlinson et al. |
| 6,275,824 | B1 | 8/2001 | Oflaherty et al. |
| 6,374,252 | B1 | 4/2002 | Althoff et al. |
| 6,442,688 | B1 | 8/2002 | Moses et al. |
| 6,601,233 | B1 | 7/2003 | Underwood |
| 6,606,744 | B1 | 8/2003 | Mikurak |
| 6,611,812 | B2 | 8/2003 | Hurtado et al. |
| 6,625,602 | B1 | 9/2003 | Meredith et al. |
| 6,662,192 | B1 | 12/2003 | Rebane |
| 6,757,888 | B1 | 6/2004 | Knutson et al. |
| 6,816,944 | B2 | 11/2004 | Peng |
| 6,826,693 | B1 | 11/2004 | Yoshida et al. |
| 6,901,346 | B2 | 5/2005 | Tracy et al. |
| 6,904,417 | B2 | 6/2005 | Clayton et al. |
| 6,925,443 | B1 | 8/2005 | Baggett, Jr. et al. |
| 6,938,041 | B1 | 8/2005 | Brandow et al. |
| 6,983,221 | B2 | 1/2006 | Tracy et al. |
| 6,985,887 | B1 | 1/2006 | Sunstein et al. |
| 6,990,454 | B2 | 1/2006 | McIntosh |
| 6,993,448 | B2 | 1/2006 | Tracy et al. |
| 6,993,495 | B2 | 1/2006 | Smith, Jr. et al. |
| 6,996,807 | B1 | 2/2006 | Vardi et al. |
| 7,013,290 | B2 | 3/2006 | Ananian |
| 7,017,105 | B2 | 3/2006 | Flanagin et al. |
| 7,039,654 | B1 | 5/2006 | Eder |
| 7,047,517 | B1 | 5/2006 | Brown et al. |
| 7,051,036 | B2 | 5/2006 | Rosnow et al. |
| 7,058,970 | B2 | 6/2006 | Shaw |
| 7,069,427 | B2 | 6/2006 | Adler et al. |
| 7,076,558 | B1 | 7/2006 | Dunn |
| 7,127,705 | B2 | 10/2006 | Christfort et al. |
| 7,127,741 | B2 | 10/2006 | Bandini et al. |
| 7,139,999 | B2 | 11/2006 | Bowman-Amuah |
| 7,143,091 | B2 | 11/2006 | Charnock et al. |
| 7,171,379 | B2 | 1/2007 | Menninger et al. |
| 7,181,438 | B1 | 2/2007 | Szabo |
| 7,203,929 | B1 | 4/2007 | Vinodkrishnan et al. |
| 7,213,233 | B1 | 5/2007 | Vinodkrishnan et al. |
| 7,216,340 | B1 | 5/2007 | Vinodkrishnan et al. |
| 7,219,066 | B2 | 5/2007 | Parks et al. |
| 7,223,234 | B2 | 5/2007 | Stupp et al. |
| 7,234,065 | B2 | 6/2007 | Breslin et al. |
| 7,251,624 | B1 | 7/2007 | Lee et al. |
| 7,260,830 | B2 | 8/2007 | Sugimoto |
| 7,287,280 | B2 | 10/2007 | Young |
| 7,290,275 | B2 | 10/2007 | Baudoin et al. |
| 7,302,569 | B2 | 11/2007 | Betz et al. |
| 7,313,575 | B2 | 12/2007 | Carr et al. |
| 7,313,699 | B2 | 12/2007 | Koga |
| 7,330,850 | B1 | 2/2008 | Seibel et al. |
| 7,343,434 | B2 | 3/2008 | Kapoor et al. |
| 7,353,204 | B2 | 4/2008 | Liu |
| 7,370,025 | B1 | 5/2008 | Pandit |
| 7,391,854 | B2 | 6/2008 | Salonen et al. |
| 7,401,235 | B2 | 7/2008 | Mowers et al. |
| 7,403,942 | B1 | 7/2008 | Bayliss |
| 7,412,402 | B2 | 8/2008 | Cooper |
| 7,430,585 | B2 | 9/2008 | Sibert |
| 7,478,157 | B2 | 1/2009 | Bohrer et al. |
| 7,480,755 | B2 | 1/2009 | Herrell et al. |
| 7,512,987 | B2 | 3/2009 | Williams |
| 7,516,882 | B2 | 4/2009 | Cucinotta |
| 7,523,053 | B2 | 4/2009 | Pudhukottai et al. |
| 7,548,968 | B1 | 6/2009 | Bura et al. |
| 7,552,480 | B1 | 6/2009 | Voss |
| 7,584,505 | B2 | 9/2009 | Mondri et al. |
| 7,590,705 | B2 | 9/2009 | Mathew et al. |
| 7,590,972 | B2 | 9/2009 | Axelrod et al. |
| 7,603,356 | B2 | 10/2009 | Schran et al. |
| 7,606,790 | B2 | 10/2009 | Levy |
| 7,613,700 | B1 | 11/2009 | Lobo et al. |
| 7,620,644 | B2 | 11/2009 | Cote et al. |
| 7,630,874 | B2 | 12/2009 | Fables et al. |
| 7,630,998 | B2 | 12/2009 | Zhou et al. |
| 7,636,742 | B1 | 12/2009 | Olavarrieta et al. |
| 7,653,592 | B1 | 1/2010 | Flaxman et al. |
| 7,657,694 | B2 | 2/2010 | Mansell et al. |
| 7,665,073 | B2 | 2/2010 | Meijer et al. |
| 7,668,947 | B2 | 2/2010 | Hutchinson et al. |
| 7,673,282 | B2 | 3/2010 | Amaru et al. |
| 7,685,561 | B2 | 3/2010 | Deem et al. |
| 7,685,577 | B2 | 3/2010 | Pace et al. |
| 7,693,593 | B2 | 4/2010 | Ishibashi et al. |
| 7,707,224 | B2 | 4/2010 | Chastagnol et al. |
| 7,716,242 | B2 | 5/2010 | Pae et al. |
| 7,725,875 | B2 | 5/2010 | Waldrep |
| 7,729,940 | B2 | 6/2010 | Harvey et al. |
| 7,730,142 | B2 | 6/2010 | Levasseur et al. |
| 7,752,124 | B2 | 7/2010 | Green et al. |
| 7,756,987 | B2 | 7/2010 | Wang et al. |
| 7,774,745 | B2 | 8/2010 | Fildebrandt et al. |

(56) References Cited

U.S. PATENT DOCUMENTS

| | | |
|---|---|---|
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,827,523 B2 | 11/2010 | Ahmed et al. |
| 7,853,468 B2 | 12/2010 | Callahan |
| 7,853,470 B2 | 12/2010 | Sonnleithner et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,917,963 B2 | 3/2011 | Goyal et al. |
| 7,921,152 B2 | 4/2011 | Ashley et al. |
| 7,958,494 B2 | 6/2011 | Chaar et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,975,000 B2 | 7/2011 | Dixon et al. |
| 7,991,559 B2 | 8/2011 | Dzekunov et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,069,471 B2 | 11/2011 | Boren |
| 8,146,074 B2 | 3/2012 | Ito et al. |
| 8,150,717 B2 | 4/2012 | Whitmore |
| 8,156,158 B2 | 4/2012 | Rolls et al. |
| 8,166,406 B1 | 4/2012 | Goldfeder et al. |
| 8,176,177 B2 | 5/2012 | Sussman et al. |
| 8,176,334 B2 | 5/2012 | Vainstein |
| 8,180,759 B2 | 5/2012 | Hamzy |
| 8,239,244 B2 | 8/2012 | Ginsberg et al. |
| 8,250,051 B2 | 8/2012 | Bugir et al. |
| 8,286,239 B1 | 10/2012 | Sutton |
| 8,316,237 B1 | 11/2012 | Felsher et al. |
| 8,346,929 B1 | 1/2013 | Lai |
| 8,364,713 B2 | 1/2013 | Pollard |
| 8,380,743 B2 | 2/2013 | Convertino et al. |
| 8,381,180 B2 | 2/2013 | Rostoker |
| 8,418,226 B2 | 4/2013 | Gardner |
| 8,423,954 B2 | 4/2013 | Ronen et al. |
| 8,429,597 B2 | 4/2013 | Prigge |
| 8,429,758 B2 | 4/2013 | Chen et al. |
| 8,438,644 B2 | 5/2013 | Watters et al. |
| 8,468,244 B2 | 6/2013 | Redlich et al. |
| 8,494,894 B2 | 7/2013 | Jaster et al. |
| 8,504,481 B2 | 8/2013 | Motahari et al. |
| 8,516,076 B2 | 8/2013 | Thomas |
| 8,565,729 B2 | 10/2013 | Moseler et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,620,952 B2 | 12/2013 | Bennett et al. |
| 8,621,637 B2 | 12/2013 | Al-Harbi et al. |
| 8,627,114 B2 | 1/2014 | Resch et al. |
| 8,640,110 B2 | 1/2014 | Kopp et al. |
| 8,656,456 B2 | 2/2014 | Maxson et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,706,742 B1 | 4/2014 | Ravid et al. |
| 8,712,813 B2 | 4/2014 | King |
| 8,713,098 B1 | 4/2014 | Adya et al. |
| 8,744,894 B2 | 6/2014 | Christiansen et al. |
| 8,763,071 B2 | 6/2014 | Sinha et al. |
| 8,767,947 B1 | 7/2014 | Ristock et al. |
| 8,788,935 B1 | 7/2014 | Hirsch et al. |
| 8,793,614 B2 | 7/2014 | Wilson et al. |
| 8,793,809 B2 | 7/2014 | Falkenburg |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,819,617 B1 | 8/2014 | Koenig et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | McGraw et al. |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,286 B1 | 11/2014 | Oliver |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,935,198 B1 | 1/2015 | Phillips et al. |
| 8,935,266 B2 | 1/2015 | Wu |
| 8,935,804 B1 | 1/2015 | Clark et al. |
| 8,943,076 B2 | 1/2015 | Stewart et al. |
| 8,943,548 B2 | 1/2015 | Drokov et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,977,234 B2 | 3/2015 | Chava |
| 8,978,158 B2 | 3/2015 | Rajkumar et al. |
| 8,983,972 B2 | 3/2015 | Kriebel et al. |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,032,067 B2 | 5/2015 | Prasad et al. |
| 9,043,217 B2 | 5/2015 | Cashman et al. |
| 9,047,463 B2 | 6/2015 | Porras |
| 9,047,582 B2 | 6/2015 | Hutchinson et al. |
| 9,069,940 B2 | 6/2015 | Hars |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,152,820 B1 | 10/2015 | Pauley, Jr. et al. |
| 9,158,655 B2 | 10/2015 | Wadhwani et al. |
| 9,172,706 B2 | 10/2015 | Krishnamurthy et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,224,009 B2 | 12/2015 | Liu et al. |
| 9,231,935 B1 | 1/2016 | Bridge et al. |
| 9,232,040 B2 | 1/2016 | Barash et al. |
| 9,235,476 B2 | 1/2016 | McHugh et al. |
| 9,241,259 B2 | 1/2016 | Daniela et al. |
| 9,245,126 B2 | 1/2016 | Christodorescu et al. |
| 9,253,609 B2 | 2/2016 | Hosier, Jr. |
| 9,286,282 B2 | 3/2016 | Ling, III et al. |

(56) References Cited

U.S. PATENT DOCUMENTS

| | | |
|---|---|---|
| 9,288,118 B1 | 3/2016 | Pattan |
| 9,317,715 B2 | 4/2016 | Schuette et al. |
| 9,336,332 B2 | 5/2016 | Davis et al. |
| 9,336,400 B2 | 5/2016 | Milman et al. |
| 9,338,188 B1 | 5/2016 | Ahn |
| 9,344,424 B2 | 5/2016 | Tenenboym et al. |
| 9,348,802 B2 | 5/2016 | Massand |
| 9,355,157 B2 | 5/2016 | Mohammed et al. |
| 9,356,961 B1 | 5/2016 | Todd et al. |
| 9,369,488 B2 | 6/2016 | Woods et al. |
| 9,384,199 B2 | 7/2016 | Thereska et al. |
| 9,384,357 B2 | 7/2016 | Patil et al. |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,982 B1 | 8/2016 | Dippenaar et al. |
| 9,424,021 B2 | 8/2016 | Zamir |
| 9,460,307 B2 | 10/2016 | Breslau et al. |
| 9,462,009 B1 | 10/2016 | Kolman et al. |
| 9,465,800 B2 | 10/2016 | Lacey |
| 9,473,535 B2 | 10/2016 | Sartor |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,507,960 B2 | 11/2016 | Bell et al. |
| 9,521,166 B2 | 12/2016 | Wilson |
| 9,549,047 B1 | 1/2017 | Fredinburg et al. |
| 9,552,395 B2 | 1/2017 | Bayer et al. |
| 9,553,918 B1 | 1/2017 | Manion et al. |
| 9,558,497 B2 | 1/2017 | Carvalho |
| 9,571,509 B1 | 2/2017 | Satish et al. |
| 9,571,526 B2 | 2/2017 | Sartor |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,661 B1 | 4/2017 | Finkelstein |
| 9,621,357 B2 | 4/2017 | Williams et al. |
| 9,621,566 B2 | 4/2017 | Gupta et al. |
| 9,642,008 B2 | 5/2017 | Wyatt et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,705,840 B2 | 7/2017 | Pujare et al. |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,697 B1 | 9/2017 | Walker |
| 9,762,553 B2 | 9/2017 | Ford et al. |
| 9,767,309 B1 | 9/2017 | Patel et al. |
| 9,785,795 B2 | 10/2017 | Grondin et al. |
| 9,798,749 B2 | 10/2017 | Saner |
| 9,798,826 B2 | 10/2017 | Wilson et al. |
| 9,800,605 B2 | 10/2017 | Baikalov et al. |
| 9,804,928 B2 | 10/2017 | Davis et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,825,928 B2 | 11/2017 | Lelcuk et al. |
| 9,838,407 B1 | 12/2017 | Oprea et al. |
| 9,838,839 B2 | 12/2017 | Vudali et al. |
| 9,842,349 B2 | 12/2017 | Sawczuk et al. |
| 9,852,150 B2 | 12/2017 | Sharpe et al. |
| 9,860,226 B2 | 1/2018 | Thormaehlen |
| 9,877,138 B1 | 1/2018 | Franklin |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,898,613 B1 | 2/2018 | Swerdlow et al. |
| 9,898,769 B2 | 2/2018 | Barday |
| 9,912,625 B2 | 3/2018 | Mutha et al. |
| 9,916,703 B2 | 3/2018 | Douillard et al. |
| 9,923,927 B1 | 3/2018 | McClintock et al. |
| 9,942,276 B2 | 4/2018 | Sartor |
| 9,953,189 B2 | 4/2018 | Cook et al. |
| 9,961,070 B2 | 5/2018 | Tang |
| 9,973,585 B2 | 5/2018 | Ruback et al. |
| 9,983,936 B2 | 5/2018 | Dornemann et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,025,804 B2 | 7/2018 | Vranyes et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,073,924 B2 | 9/2018 | Karp et al. |
| 10,075,451 B1 | 9/2018 | Hall et al. |
| 10,102,533 B2 | 10/2018 | Barday |
| 10,122,760 B2 | 11/2018 | Terrill et al. |
| 10,142,113 B2 | 11/2018 | Zaidi et al. |
| 10,158,676 B2 | 12/2018 | Barday |
| 10,165,011 B2 | 12/2018 | Barday |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,212,175 B2 | 2/2019 | Seul et al. |
| 10,250,594 B2 | 4/2019 | Chathoth et al. |
| 10,268,838 B2 | 4/2019 | Yadgiri et al. |
| 10,284,604 B2 | 5/2019 | Barday et al. |
| 10,289,866 B2 | 5/2019 | Barday et al. |
| 10,289,867 B2 | 5/2019 | Barday et al. |
| 10,289,870 B2 | 5/2019 | Barday et al. |
| 10,318,761 B2 | 6/2019 | Barday et al. |
| 10,326,768 B2 | 6/2019 | Verweyst et al. |
| 10,348,726 B2 | 7/2019 | Caluwaert |
| 10,361,857 B2 | 7/2019 | Woo |
| 10,387,952 B1 | 8/2019 | Sandhu et al. |
| 10,452,866 B2 | 10/2019 | Barday et al. |
| 10,481,763 B2 | 11/2019 | Bartkiewicz et al. |
| 2002/0129216 A1 | 9/2002 | Collins |
| 2002/0161594 A1 | 10/2002 | Bryan et al. |
| 2003/0041250 A1 | 2/2003 | Proudler |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger et al. |
| 2005/0144066 A1 | 6/2005 | Cope et al. |
| 2005/0197884 A1 | 9/2005 | Mullen, Jr. |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0075122 A1 | 4/2006 | Lindskog et al. |
| 2006/0149730 A1 | 7/2006 | Curtis |

(56) References Cited

U.S. PATENT DOCUMENTS

| | | |
|---|---|---|
| 2006/0253597 A1 | 11/2006 | Mujica |
| 2007/0027715 A1 | 2/2007 | Gropper et al. |
| 2007/0130101 A1 | 6/2007 | Anderson et al. |
| 2007/0157311 A1 | 7/2007 | Meier et al. |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0235177 A1 | 9/2008 | Kim et al. |
| 2008/0270203 A1 | 10/2008 | Holmes et al. |
| 2008/0282320 A1 | 11/2008 | Denovo et al. |
| 2008/0288271 A1 | 11/2008 | Faust |
| 2009/0022301 A1 | 1/2009 | Mudaliar |
| 2009/0037975 A1 | 2/2009 | Ishikawa et al. |
| 2009/0158249 A1 | 6/2009 | Tomkins et al. |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0082533 A1 | 4/2010 | Nakamura et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0228786 A1 | 9/2010 | Török |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0010202 A1 | 1/2011 | Neale |
| 2011/0137696 A1 | 6/2011 | Meyer et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0259752 A1 | 10/2012 | Agee |
| 2012/0323700 A1 | 12/2012 | Aleksandrovich et al. |
| 2012/0330869 A1 | 12/2012 | Durham |
| 2013/0018954 A1 | 1/2013 | Cheng |
| 2013/0085801 A1 | 4/2013 | Sharpe et al. |
| 2013/0103485 A1 | 4/2013 | Postrel |
| 2013/0111323 A1 | 5/2013 | Taghaddos et al. |
| 2013/0218829 A1 | 8/2013 | Martinez |
| 2013/0219459 A1 | 8/2013 | Bradley |
| 2013/0254649 A1 | 9/2013 | Oneill |
| 2013/0254699 A1 | 9/2013 | Bashir et al. |
| 2013/0282466 A1 | 10/2013 | Hampton |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0047551 A1 | 2/2014 | Nagasundaram et al. |
| 2014/0052463 A1 | 2/2014 | Cashman et al. |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0143011 A1 | 5/2014 | Mudugu et al. |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0244309 A1 | 8/2014 | Francois |
| 2014/0244325 A1 | 8/2014 | Cartwright |
| 2014/0244399 A1 | 8/2014 | Orduna et al. |
| 2014/0258093 A1 | 9/2014 | Gardiner et al. |
| 2014/0278663 A1 | 9/2014 | Samuel et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289862 A1 | 9/2014 | Gorfein et al. |
| 2014/0337466 A1 | 11/2014 | Li et al. |
| 2014/0344015 A1 | 11/2014 | Puértolas-Montañés et al. |
| 2015/0012363 A1 | 1/2015 | Grant et al. |
| 2015/0019530 A1 | 1/2015 | Felch |
| 2015/0033112 A1 | 1/2015 | Norwood et al. |
| 2015/0066577 A1 | 3/2015 | Christiansen et al. |
| 2015/0106867 A1 | 4/2015 | Liang |
| 2015/0106948 A1 | 4/2015 | Holman et al. |
| 2015/0106949 A1 | 4/2015 | Holman et al. |
| 2015/0169318 A1 | 6/2015 | Nash |
| 2015/0178740 A1 | 6/2015 | Borawski et al. |
| 2015/0199541 A1 | 7/2015 | Koch et al. |
| 2015/0229664 A1 | 8/2015 | Hawthorn et al. |
| 2015/0235050 A1 | 8/2015 | Wouhaybi et al. |
| 2015/0242778 A1 | 8/2015 | Wilcox et al. |
| 2015/0254597 A1 | 9/2015 | Jahagirdar |
| 2015/0261887 A1 | 9/2015 | Joukov |
| 2015/0264417 A1 | 9/2015 | Spitz et al. |
| 2015/0269384 A1 | 9/2015 | Holman et al. |
| 2015/0310227 A1 | 10/2015 | Ishida et al. |
| 2015/0310575 A1 | 10/2015 | Shelton |
| 2015/0356362 A1 | 12/2015 | Demos |
| 2015/0379430 A1 | 12/2015 | Dirac et al. |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125749 A1 | 5/2016 | Delacroix et al. |
| 2016/0125751 A1 | 5/2016 | Barker et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0188450 A1 | 6/2016 | Appusamy et al. |
| 2016/0232534 A1 | 8/2016 | Lacey et al. |
| 2016/0234319 A1 | 8/2016 | Griffin |
| 2016/0261631 A1 | 9/2016 | Vissamsetty et al. |
| 2016/0262163 A1 | 9/2016 | Gonzalez Garrido et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0041324 A1 | 2/2017 | Ionutescu et al. |
| 2017/0068785 A1 | 3/2017 | Experton et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0142158 A1 | 5/2017 | Laoutaris et al. |
| 2017/0161520 A1 | 6/2017 | Lockhart, III et al. |

(56) References Cited

U.S. PATENT DOCUMENTS

| | | | |
|---|---|---|---|
| 2017/0171235 A1 | 6/2017 | Mulchandani et al. |
| 2017/0177324 A1 | 6/2017 | Frank et al. |
| 2017/0180505 A1 | 6/2017 | Shaw et al. |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2018/0039975 A1 | 2/2018 | Hefetz |
| 2018/0041498 A1 | 2/2018 | Kikuchi |
| 2018/0046753 A1 | 2/2018 | Shelton |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0307859 A1 | 10/2018 | Lafever et al. |
| 2018/0352003 A1 | 12/2018 | Winn et al. |
| 2018/0357243 A1 | 12/2018 | Yoon |
| 2018/0374030 A1 | 12/2018 | Barday et al. |
| 2019/0012672 A1 | 1/2019 | Francesco |
| 2019/0130132 A1 | 5/2019 | Barbas et al. |
| 2019/0156058 A1 | 5/2019 | Van Dyne et al. |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0294818 A1 | 9/2019 | Barday et al. |

FOREIGN PATENT DOCUMENTS

| | | |
|---|---|---|
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Li, Ninghui, et al, t-Closeness: Privacy Beyond k-Anonymity and l-Diversity, IEEE, 2014, p. 106-115.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Maret et al, "Multimedia Information Interchange: Web Forms Meet Data Servers", IEEE, pp. 499-505 (Year: 1999).
McGarth et al, "Digital Library Technology for Locating and Accessing Scientific Data", ACM, pp. 188-194 (Year: 1999).
Mudepalli et al, "An efficient data retrieval approach using blowfish encryption on cloud CipherText Retrieval in Cloud Computing" IEEE, pp. 267-271 (Year: 2017).
Newman, "Email Archive Overviews using Subject Indexes", ACM, pp. 652-653, 2002 (Year: 2002).
Notice of Allowance, dated Apr. 12, 2017, from corresponding U.S. Appl. No. 15/256,419.
Notice of Allowance, dated Apr. 2, 2019, from corresponding U.S. Appl. No. 16/160,577.
Notice of Allowance, dated Apr. 25, 2018, from corresponding U.S. Appl. No. 15/883,041.
Notice of Allowance, dated Apr. 8, 2019, from corresponding U.S. Appl. No. 16/228,250.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.

(56) References Cited

OTHER PUBLICATIONS

Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Office Action, dated Nov. 15, 2018, from corresponding U.S. Appl. No. 16/059,911.
Office Action, dated Nov. 23, 2018, from corresponding U.S. Appl. No. 16/042,673.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Olenski, Steve, For Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Popescu-Zeletin, "The Data Access and Transfer Support in a Local Heterogeneous Network (HMINET)", IEEE, pp. 147-152 (Year: 1979).
Restriction Requirement, dated Apr. 10, 2019, from corresponding U.S. Appl. No. 16/277,715.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Restriction Requirement, dated Oct. 17, 2018, from corresponding U.S. Appl. No. 16/055,984.
Restriction Requirement, dated Sep. 9, 2019, from corresponding U.S. Appl. No. 16/505,426.
Salim et al, "Data Retrieval and Security using Lightweight Directory Access Protocol", IEEE, pp. 685-688 (Year: 2009).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013.
Stern, Joanna, "iPhone Privacy Is Broken . . . and Apps Are to Blame", The Wall Street Journal, wsj.com, May 31, 2019.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
The Cookie Collective, Optanon Cookie Policy Generator, The Cookie Collective, Year 2016, http://web.archive.org/web/20160324062743/https:/optanon.com/.
TRUSTe Announces General Availability of Assessment Manager for Enterprises to Streamline Data Privacy Management with Automation, PRNewswire, Mar. 4, 2015.
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.

(56) References Cited

OTHER PUBLICATIONS

Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
www.truste.com (1), 200150207, Internet Archive Wayback Machine, www.archive.org,2_7_2015.
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Zeldovich, Nickolai, et al, Making Information Flow Explicit in HiStar, OSDI '06: 7th USENIX Symposium on Operating Systems Design and Implementation, USENIX Association, p. 263-278.
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Barker, "Personalizing Access Control by Generalizing Access Control," ACM, pp. 149-158 (Year: 2010).
Final Written Decision Regarding Post-Grant Review in Case PGR2018-00056 for U.S. Pat. No. 9,691,090 B1, Oct. 10, 2019.
Gustarini, et al, "Evaluation of Challenges in Human Subject Studies "In-the-Wild" Using Subjects' Personal Smartphones," ACM, pp. 1447-1456 (Year 2013).
Kirkam, et al, "A Personal Data Store for an Internet of Subjects," IEEE, pp. 92-97 (Year: 2011).
Notice of Allowance, dated Oct. 10, 2019, from corresponding U.S. Appl. No. 16/277,539.
Office Action, dated Oct. 8, 2019, from corresponding U.S. Appl. No. 16/552,765.
Zannone, et al, "Maintaining Privacy on Derived Objects," ACM, pp. 10-19 (Year 2005).
Office Action, dated Oct. 16, 2019, from corresponding U.S. Appl. No. 16/557,392.
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Notice of Allowance, dated Nov. 14, 2019, from corresponding U.S. Appl. No. 16/436,616.
Notice of Allowance, dated Nov. 5, 2019, from corresponding U.S. Appl. No. 16/560,965.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Restriction Requirement, dated Nov. 15, 2019, from corresponding U.S. Appl. No. 16/586,202.
Restriction Requirement, dated Nov. 5, 2019, from corresponding U.S. Appl. No. 16/563,744.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.

(56) References Cited

OTHER PUBLICATIONS

Office Action, dated Dec. 2, 2019, from corresponding U.S. Appl. No. 16/560,963.
Bayardo et al, "Technological Solutions for Protecting Privacy," Computer 36.9 (2003), pp. 115-118, (Year: 2003).
Dokholyan et al, "Regulatory and Ethical Considerations for Linking Clinical and Administrative Databases," American Heart Journal 157.6 (2009), pp. 971-982 (Year: 2009).
Notice of Allowance, dated Dec. 3, 2019, from corresponding U.S. Appl. No. 16/563,749.
Notice of Allowance, dated Dec. 4, 2019, from corresponding U.S. Appl. No. 16/594,670.
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090 dated Apr. 12, 2018.
Office Action, dated Apr. 18, 2018, from corresponding U.S. Appl. No. 15/894,819.
Office Action, dated Apr. 22, 2019, from corresponding U.S. Appl. No. 16/241,710.
Office Action, dated Apr. 5, 2019, from corresponding U.S. Appl. No. 16/278,119.
Office Action, dated Aug. 13, 2019, from corresponding U.S. Appl. No. 16/505,430.
Office Action, dated Aug. 13, 2019, from corresponding U.S. Appl. No. 16/512,031.
Office Action, dated Aug. 15, 2019, from corresponding U.S. Appl. No. 16/505,461.
Office Action, dated Aug. 19, 2019, from corresponding U.S. Appl. No. 16/278,122.
Office Action, dated Aug. 23, 2017, from corresponding U.S. Appl. No. 15/626,052.
Office Action, dated Aug. 24, 2017, from corresponding U.S. Appl. No. 15/169,641.
Office Action, dated Aug. 24, 2017, from corresponding U.S. Appl. No. 15/619,451.
Office Action, dated Aug. 27, 2019, from corresponding U.S. Appl. No. 16/410,296.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 6, 2019, from corresponding U.S. Appl. No. 16/404,491.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Feb. 15, 2019, from corresponding U.S. Appl. No. 16/220,899.
Office Action, dated Feb. 26, 2019, from corresponding U.S. Appl. No. 16/228,250.
Office Action, dated Jan. 18, 2019, from corresponding U.S. Appl. No. 16/055,984.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jul. 18, 2019, from corresponding U.S. Appl. No. 16/410,762.
Office Action, dated Jul. 21, 2017, from corresponding U.S. Appl. No. 15/256,430.
Office Action, dated Jul. 23, 2019, from corresponding U.S. Appl. No. 16/436,616.
Office Action, dated Jun. 24, 2019, from corresponding U.S. Appl. No. 16/410,336.
Office Action, dated Jun. 27, 2019, from corresponding U.S. Appl. No. 16/404,405.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 25, 2019, from corresponding U.S. Appl. No. 16/278,121.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 4, 2019, from corresponding U.S. Appl. No. 16/237,083.
Office Action, dated May 16, 2018, from corresponding U.S. Appl. No. 15/882,989.
Office Action, dated May 17, 2019, from corresponding U.S. Appl. No. 16/277,539.
Office Action, dated May 2, 2018, from corresponding U.S. Appl. No. 15/894,809.
Office Action, dated May 2, 2019, from corresponding U.S. Appl. No. 16/104,628.
Office Action, dated Nov. 1, 2017, from corresponding U.S. Appl. No. 15/169,658.
Notice of Allowance, dated Dec. 31, 2018, from corresponding U.S. Appl. No. 16/159,634.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Feb. 13, 2019, from corresponding U.S. Appl. No. 16/041,561.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 23, 2018, from corresponding U.S. Appl. No. 15/619,251.

(56) References Cited

OTHER PUBLICATIONS

Notice of Allowance, dated Jan. 26, 2018, from corresponding U.S. Appl. No. 15/619,469.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 17, 2019, from corresponding U.S. Appl. No. 16/055,961.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 2, 2018, from corresponding U.S. Appl. No. 15/858,802.
Notice of Allowance, dated Mar. 25, 2019, from corresponding U.S. Appl. No. 16/054,780.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated May 21, 2018, from corresponding U.S. Appl. No. 15/896,790.
Notice of Allowance, dated May 28, 2019, from corresponding U.S. Appl. No. 16/277,568.
Notice of Allowance, dated May 5, 2017, from corresponding U.S. Appl. No. 15/254,901.
Notice of Allowance, dated Nov. 2, 2018, from corresponding U.S. Appl. No. 16/054,762.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 3, 2019, from corresponding U.S. Appl. No. 16/511,700.
Abdullah et al, "The Mapping Process of Unstructured Data to the Structured Data", ACM, pp. 151-155 (Year: 2013).
Agar, Gunes, et al, The Web Never Forgets, Computer and Communications Security, ACM, Nov. 3, 2014, pp. 674-689.
Aghasian, Elan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Antunes et al, "Preserving Digital Data in Heterogeneous Environments", ACM, pp. 345-348, 2009 (Year: 2009).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc.
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dunkel et al, "Data Organization and Access for Efficient Data Mining", IEEE, pp. 522-529 (Year: 1999).
Dwork, Cynthia, Differential Privacy, Microsoft Research, p. 1-12.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Mar. 5, 2019, from corresponding U.S. Appl. No. 16/055,961.
Final Office Action, dated Nov. 29, 2017, from corresponding U.S. Appl. No. 15/619,237.
Final Office Action, dated Sep. 25, 2019, from corresponding U.S. Appl. No. 16/278,119.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.

(56) References Cited

OTHER PUBLICATIONS

Fung et al, "Discover Information and Knowledge from Websites using an Integrated Summarization and Visualization Framework", IEEE, pp. 232-235 (Year 2010).

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

Hacigümüs, Hakan, et al, Executing SQL over Encrypted Data in the Database-Service-Provider Model, ACM, Jun. 4, 2002, pp. 216-227.

Huner et al, "Towards a Maturity Model for Corporate Data Quality Management", ACM, pp. 231-238, 2009 (Year: 2009).

Hunton & Williams LLP, The Role of Risk Management in Data Protection, Privacy Risk Framework and the Risk-based Approach to Privacy, Centre for Information Policy Leadership, Workshop II, Nov. 23, 2014.

IAPP, Daily Dashboard, PIA Tool Stocked With New Templates for DPI, Infosec, International Association of Privacy Professionals, Apr. 22, 2014.

IAPP, ISO/IEC 27001 Information Security Management Template, Resource Center, International Association of Privacy Professionals.

International Search Report, dated Aug. 15, 2017, from corresponding International Application No. PCT/US2017/036919.

International Search Report, dated Aug. 21, 2017, from corresponding International Application No. PCT/US2017/036914.

International Search Report, dated Aug. 29, 2017, from corresponding International Application No. PCT/US2017/036898.

International Search Report, dated Aug. 8, 2017, from corresponding International Application No. PCT/US2017/036889.

International Search Report, dated Aug. 8, 2017, from corresponding International Application No. PCT/US2017/036890.

International Search Report, dated Aug. 8, 2017, from corresponding International Application No. PCT/US2017/036893.

International Search Report, dated Aug. 8, 2017, from corresponding International Application No. PCT/US2017/036901.

International Search Report, dated Aug. 8, 2017, from corresponding International Application No. PCT/US2017/036913.

International Search Report, dated Aug. 8, 2017, from corresponding International Application No. PCT/US2017/036920.

International Search Report, dated Dec. 14, 2018, from corresponding International Application No. PCT/US2018/045296.

International Search Report, dated Jan. 14, 2019, from corresponding International Application No. PCT/US2018/046949.

International Search Report, dated Jan. 7, 2019, from corresponding International Application No. PCT/US2018/055772.

International Search Report, dated Jun. 21, 2017, from corresponding International Application No. PCT/US2017/025600.

International Search Report, dated Jun. 6, 2017, from corresponding International Application No. PCT/US2017/025605.

International Search Report, dated Jun. 6, 2017, from corresponding International Application No. PCT/US2017/025611.

Cerpzone, "How to Access Data on Data Archival Storage and Recovery System", https://www.saj.usace.army.mil/ Portals/44/docs/Environmental/Lake%20O%20Watershed/15February2017/How%20To%20Access%20Model%20Data%20on%20DASR.pdf?ver=2017-02-16-095535-633, Feb. 16, 2017.

Final Office Action, dated Dec. 9, 2019, from corresponding U.S. Appl. No. 16/410,336.

Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf?(Year: 2018).

Notice of Allowance, dated Dec. 11, 2019, from corresponding U.S. Appl. No. 16/278,122.

Notice of Allowance, dated Dec. 13, 2019, from corresponding U.S. Appl. No. 16/512,033.

Notice of Allowance, dated Dec. 16, 2019, from corresponding U.S. Appl. No. 16/505,461.

Notice of Allowance, dated Dec. 18, 2019, from corresponding U.S. Appl. No. 16/659,437.

Notice of Allowance, dated Dec. 9, 2019, from corresponding U.S. Appl. No. 16/565,261.

Office Action, dated Dec. 11, 2019, from corresponding U.S. Appl. No. 16/578,712.

Office Action, dated Dec. 16, 2019, from corresponding U.S. Appl. No. 16/563,754.

Office Action, dated Dec. 16, 2019, from corresponding U.S. Appl. No. 16/565,265.

Office Action, dated Dec. 19, 2019, from corresponding U.S. Appl. No. 16/410,866.

Restriction Requirement, dated Dec. 9, 2019, from corresponding U.S. Appl. No. 16/565,395.

OneTrust

Sabourin DM79 | Hello Jason SITEADMIN7

Data Mapping

- Dashboard
- Asset Template
- Processing Template
- Assessments
- Assets
- Processing Activities
- Data Elements
- Asset Map
- Scan Results Data Mapping > Assets Send Assessments(0) | Delete(0)

2010    2020

| | Asset | Managing Organi... | Hosting Location | Type | Processing Activi... | Status |
|---|---|---|---|---|---|---|
| | ▼ 7th Asset | | | | | |

Asset Attributes

| Asset | Managing Organization Group | Hosting Location | Type |
|---|---|---|---|
| 7th Asset | Sabourin DM79 | Algeria | |

| Processing Activities | Status | Description | |
|---|---|---|---|
| ... | In Discovery | Value_1 — 2025 | |

| Internal or 3rd Party Storage | Storage Format | Technical Security Measures | Organizational Security Measures |
|---|---|---|---|
| ... | ... | ... | ... |

| Other Security Measures | Volume of Data Subjects | Data Retention | IT Owner |
|---|---|---|---|
| ... | ... | ... | ... |

| | | | | | | |
|---|---|---|---|---|---|---|
| ▷ | Additional Asset | Sabourin DM79 | Argentina | | | |
| ▷ | Asset1 | Ssbourin DM79 | Afghanistan | Application | | New |
| ▷ | Asset2 | Ssbourin DM79 | United Arab Emira... | Database | | In Discovery |
| | | | | | | In Discovery |

Privacy Policy

Effective Date: 17 April 2017

Policy Pages
Privacy Policy
Cookie Policy

We at OneTrust LLC and OneTrust Technology Limited (collectively, "OneTrust", "we" and "us") know you care about how your personal information is used and shared, and we take your privacy seriously. Please read the following to learn more about how we collect, store, use and disclose information about you when you interact or use any of the following websites: www.onetrust.com, www.cookielaw.org, www.optanon.com, www.governor.co.uk, and https://cookiepedia.co.uk/ (collectively the "Websites") or any related events, trade shows, sales or marketing, and/or if you use any of our products, services or applications (including any trial) (collectively the "Services") in any manner.

What does this Privacy Policy cover?

This Privacy Policy covers our treatment of information that we gather when you are accessing or Submit a Privacy Related Request

DATA PROCESSING SYSTEMS FOR GENERATING AND POPULATING A DATA INVENTORY

CROSS-REFERENCE TO RELATED APPLICATIONS

This application is a continuation-in-part of U.S. patent application Ser. No. 16/404,439, filed May 6, 2019, which is a continuation of U.S. patent application Ser. No. 16/226,272, filed Dec. 19, 2018, now U.S. Pat. No. 10,282,370, issued May 7, 2019, which is a continuation of U.S. patent application Ser. No. 16/041,545, filed Jul. 20, 2018, now U.S. Pat. No. 10,204,154, issued Feb. 12, 2019, which is a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839 filed Jul. 27, 2017, and which is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and which is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348,695, filed Jun. 10, 2016, the entire disclosures of which are hereby incorporated by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

SUMMARY

A data processing data inventory generation system, according to various embodiments, comprises: (1) one or more processors; (2) computer memory; and (3) a non-transitory computer-readable medium storing computer-executable instructions. In various embodiments, the computer-executable instructions, when executed by the one or more processors, cause the one or more processors to perform operations comprising: (1) identifying a primary data asset that collects or stores personal data of one or more data subjects; and (2) generating a data inventory for the primary data asset, the data inventory storing one or more primary data asset inventory attributes. In particular embodiments, the one or more primary data asset inventory attributes comprise: (1) a type of personal data collected or stored by the primary data asset; and (2) primary transfer data associated with the personal data and the primary data asset. In particular embodiments, the computer-executable instructions, when executed by the one or more processors, further cause the one or more processors to perform operations comprising: (1) identifying a transfer data asset based at least in part on the primary transfer data; (2) modifying the data inventory to include the transfer data asset, the transfer data asset storing one or more transfer data asset inventory attributes comprising the primary transfer data; (3) digitally storing the data inventory in the computer memory; and (4) electronically linking the primary data asset to the transfer data asset in the data inventory.

A computer-implemented data processing method of generating a data inventory for a plurality of inter-related data assets utilized in the processing of one or more pieces of personal data, according to various embodiments, comprises: (1) identifying, by one or more processors, from the plurality of inter-related data assets, a storage asset, the storage asset storing the one or more pieces of personal data collected from one or more data subjects; (2) identifying, by one or more processors, from the plurality of inter-related data assets, a collection asset that transfers the one or more pieces of personal data to the storage asset; (3) identifying, by one or more processors, from the plurality of inter-related data assets, a transfer asset to which the storage asset transfers the one or more pieces personal data; (4) digitally storing, by one or more processors, in computer memory, one or more storage asset inventory attributes comprising a type of personal data stored by the storage asset; (5) digitally storing, by one or more processors, in computer memory, one or more collection asset inventory attributes comprising the one or more pieces of personal data that the collection asset transfers to the storage asset; (6) digitally storing, by one or more processors, in computer memory, one or more transfer asset inventory attributes comprising the one or more pieces of personal data that the storage asset transfers to the transfer asset; and (7) generating the data inventory.

In particular embodiments, generating the data inventory comprises: (1) associating the storage asset with the one or more storage asset inventory attributes in computer memory; (2) associating the collection asset with the one or more collection asset inventory attributes in computer memory; (3) associating the transfer asset with the one or more transfer asset inventory attributes in computer memory; (4) electronically linking the collection asset to the storage asset in computer memory; (5) electronically linking the storage asset to the transfer asset; and (6) electronically mapping the one or more pieces of personal data to the collection asset, the storage asset, and the transfer asset.

A computer-implemented data processing method for generating a data model of personal data processing activities, according to particular embodiments, comprises: (1) generating a data model for one or more data assets used in the collection or storage of personal data; (2) digitally storing the data model in computer memory; (3) identifying a first data asset of the one or more data assets; (4) modifying the data model to include the first data asset; (5) generating a data inventory for the first data asset in the data model; (6) associating the data inventory with the first data asset in computer memory; and (7) mapping the first data asset to at least one of the one or more data assets in the data model. In various embodiments, the data inventory comprises one or more inventory attributes such as, for example: (1) one or more processing activities associated with the first data asset; (2) transfer data associated with the first data asset; and (3) one or more pieces of personal data associated with the first asset.

Various embodiments are also described in the following listing of concepts:

1. A computer-implemented data processing method of populating a data inventory with one or more data inventory attribute values, the method comprising:

generating, by one or more processors, the data inventory for one or more data assets used in the collection or storage of personal data;

storing, by the one or more processors, the data inventory in computer memory;

modifying, by the one or more processors, the data inventory to include one or more data fields that each define a respective data inventory attribute of a plurality of data inventory attributes;

determining, by the one or more processors, which of the one or more data fields of the data inventory are unpopulated data fields;

determining, by the one or more processors, a respective data inventory attribute value for one or more of the unpopulated data fields, wherein determining the respective data inventory attribute value for the one or more of the unpopulated data fields comprises:

requesting, by the one or more processors via an application programming interface to an application, data associated with the respective data inventory attribute value for the one or more of the unpopulated data fields, receiving, by the one or more processors from the application, the data associated with the respective data inventory attribute value for the one or more of the unpopulated data fields, and determining, by the one or more processors based at least in part on the data associated with the respective data inventory attribute value for the one or more of the unpopulated data fields, the respective data inventory attribute value for the one or more of the unpopulated data fields;

in response to determining the respective data inventory attribute value for the one or more of the unpopulated data fields, modifying each of the one or more unpopulated data fields to include the respective data inventory attribute value; and storing the modified data inventory in the computer memory.

2. The computer-implemented data processing method of concept 1, wherein the application programming interface to the application comprises an interface to a third-party information technology system.

3. The computer-implemented data processing method of concept 1, wherein the application programming interface to the application comprises an interface to an application executing on a remote computing device.

4. The computer-implemented data processing method of concept 1 wherein the application programming interface to the application comprises an interface to a server storing data asset assessment information associated with the one or more data assets.

5. The computer-implemented data processing method of concept 4, wherein receiving the data associated with the respective data inventory attribute value for the one or more of the unpopulated data fields comprises receiving a subset of the data asset assessment information associated with the one or more data assets from the server.

6. The computer-implemented data processing method of concept 1, wherein the application programming interface to the application comprises an interface to a data repository, wherein the method further comprises analyzing the respective data inventory attribute value for the one or more of the unpopulated data fields and correlating metadata for the data repository with the respective data inventory attribute value for the one or more of the unpopulated data fields.

7. The computer-implemented data processing method of concept 1, wherein the method further comprises using one or more machine learning techniques to categorize the data inventory attribute associated with the respective data inventory attribute value for the one or more of the unpopulated data fields.

8. The computer-implemented data processing method of concept 7, wherein the method further comprises requesting user feedback regarding the categorization of the data inventory attribute associated with the respective data inventory attribute value for the one or more of the unpopulated data fields.

9. The computer-implemented data processing method of concept 8, wherein the method further comprises assigning a confidence score to the respective data inventory attribute value for the one or more of the unpopulated data fields based, at least in part, on the categorization of the data inventory attribute associated with the respective data inventory attribute value for the one or more of the unpopulated data fields.

10. The computer-implemented data processing method of concept 1, wherein the method further comprises providing a software application for installation on a computing device that is networked with one or more data repositories, wherein the application programming interface to the application comprises an interface to the software application for installation on the computing device that is networked with the one or more data repositories.

11. A data processing system for data inventory population comprising:

one or more processors;

computer memory; and a non-transitory computer-readable medium storing computer-executable instructions that, when executed by the one or more processors, cause the one or more processors to perform operations comprising:

generating a data inventory for one or more data assets used in the collection or storage of personal data;

storing the data inventory in the computer memory;

modifying the data inventory to include one or more data fields that each define a respective data inventory attribute of a plurality of data inventory attributes;

determining which of the one or more data fields of the data inventory are unpopulated data fields;

determining a respective data inventory attribute value for one or more of the unpopulated data fields, wherein determining the respective data inventory attribute value for the one or more of the unpopulated data fields comprises:

requesting, via an application programming interface to an application, data associated with the respective data inventory attribute value for the one or more of the unpopulated data fields, receiving, from the application, the data associated with the respective data inventory attribute value for the one or more of the unpopulated data fields, and determining, based at least in part on the data associated with the respective data inventory attribute value for the one or more of the unpopulated data fields, the respective data inventory attribute value for the one or more of the unpopulated data fields;

in response to determining the respective data inventory attribute value for the one or more of the unpopulated data fields, modifying each of the one or more unpopulated data fields to include the respective data inventory attribute value; and storing the modified data inventory in the computer memory.

12. The data processing system of concept 11, wherein the non-transitory computer-readable medium further stores computer-executable instructions that, when executed by the one or more processors, cause the one or more processors to perform operations comprising:

categorizing a data inventory attribute associated with the respective data inventory attribute value for the one or more of the unpopulated data fields based at least in part on a confidence score.

13. The data processing system of concept 11, wherein the one or more data assets used in the collection or storage of personal data comprises a plurality of interrelated data assets comprising one or more storage assets, one or more collection assets, and one or more transfer assets.

14. The data processing system of concept 11, wherein the data associated with the respective data inventory attribute value for the one or more of the unpopulated data fields comprises schema details associated with a data inventory attribute associated with the respective data inventory attribute value for the one or more of the unpopulated data fields.

15. The data processing system of concept 14, wherein the schema details comprise one or more schema details selected from a group consisting of:
 an asset ID;
 a Schema ID; and
 a connection string.

16. The data processing system of concept 11, wherein the application programming interface to the application comprises an interface to a data repository, wherein the non-transitory computer-readable medium further stores computer-executable instructions that, when executed by the one or more processors, cause the one or more processors to perform operations comprising:

analyzing the data repository to determine whether the data repository is part of an existing data model of data assets; and determining the respective data inventory attribute value for the one or more of the unpopulated data fields further based at least in part on whether the data repository is part of the existing data model of data assets.

17. The data processing system of concept 11, wherein the non-transitory computer-readable medium further stores computer-executable instructions that, when executed by the one or more processors, cause the one or more processors to perform operations comprising:

identifying a primary data asset from among the one or more data assets; and determining the respective data inventory attribute value for the one or more of the unpopulated data fields further based at least in part on data associated with the primary data asset.

18. The data processing system of concept 11, wherein the non-transitory computer-readable medium further stores computer-executable instructions that, when executed by the one or more processors, cause the one or more processors to perform operations comprising:

determining a categorization for a data inventory attribute associated with the respective data inventory attribute value for the one or more of the unpopulated data fields based at least in part on a confidence score associated with the respective data inventory attribute value for the one or more of the unpopulated data fields.

19. The data processing system of concept 18, wherein the non-transitory computer-readable medium further stores computer-executable instructions that, when executed by the one or more processors, cause the one or more processors to perform operations comprising:

receiving input from a user confirming or denying the categorization for the data inventory attribute associated with the respective data inventory attribute value for the one or more of the unpopulated data fields; and in response to receiving the input form the user, modifying the confidence score associated with the respective data inventory attribute value for the one or more of the unpopulated data fields.

20. The data processing system of concept 11, wherein the respective data inventory attribute value for the one or more of the unpopulated data fields is associated with a data inventory attribute selected from a group consisting of:
 a storage asset inventory attribute;
 a collection asset inventory attribute; and
 a transfer asset inventory attribute.

BRIEF DESCRIPTION OF THE DRAWINGS

Various embodiments of a data model generation and population system are described below. In the course of this description, reference will be made to the accompanying drawings, which are not necessarily drawn to scale, and wherein:

FIGS. 14-25 depict exemplary screen displays and graphical user interfaces (GUIs) according to various embodiments of the system, which may display information associated with the system or enable access to, or interaction with, the system by one or more users (e.g., to configure a questionnaire for populating one or more inventory attributes for one or more data models, complete one or more assessments, etc.).

FIGS. 30-31 depict exemplary screen displays and graphical user interfaces (GUIs) according to various embodiments of the system, which may display information associated with the system or enable access to, or interaction with, the system by one or more users (e.g., for the purpose of submitting a data subject access request or other suitable request).

Figure 32:
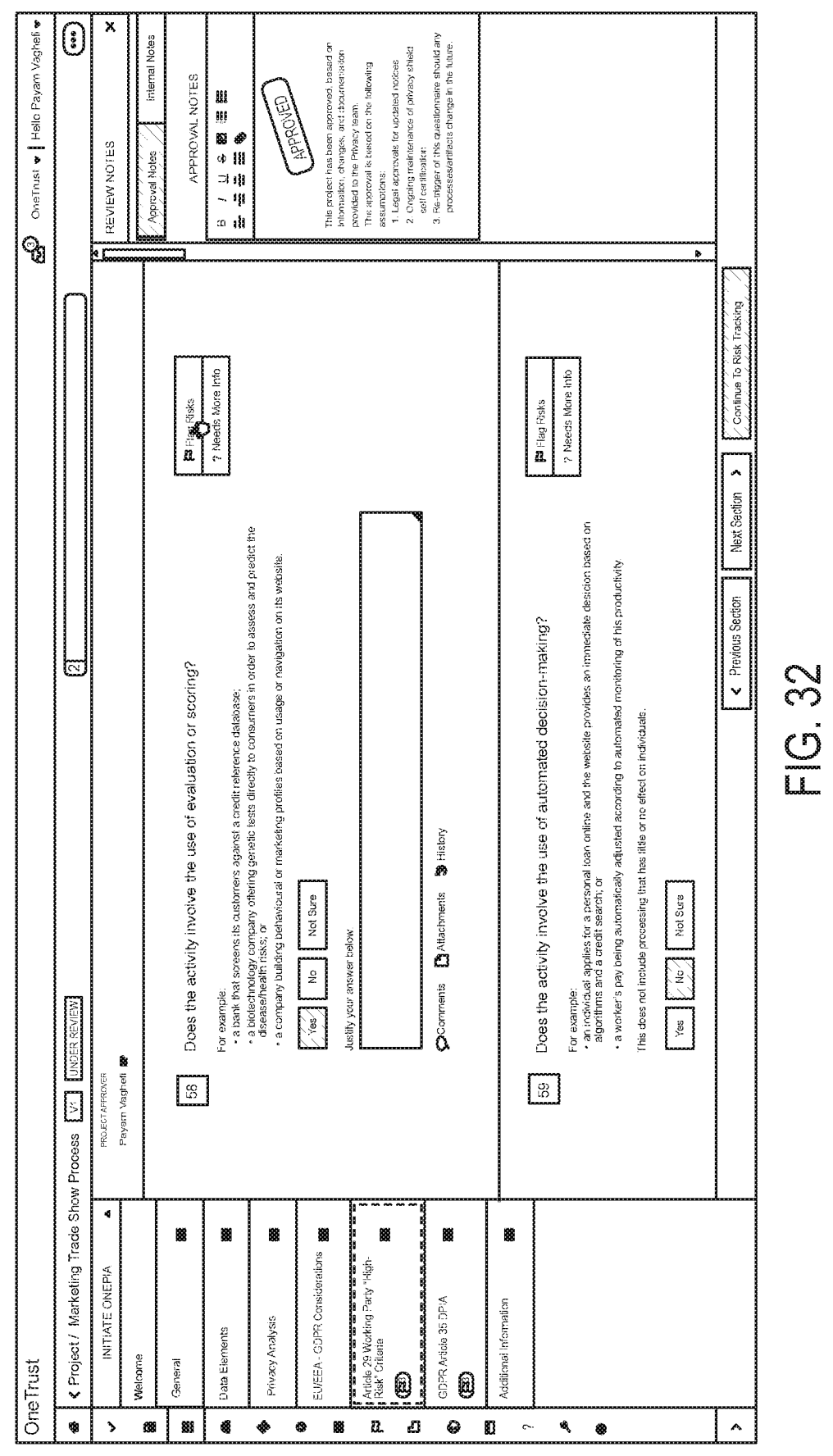
Figure 33:
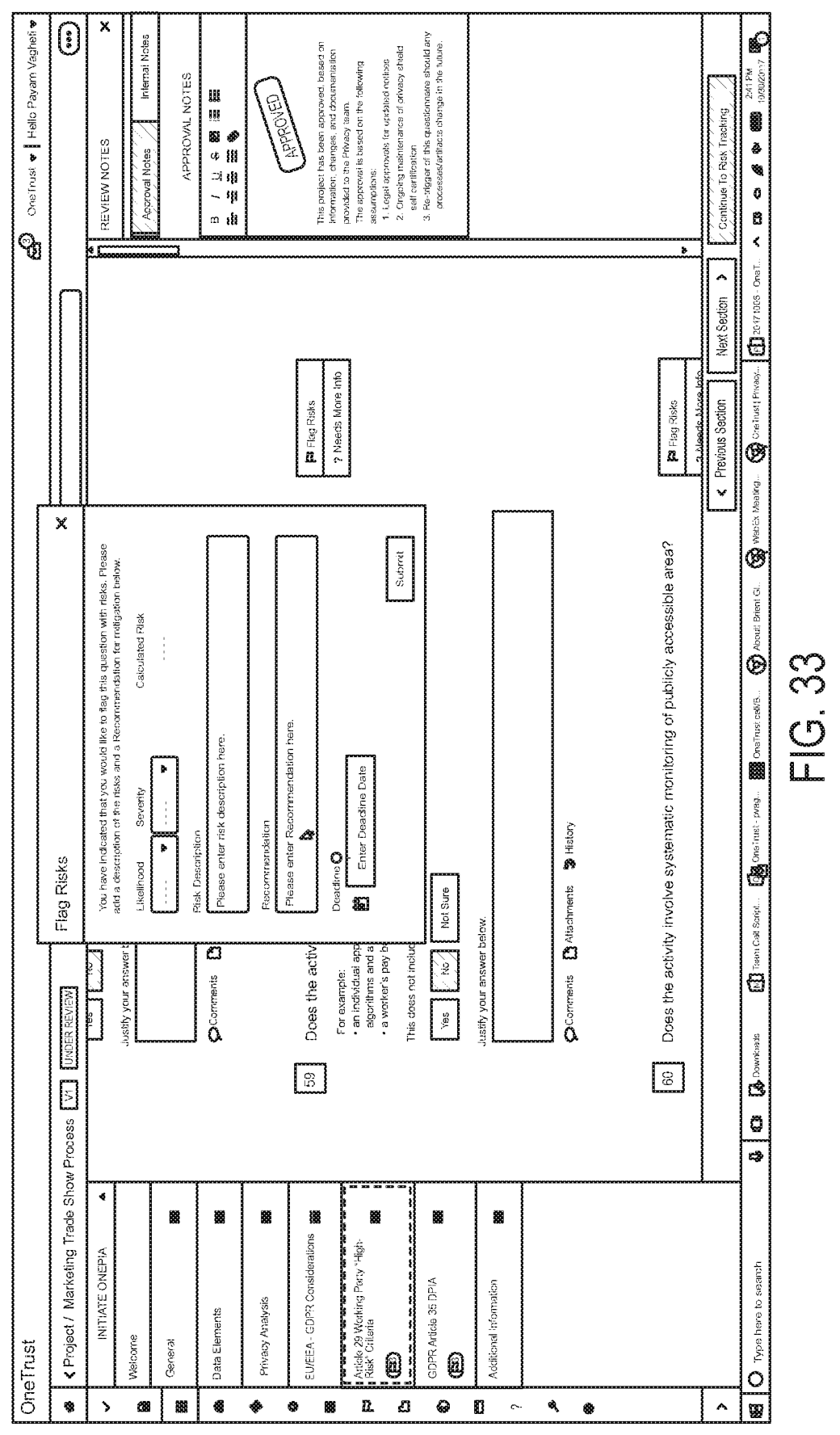
Figure 34:
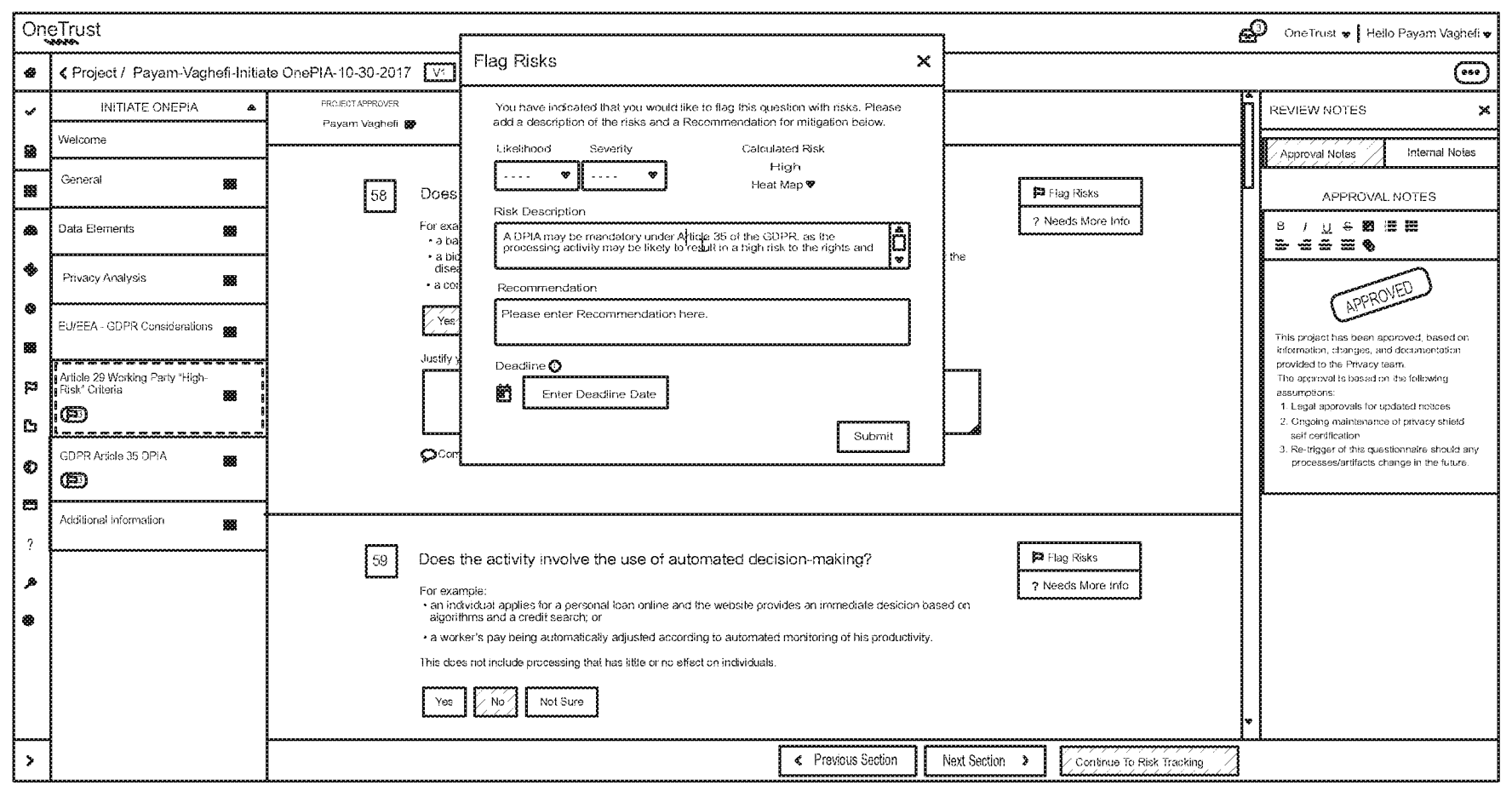
Figure 35:
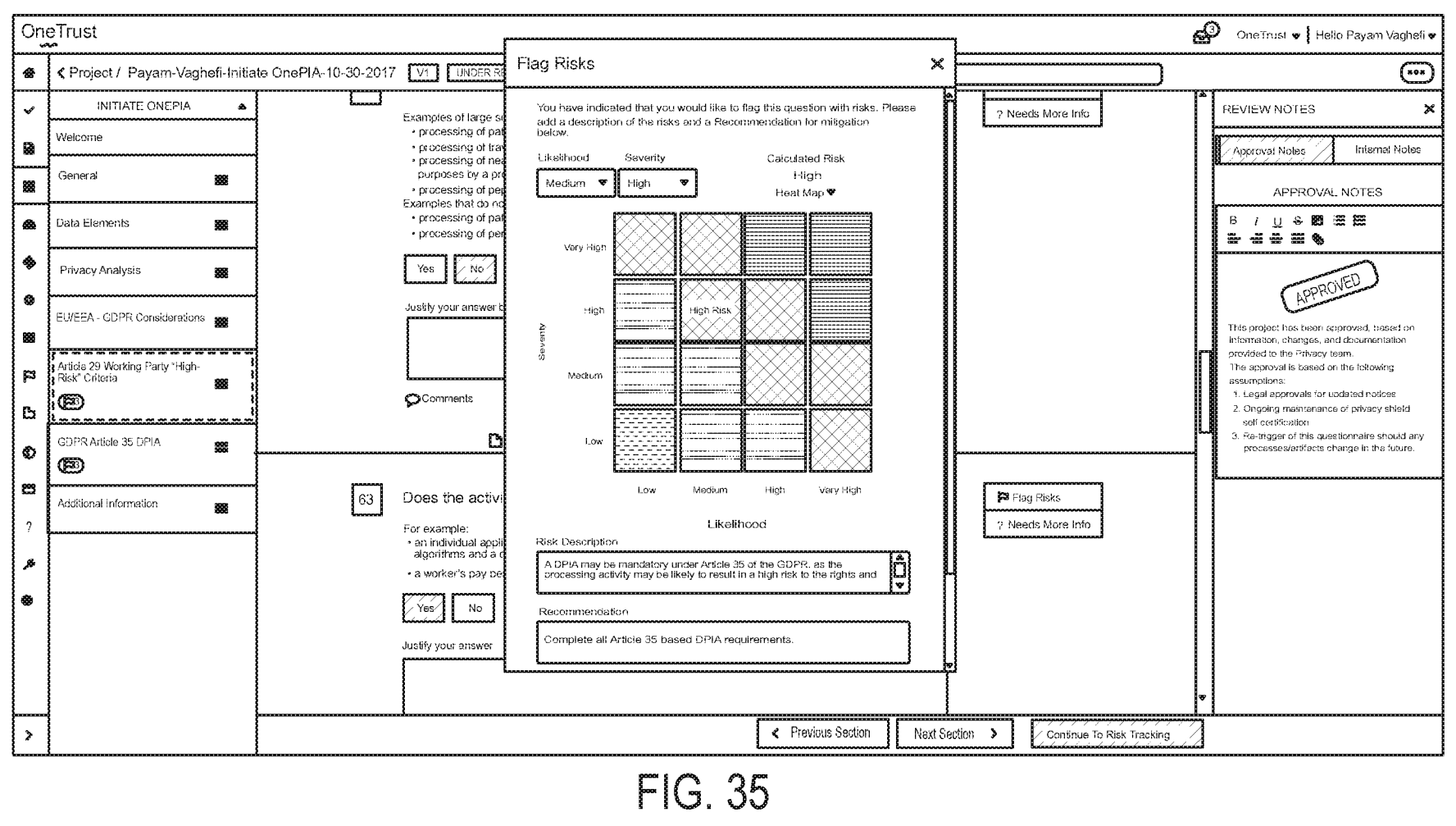

FIGS. 32-35 depict exemplary screen displays and graphical user interfaces (GUIs) according to various embodiments of the system, which may display information associated with the system or enable access to, or interaction with, the system by one or more users (e.g., for the purpose of flagging one or more risks associated with one or more particular questionnaire questions).

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A data model generation and population system, according to particular embodiments, is configured to generate a data model (e.g., one or more data models) that maps one or more relationships between and/or among a plurality of data assets utilized by a corporation or other entity (e.g., individual, organization, etc.) in the context, for example, of one or more business processes. In particular embodiments, each of the plurality of data assets (e.g., data systems) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

Figure 4:
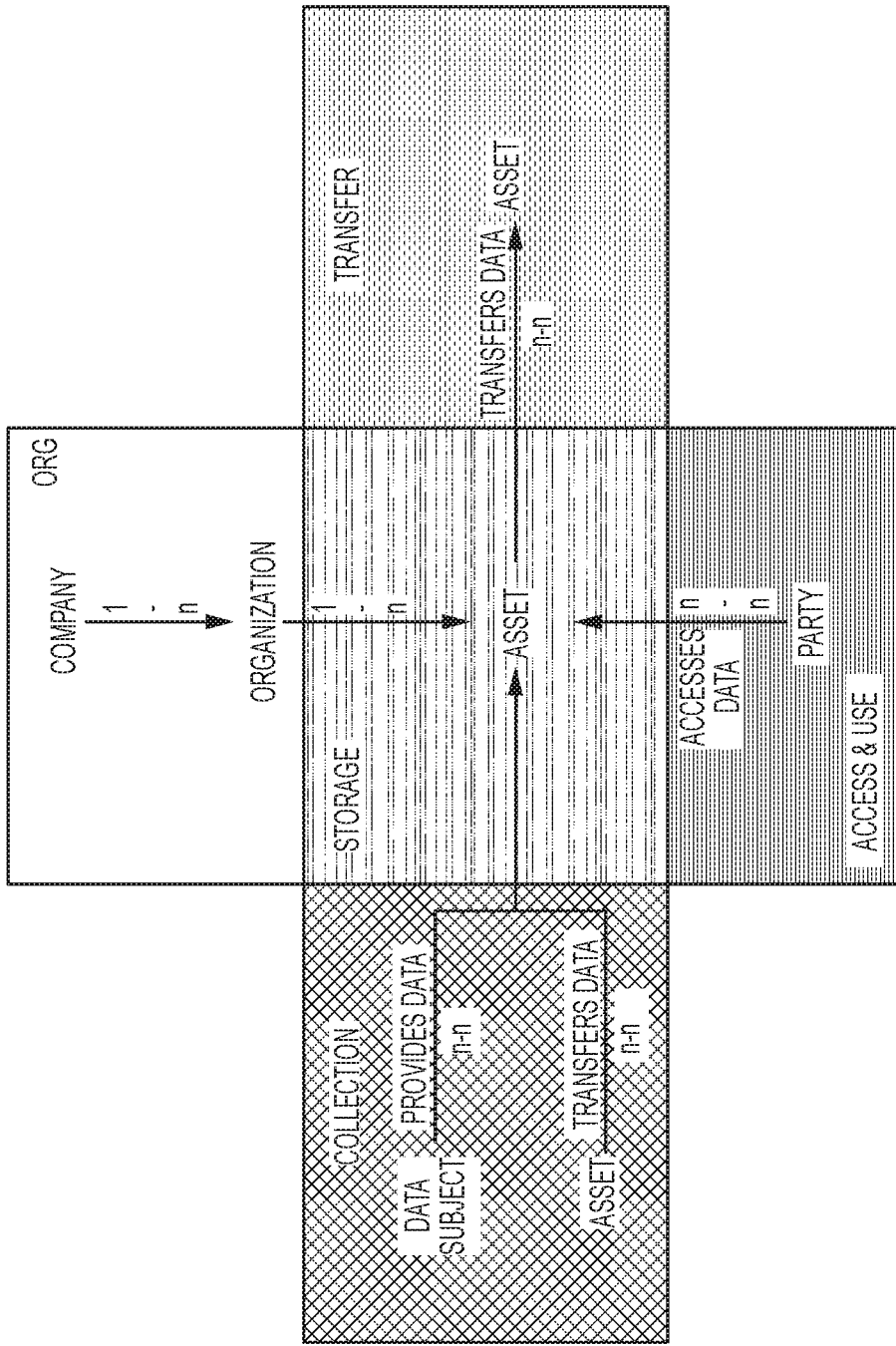
FIGS. 4-10 depict various exemplary visual representations of data models according to particular embodiments.
Figure 5:
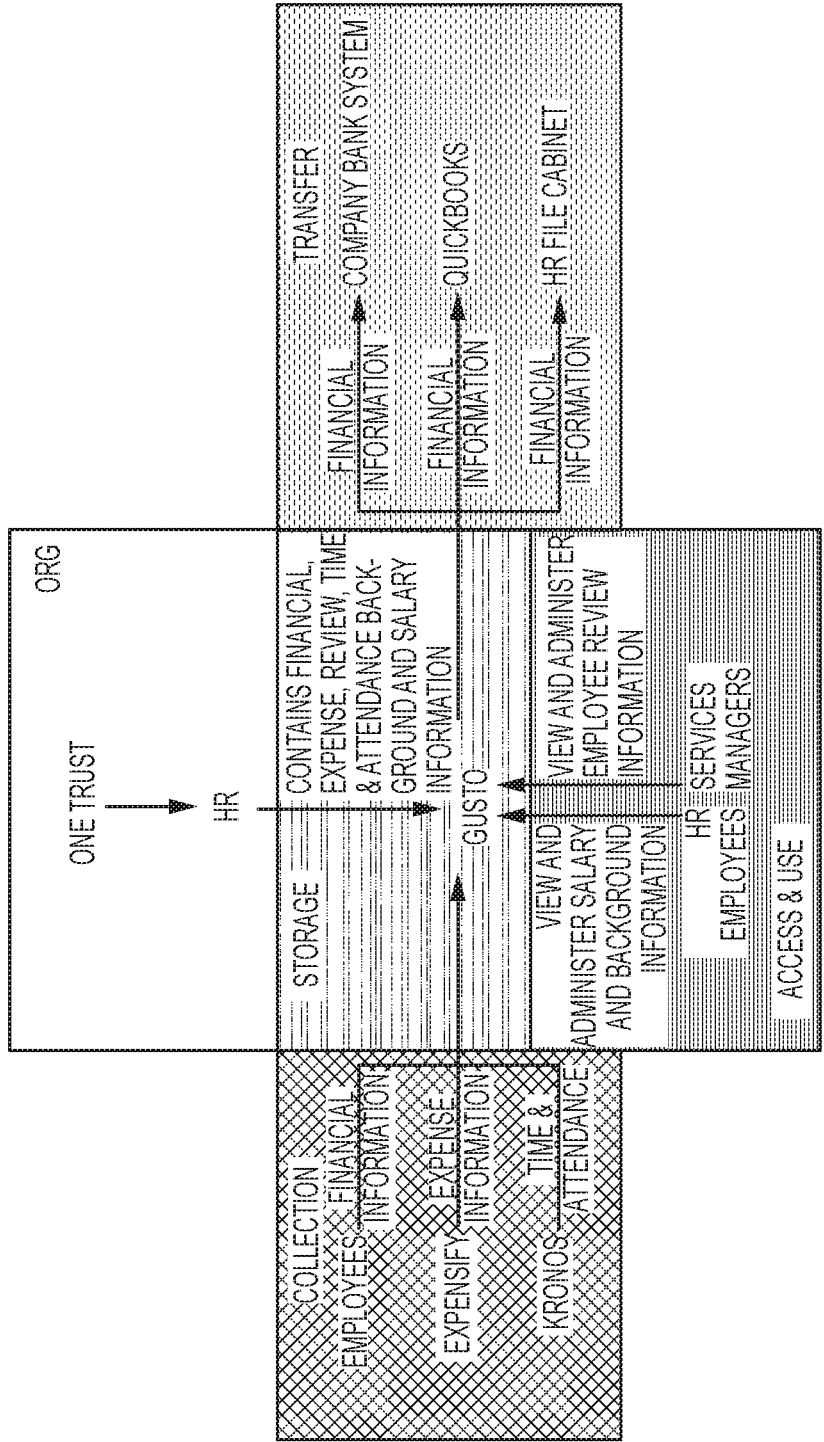
Figure 6:
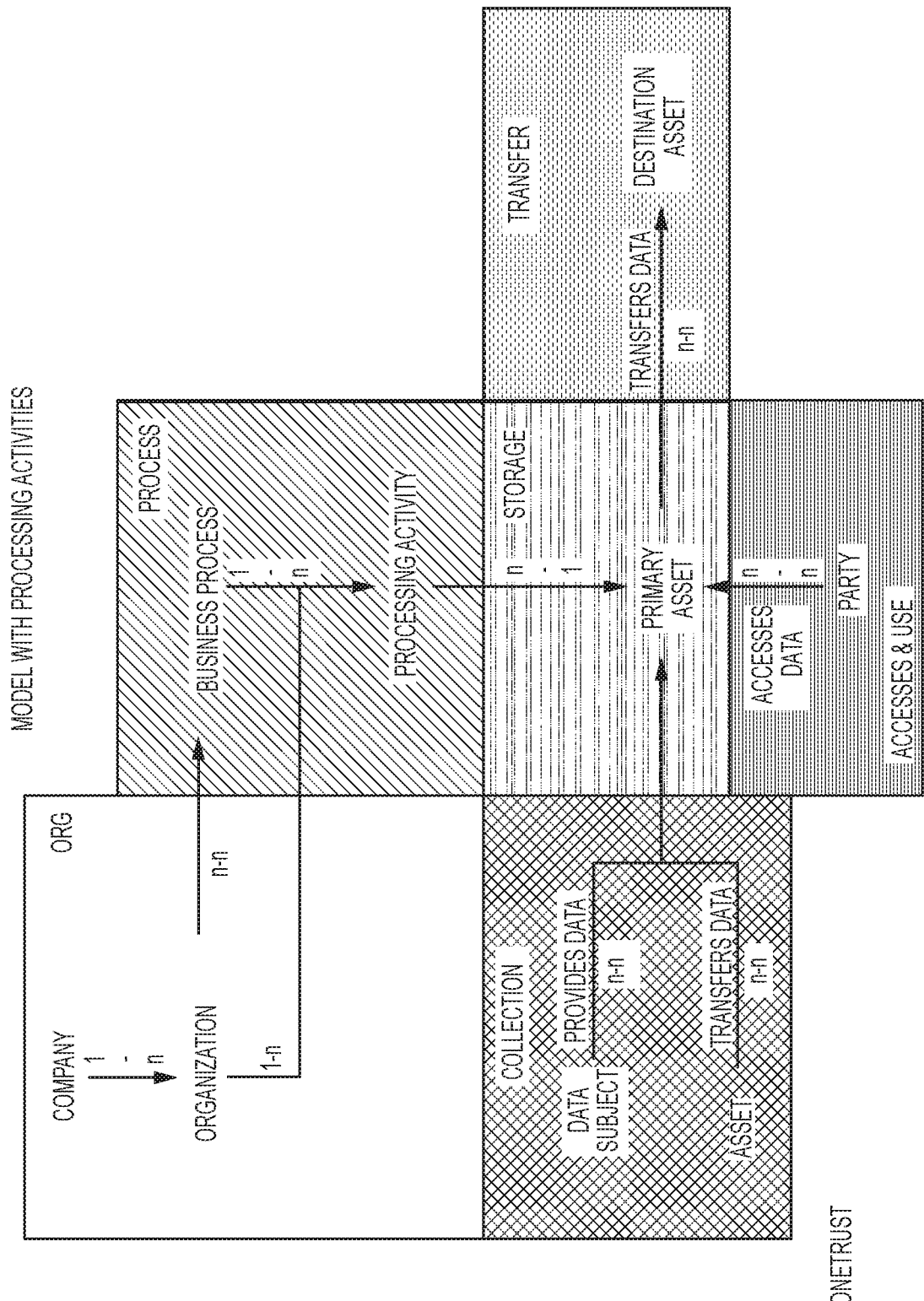
Figure 7:
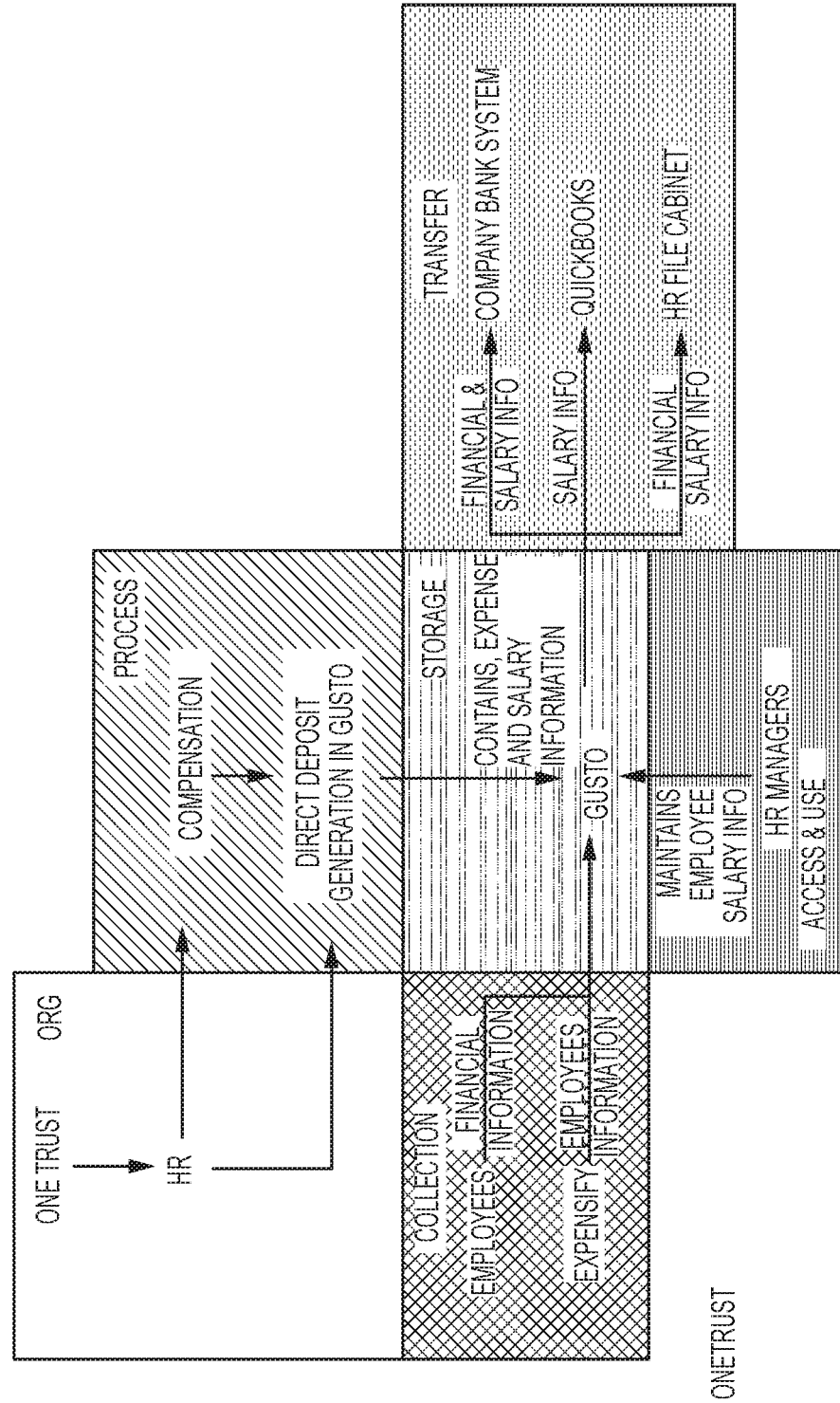

As shown in FIGS. 4 and 5, in various embodiments, the data model may store the following information: (1) the organization that owns and/or uses a particular data asset (a primary data asset, which is shown in the center of the data model in FIG. 4); (2) one or more departments within the organization that are responsible for the data asset; (3) one or more software applications that collect data (e.g., personal data) for storage in and/or use by the data asset (e.g., or one or more other suitable collection assets from which the personal data that is collected, processed, stored, etc. by the primary data asset is sourced); (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets. As shown in FIGS. 6 and 7, the system may also optionally store information regarding, for example, which business processes and processing activities utilize the data asset.

In particular embodiments, the data model stores this information for each of a plurality of different data assets and may include links between, for example, a portion of the model that provides information for a first particular data asset and a second portion of the model that provides information for a second particular data asset.

In various embodiments, the data model generation and population system may be implemented in the context of any suitable privacy management system that is configured to ensure compliance with one or more legal or industry standards related to the collection and/or storage of private information. In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in memory) of any personal data associated with one or more individuals. In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies).

In particular embodiments, when generating a data model, the system may, for example: (1) identify one or more data assets associated with a particular organization; (2) generate a data inventory for each of the one or more data assets, where the data inventory comprises information such as: (a) one or more processing activities associated with each of the one or more data assets, (b) transfer data associated with each of the one or more data assets (data regarding which data is transferred to/from each of the data assets, and which data assets, or individuals, the data is received from and/or transferred to, (c) personal data associated with each of the one or more data assets (e.g., particular types of data collected, stored, processed, etc. by the one or more data assets), and/or (d) any other suitable information; and (3) populate the data model using one or more suitable techniques.

In particular embodiments, the one or more techniques for populating the data model may include, for example: (1) obtaining information for the data model by using one or more questionnaires associated with a particular privacy campaign, processing activity, etc.; (2) using one or more intelligent identity scanning techniques discussed herein to identify personal data stored by the system and map such data to a suitable data model, data asset within a data model, etc.; (3) obtaining information for the data model from a third-party application (or other application) using one or more application programming interfaces (API); and/or (4) using any other suitable technique.

In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques described herein.

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. By generating and populating a data model of one or more data assets that are involved in the collection, storage and processing of such personal data, the system may be configured to create a data model that facilitates a straightforward retrieval of information stored by the organization as desired. For example, in various embodiments, the system may be configured to use a data model in substantially automatically responding to one or more data access requests by an individual (e.g., or other organization). In still other embodiments, such data model generation and population may improve the functionality of an entity's computing systems by enabling a more streamlined retrieval of data from the system and eliminating redundant storage of identical data. Various embodiments of a system for generating and populating a data model are described more fully below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
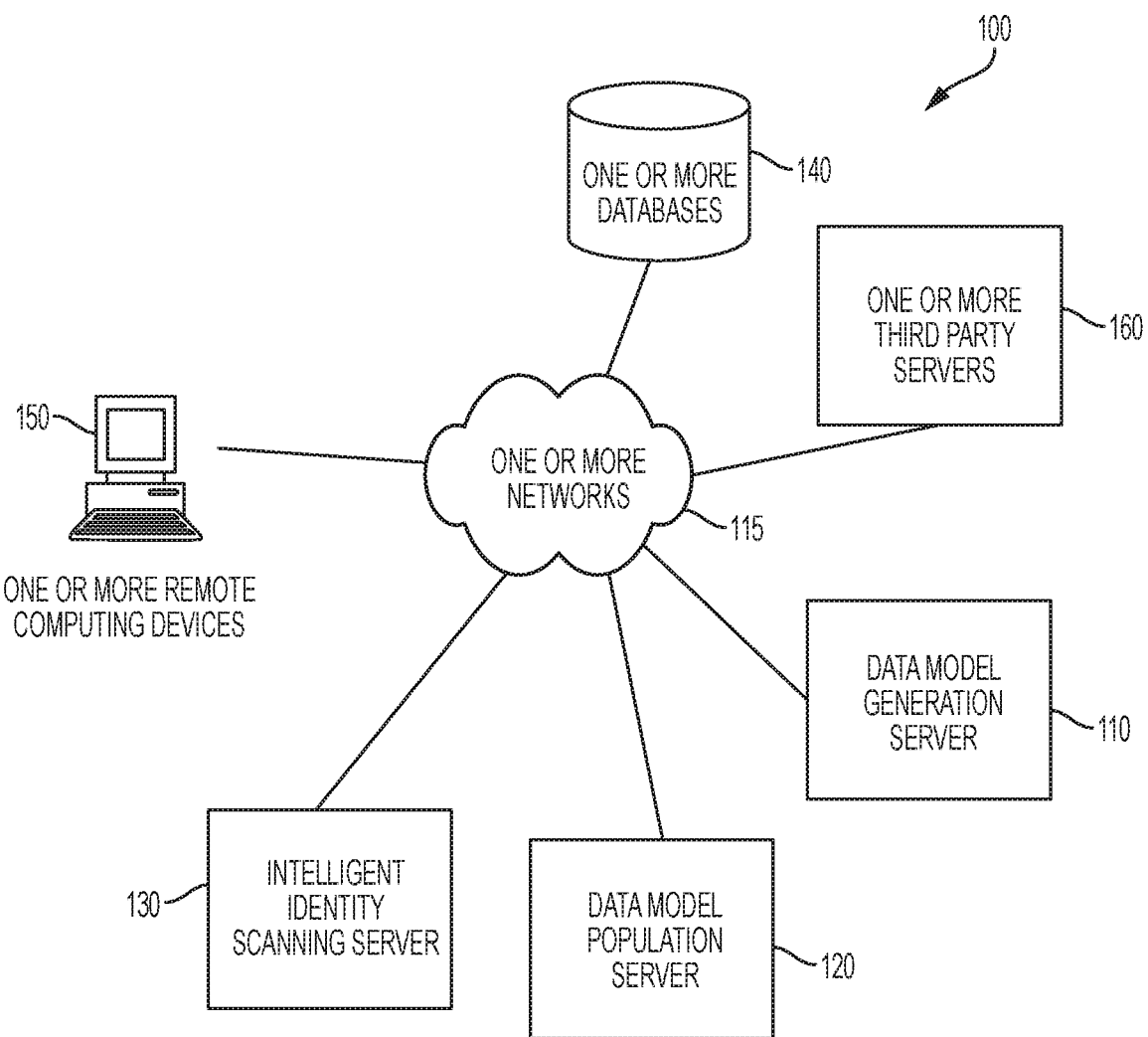
FIG. 1 depicts a data model generation and population system according to particular embodiments.

FIG. 1 is a block diagram of a Data Model Generation and Population System 100 according to a particular embodiment. In various embodiments, the Data Model Generation and Population System 100 is part of a privacy compliance system (also referred to as a privacy management system), or other system, which may, for example, be associated with a particular organization and be configured to aid in compliance with one or more legal or industry regulations related to the collection and storage of personal data. In some embodiments, the Data Model Generation and Population System 100 is configured to: (1) generate a data model based on one or more identified data assets, where the data model includes a data inventory associated with each of the one or more identified data assets; (2) identify populated and unpopulated aspects of each data inventory; and (3) populate the unpopulated aspects of each data inventory using one or more techniques such as intelligent identity scanning, questionnaire response mapping, APIs, etc.

As may be understood from FIG. 1, the Data Model Generation and Population System 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160 are shown as separate servers, it should be understood that in other embodiments, one or more of these servers and/or computing devices may comprise a single server, a plurality of servers, one or more cloud-based servers, or any other suitable configuration.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 2:
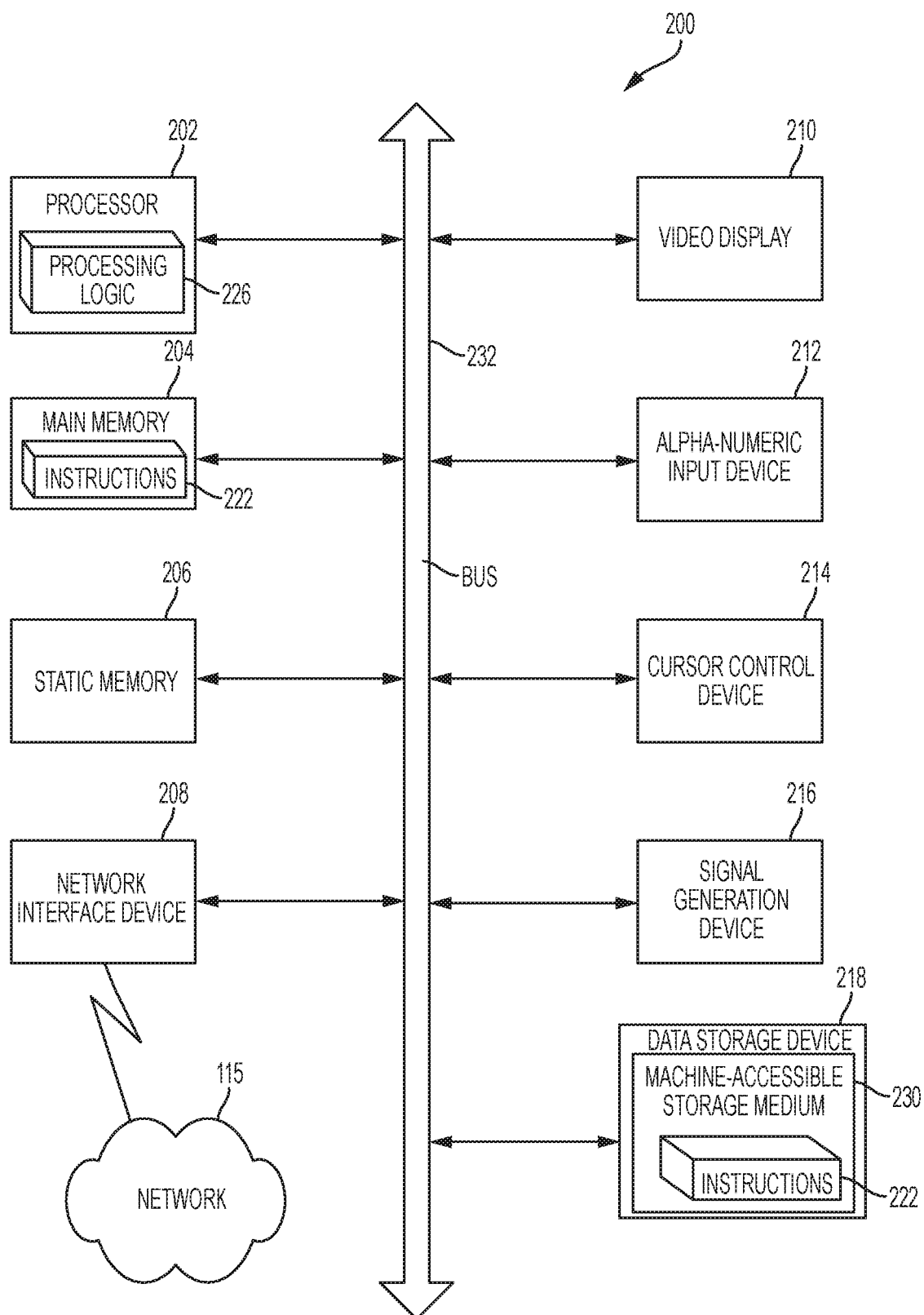
FIG. 2 is a schematic diagram of a computer (such as the data model generation server 110, or data model population server 120) that is suitable for use in various embodiments of the data model generation and population system shown in FIG. 1.

FIG. 2 illustrates a diagrammatic representation of a computer 200 that can be used within the Data Model Generation and Population System 100, for example, as a client computer (e.g., one or more remote computing devices 130 shown in FIG. 1), or as a server computer (e.g., Data Model Generation Server 110 shown in FIG. 1). In particular embodiments, the computer 200 may be suitable for use as a computer within the context of the Data Model Generation and Population System 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a Data Model Generation and Population System 100 may be implemented in the context of any suitable system (e.g., a privacy compliance system). For example, the Data Model Generation and Population System 100 may be implemented to analyze a particular company or other organization's data assets to generate a data model for one or more processing activities, privacy campaigns, etc. undertaken by the organization. In particular embodiments, the system may implement one or more modules in order to at least partially ensure compliance with one or more regulations (e.g., legal requirements) related to the collection and/or storage of personal data. Various aspects of the system's functionality may be executed by certain system modules, including a Data Model Generation Module 300, Data Model Population Module 1100, Data Population Questionnaire Generation Module 1200, Intelligent Identity Scanning Module 2600, and Data Subject Access Request Fulfillment Module 2900. These modules are discussed in greater detail below.

Although these modules are presented as a series of steps, it should be understood in light of this disclosure that various embodiments of the Data Model Generation Module 300, Data Model Population Module 1100, Data Population Questionnaire Generation Module 1200, Intelligent Identity Scanning Module 2600, and Data Subject Access Request Fulfillment Module 2900 described herein may perform the steps described below in an order other than in which they are presented. In still other embodiments, the Data Model Generation Module 300, Data Model Population Module 1100, Data Population Questionnaire Generation Module 1200, Intelligent Identity Scanning Module 2600, and Data Subject Access Request Fulfillment Module 2900 may omit certain steps described below. In various other embodiments, the Data Model Generation Module 300, Data Model Population Module 1100, Data Population Questionnaire Generation Module 1200, Intelligent Identity Scanning Module 2600, and Data Subject Access Request Fulfillment Module 2900 may perform steps in addition to those described (e.g., such as one or more steps described with respect to one or more other modules, etc.).

Data Model Generation Module

In particular embodiments, a Data Model Generation Module 300 is configured to: (1) generate a data model (e.g., a data inventory) for one or more data assets utilized by a particular organization; (2) generate a respective data inventory for each of the one or more data assets; and (3) map one or more relationships between one or more aspects of the data inventory, the one or more data assets, etc. within the data model. In particular embodiments, a data asset (e.g., data system, software application, etc.) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

In particular embodiments, a particular data asset, or collection of data assets, may be utilized as part of a particular data processing activity (e.g., direct deposit generation for payroll purposes). In various embodiments, a data model generation system may, on behalf of a particular organization (e.g., entity), generate a data model that encompasses a plurality of processing activities. In other embodiments, the system may be configured to generate a discrete data model for each of a plurality of processing activities undertaken by an organization.

Figure 3:
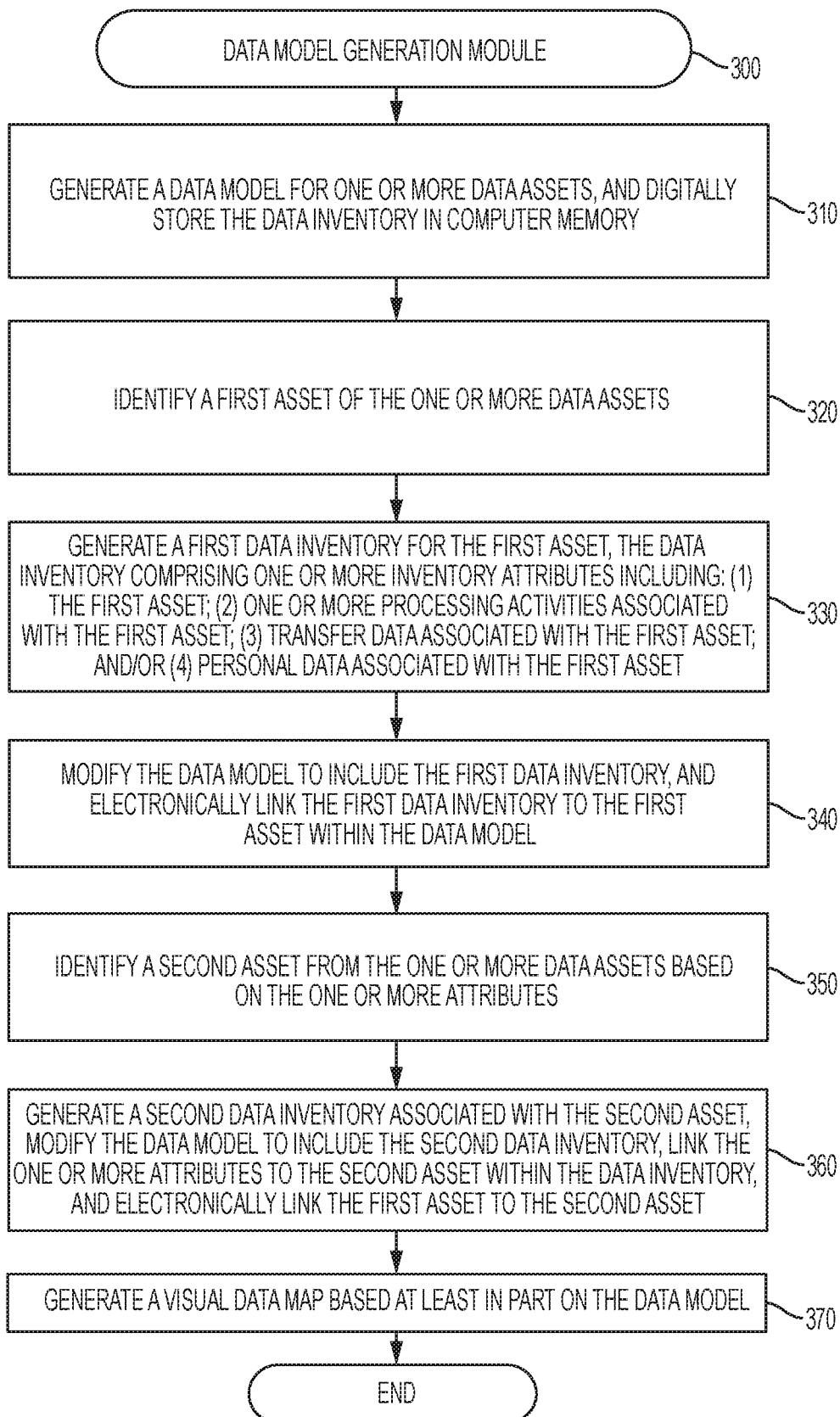
FIG. 3 is a flowchart showing an example of steps performed by a Data Model Generation Module according to particular embodiments.

Turning to FIG. 3, in particular embodiments, when executing the Data Model Generation Module 300, the system begins, at Step 310, by generating a data model for one or more data assets and digitally storing the data model in computer memory. The system may, for example, store the data model in the One or More Databases 140 described above (or any other suitable data structure). In various embodiments, generating the data model comprises generating a data structure that comprises information regarding one or more data assets, attributes and other elements that make up the data model. As may be understood in light of this disclosure, the one or more data assets may include any data assets that may be related to one another. In particular embodiments, the one or more data assets may be related by virtue of being associated with a particular entity (e.g., organization). For example, the one or more data assets may include one or more computer servers owned, operated, or utilized by the entity that at least temporarily store data sent, received, or otherwise processed by the particular entity.

In still other embodiments, the one or more data assets may comprise one or more third party assets which may, for example, send, receive and/or process personal data on behalf of the particular entity. These one or more data assets may include, for example, one or more software applications (e.g., such as Expensify to collect expense information, QuickBooks to maintain and store salary information, etc.).

Continuing to step 320, the system is configured to identify a first data asset of the one or more data assets. In particular embodiments, the first data asset may include, for example, any entity (e.g., system) that collects, processes, contains, and/or transfers data (e.g., such as a software application, "internet of things" computerized device, database, website, data-center, server, etc.). For example, the first data asset may include any software or device utilized by a particular organization for such data collection, processing, transfer, etc. In various embodiments, the first data asset may be associated with a particular processing activity (e.g., the first data asset may make up at least a part of a data flow that relates to the collection, storage, transfer, access, use, etc. of a particular piece of data (e.g., personal data)). Information regarding the first data asset may clarify, for example, one or more relationships between and/or among one or more other data assets within a particular organization. In a particular example, the first data asset may include a software application provided by a third party (e.g., a third party vendor) with which the particular entity interfaces for the purpose of collecting, storing, or otherwise processing personal data (e.g., personal data regarding customers, employees, potential customers, etc.).

In particular embodiments, the first data asset is a storage asset that may, for example: (1) receive one or more pieces of personal data form one or more collection assets; (2) transfer one or more pieces of personal data to one or more transfer assets; and/or (3) provide access to one or more pieces of personal data to one or more authorized individuals (e.g., one or more employees, managers, or other authorized individuals within a particular entity or organization). In a particular embodiment, the first data asset is a primary data asset associated with a particular processing activity around which the system is configured to build a data model associated with the particular processing activity.

In particular embodiments, the system is configured to identify the first data asset by scanning a plurality of computer systems associated with a particular entity (e.g., owned, operated, utilized, etc. by the particular entity). In various embodiments, the system is configured to identify the first data asset from a plurality of data assets identified in response to completion, by one or more users, of one or more questionnaires.

Advancing to Step 330, the system generates a first data inventory of the first data asset. The data inventory may comprise, for example, one or more inventory attributes associated with the first data asset such as, for example: (1) one or more processing activities associated with the first data asset; (2) transfer data associated with the first data asset (e.g., how and where the data is being transferred to and/or from); (3) personal data associated with the first data asset (e.g., what type of personal data is collected and/or stored by the first data asset; how, and from where, the data is collected, etc.); (4) storage data associated with the personal data (e.g., whether the data is being stored, protected and deleted); and (5) any other suitable attribute related to the collection, use, and transfer of personal data. In other embodiments, the one or more inventory attributes may comprise one or more other pieces of information such as, for example: (1) the type of data being stored by the first data asset; (2) an amount of data stored by the first data asset; (3) whether the data is encrypted; (4) a location of the stored data (e.g., a physical location of one or more computer servers on which the data is stored); etc. In particular other embodiments, the one or more inventory attributes may comprise one or more pieces of information technology data related to the first data asset (e.g., such as one or more pieces of network and/or infrastructure information, IP address, MAC address, etc.).

In various embodiments, the system may generate the data inventory based at least in part on the type of first data asset. For example, particular types of data assets may have particular default inventory attributes. In such embodiments, the system is configured to generate the data inventory for the first data asset, which may, for example, include one or more placeholder fields to be populated by the system at a later time. In this way, the system may, for example, identify particular inventory attributes for a particular data asset for which information and/or population of data is required as the system builds the data model.

As may be understood in light of this disclosure, the system may, when generating the data inventory for the first data asset, generate one or more placeholder fields that may include, for example: (1) the organization (e.g., entity) that owns and/or uses the first data asset (a primary data asset, which is shown in the center of the data model in FIG. 4); (2) one or more departments within the organization that are responsible for the first data asset; (3) one or more software applications that collect data (e.g., personal data) for storage in and/or use by the first data asset (e.g., or one or more other suitable collection assets from which the personal data that is collected, processed, stored, etc. by the first data asset is sourced); (4) one or more particular data subjects (or categories of data subjects) that information is collected from for use by the first data asset; (5) one or more particular types of data that are collected by each of the particular applications for storage in and/or use by the first data asset; (6) one or more individuals (e.g., particular individuals or types of individuals) that are permitted to access and/or use the data stored in, or used by, the first data asset; (7) which particular types of data each of those individuals are allowed to access and use; and (8) one or more data assets (destination assets) that the data is transferred to from the first data asset, and which particular data is transferred to each of those data assets.

As may be understood in light of this disclosure, the system may be configured to generate the one or more placeholder fields based at least in part on, for example: (1) the type of the first data asset; (2) one or more third party vendors utilized by the particular organization; (3) a number of collection or storage assets typically associated with the type of the first data asset; and/or (4) any other suitable factor related to the first data asset, its one or more inventory attributes, etc. In other embodiments, the system may substantially automatically generate the one or more placeholders based at least in part on a hierarchy and/or organization of the entity for which the data model is being built. For example, a particular entity may have a marketing division, legal department, human resources department, engineering division, or other suitable combination of departments that make up an overall organization. Other particular entities may have further subdivisions within the organization. When generating the data inventory for the first data asset, the system may identify that the first data asset will have both an associated organization and subdivision within the organization to which it is assigned. In this example, the system may be configured to store an indication in computer memory that the first data asset is associated with an organization and a department within the organization.

Next, at Step 340, the system modifies the data model to include the first data inventory and electronically links the first data inventory to the first data asset within the data model. In various embodiments, modifying the data model may include configuring the data model to store the data inventory in computer memory, and to digitally associate the data inventory with the first data asset in memory.

FIGS. 4 and 5 show a data model according to a particular embodiment. As shown in these figures, the data model may store the following information for the first data asset: (1) the organization that owns and/or uses the first data asset; (2) one or more departments within the organization that are responsible for the first data asset; (3) one or more applications that collect data (e.g., personal data) for storage in and/or use by the first data asset; (4) one or more particular data subjects that information is collected from for use by the first data asset; (5) one or more collection assets from which the first asset receives data (e.g., personal data); (6) one or more particular types of data that are collected by each of the particular applications (e.g., collection assets) for storage in and/or use by the first data asset; (7) one or more individuals (e.g., particular individuals, types of individuals, or other parties) that are permitted to access and/or use the data stored in or used by the first data asset; (8) which particular types of data each of those individuals are allowed to access and use; and (9) one or more data assets (destination assets) the data is transferred to for other use, and which particular data is transferred to each of those data assets. As shown in FIGS. 6 and 7, the system may also optionally store information regarding, for example, which business processes and processing activities utilize the first data asset.

As noted above, in particular embodiments, the data model stores this information for each of a plurality of different data assets and may include one or more links between, for example, a portion of the model that provides information for a first particular data asset and a second portion of the model that provides information for a second particular data asset.

Advancing to Step 350, the system next identifies a second data asset from the one or more data assets. In various embodiments, the second data asset may include one of the one or more inventory attributes associated with the first data asset (e.g., the second data asset may include a collection asset associated with the first data asset, a destination asset or transfer asset associated with the first data asset, etc.). In various embodiments, as may be understood in light of the exemplary data models described below, a second data asset may be a primary data asset for a second processing activity, while the first data asset is the primary data asset for a first processing activity. In such embodiments, the second data asset may be a destination asset for the first data asset as part of the first processing activity. The second data asset may then be associated with one or more second destination assets to which the second data asset transfers data. In this way, particular data assets that make up the data model may define one or more connections that the data model is configured to map and store in memory.

Returning to Step 360, the system is configured to identify one or more attributes associated with the second data asset, modify the data model to include the one or more attributes, and map the one or more attributes of the second data asset within the data model. The system may, for example, generate a second data inventory for the second data asset that comprises any suitable attribute described with respect to the first data asset above. The system may then modify the data model to include the one or more attributes and store the modified data model in memory. The system may further, in various embodiments, associate the first and second data assets in memory as part of the data model. In such embodiments, the system may be configured to electronically link the first data asset with the second data asset. In various embodiments, such association may indicate a relationship between the first and second data assets in the context of the overall data model (e.g., because the first data asset may serve as a collection asset for the second data asset, etc.).

Next, at Step 370, the system may be further configured to generate a visual representation of the data model. In particular embodiments, the visual representation of the data model comprises a data map. The visual representation may, for example, include the one or more data assets, one or more connections between the one or more data assets, the one or more inventory attributes, etc.

In particular embodiments, generating the visual representation (e.g., visual data map) of a particular data model (e.g., data inventory) may include, for example, generating a visual representation that includes: (1) a visual indication of a first data asset (e.g., a storage asset), a second data asset (e.g., a collection asset), and a third data asset (e.g., a transfer asset); (2) a visual indication of a flow of data (e.g., personal data) from the second data asset to the first data asset (e.g., from the collection asset to the storage asset); (3) a visual indication of a flow of data (e.g., personal data) from the first data asset to the third data asset (e.g., from the storage asset to the transfer asset); (4) one or more visual indications of a risk level associated with the transfer of personal data; and/or (5) any other suitable information related to the one or more data assets, the transfer of data between/among the one or more data assets, access to data stored or collected by the one or more data assets, etc.

In particular embodiments, the visual indication of a particular asset may comprise a box, symbol, shape, or other suitable visual indicator. In particular embodiments, the visual indication may comprise one or more labels (e.g., a name of each particular data asset, a type of the asset, etc.). In still other embodiments, the visual indication of a flow of data may comprise one or more arrows. In particular embodiments, the visual representation of the data model may comprise a data flow, flowchart, or other suitable visual representation.

In various embodiments, the system is configured to display (e.g., to a user) the generated visual representation of the data model on a suitable display device.

Exemplary Data Models and Visual Representations of Data Models (e.g., Data Maps)

FIGS. 4-10 depict exemplary data models according to various embodiments of the system described herein. FIG. 4, for example, depicts an exemplary data model that does not include a particular processing activity (e.g., that is not associated with a particular processing activity). As may be understood from the data model shown in this figure, a particular data asset (e.g., a primary data asset) may be associated with a particular company (e.g., organization), or organization within a particular company, sub-organization of a particular organization, etc. In still other embodiments, the particular asset may be associated with one or more collection assets (e.g., one or more data subjects from whom personal data is collected for storage by the particular asset), one or more parties that have access to data stored by the particular asset, one or more transfer assets (e.g., one or more assets to which data stored by the particular asset may be transferred), etc.

As may be understood from FIG. 4, a particular data model for a particular asset may include a plurality of data elements. When generating the data model for the particular asset, a system may be configured to substantially automatically identify one or more types of data elements for inclusion in the data model, and automatically generate a data model that includes those identified data elements (e.g., even if one or more of those data elements must remain unpopulated because the system may not initially have access to a value for the particular data element). In such cases, the system may be configured to store a placeholder for a particular data element until the system is able to populate the particular data element with accurate data.

As may be further understood from FIG. 4, the data model shown in FIG. 4 may represent a portion of an overall data model. For example, in the embodiment shown in this figure, the transfer asset depicted may serve as a storage asset for another portion of the data model. In such embodiments, the transfer asset may be associated with a respective one or more of the types of data elements described above. In this way, the system may generate a data model that may build upon itself to comprise a plurality of layers as the system adds one or more new data assets, attributes, etc.

As may be further understood from FIG. 4, a particular data model may indicate one or more parties that have access to and/or use of the primary asset (e.g., storage asset). In such embodiments, the system may be configured to enable the one or more parties to access one or more pieces of data (e.g., personal data) stored by the storage asset.

As shown in FIG. 4, the data model may further comprise one or more collection assets (e.g., one or more data assets or individuals from which the storage asset receives data such as personal data). In the exemplary data model (e.g., visual data map) shown in this figure, the collection assets comprise a data subject (e.g., an individual that may provide data to the system for storage in the storage asset) and a collection asset (e.g., which may transfer one or more pieces of data that the collection asset has collected to the storage asset).

FIG. 5 depicts a portion of an exemplary data model that is populated for the primary data asset Gusto. Gusto is a software application that, in the example shown in FIG. 5, may serve as a human resources service that contains financial, expense, review, time and attendance, background, and salary information for one or more employees of a particular organization (e.g., GeneriTech). In the example of FIG. 5, the primary asset (e.g., Gusto) may be utilized by the HR (e.g., Human Resources) department of the particular organization (e.g., GeneriTech). Furthermore, the primary asset, Gusto, may collect financial information from one or more data subjects (e.g., employees of the particular organization), receive expense information transferred from Expensify (e.g., expensing software), and receive time and attendance data transferred from Kronos (e.g., timekeeping software). In the example shown in FIG. 5, access to the information collected and/or stored by Gusto may include, for example: (1) an ability to view and administer salary and background information by HR employees, and (2) an ability to view and administer employee review information by one or more service managers. In the example shown in this figure, personal and other data collected and stored by Gusto (e.g., salary information, etc.) may be transferred to a company banking system, to QuickBooks, and/or to an HR file cabinet.

As may be understood from the example shown in FIG. 5, the system may be configured to generate a data model based around Gusto that illustrates a flow of personal data utilized by Gusto. The data model in this example illustrates, for example, a source of personal data collected, stored and/or processed by Gusto, a destination of such data, an indication of who has access to such data within Gusto, and an organization and department responsible for the information collected by Gusto. In particular embodiments, the data model and accompanying visual representation (e.g., data map) generated by the system as described in any embodiment herein may be utilized in the context of compliance with one or more record keeping requirements related to the collection, storage, and processing of personal data.

FIGS. 6 and 7 depict an exemplary data model and related example that is similar, in some respects, to the data model and example of FIGS. 4 and 5. In the example shown in FIGS. 6 and 7, the exemplary data model and related example include a specific business process and processing activity that is associated with the primary asset (Gusto). In this example, the business process is compensation and the specific processing activity is direct deposit generation in Gusto. As may be understood from this figure, the collection and transfer of data related to the storage asset of Gusto is based on a need to generate direct deposits through Gusto in order to compensate employees. Gusto generates the information needed to conduct a direct deposit (e.g., financial and salary information) and then transmits this information to: (1) a company bank system for execution of the direct deposit; (2) Quickbooks for use in documenting the direct deposit payment; and (3) HR File cabinet for use in documenting the salary info and other financial information.

As may be understood in light of this disclosure, when generating such a data model, particular pieces of data (e.g., data attributes, data elements) may not be readily available to the system. In such embodiment, the system is configured to identify a particular type of data, create a placeholder for such data in memory, and seek out (e.g., scan for and populate) an appropriate piece of data to further populate the data model. For example, in particular embodiments, the system may identify Gusto as a primary asset and recognize that Gusto stores expense information. The system may then be configured to identify a source of the expense information (e.g., Expensify).

Figure 8:
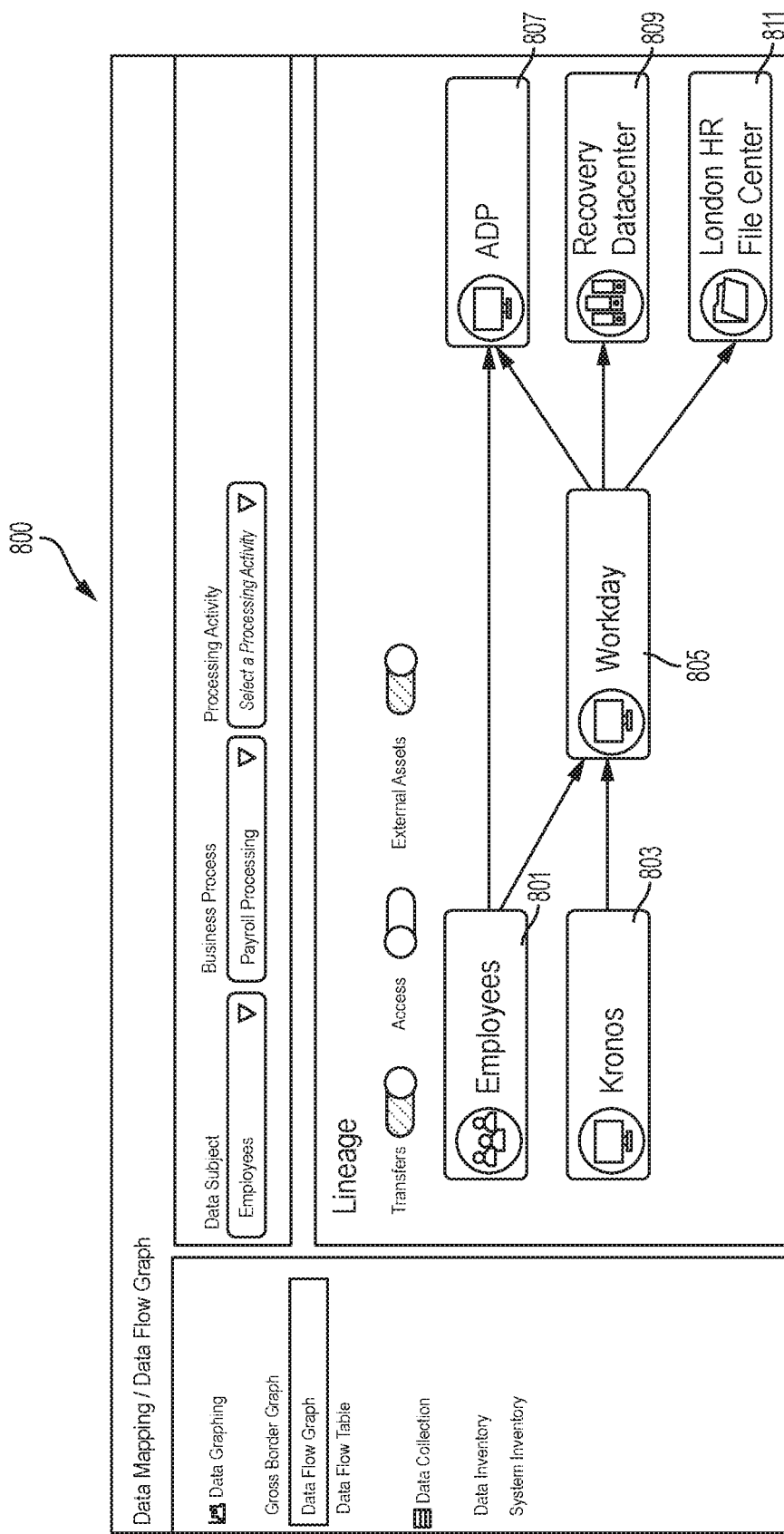

FIG. 8 depicts an exemplary screen display 800 that illustrates a visual representation (e.g., visual data map) of a data model (e.g., a data inventory). In the example shown in FIG. 8, the data map provides a visual indication of a flow of data collected from particular data subjects (e.g., employees 801). As may be understood from this figure, the data map illustrates that three separate data assets receive data (e.g., which may include personal data) directly from the employees 801. In this example, these three data assets include Kronos 803 (e.g., a human resources software application), Workday 805 (e.g., a human resources software application), and ADP 807 (e.g., a human resources software application and payment processor). As shown in FIG. 8, the transfer of data from the employees 801 to these assets is indicated by respective arrows.

As further illustrated in FIG. 8, the data map indicates a transfer of data from Workday 805 to ADP 807 as well as to a Recovery Datacenter 809 and a London HR File Center 811. As may be understood in light of this disclosure, the Recovery Datacenter 809 and London HR File Center 811 may comprise additional data assets in the context of the data model illustrated by the data map shown in FIG. 8. The Recover Datacenter 809 may include, for example, one or more computer servers (e.g., backup servers). The London HR File Center 811 may include, for example, one or more databases (e.g., such as the One or More Databases 140 shown in FIG. 1). AS shown in FIG. 8, each particular data asset depicted in the data map may be shown along with a visual indication of the type of data asset. For example, Kronos 803, Workday 805, and ADP 807 are depicted adjacent a first icon type (e.g., a computer monitor), while Recover Datacenter 809 and London HR File Center 811 are depicted adjacent a second and third icon type respectively (e.g., a server cluster and a file folder). In this way, the system may be configured to visually indicate, via the data model, particular information related to the data model in a relatively minimal manner.

Figure 9:
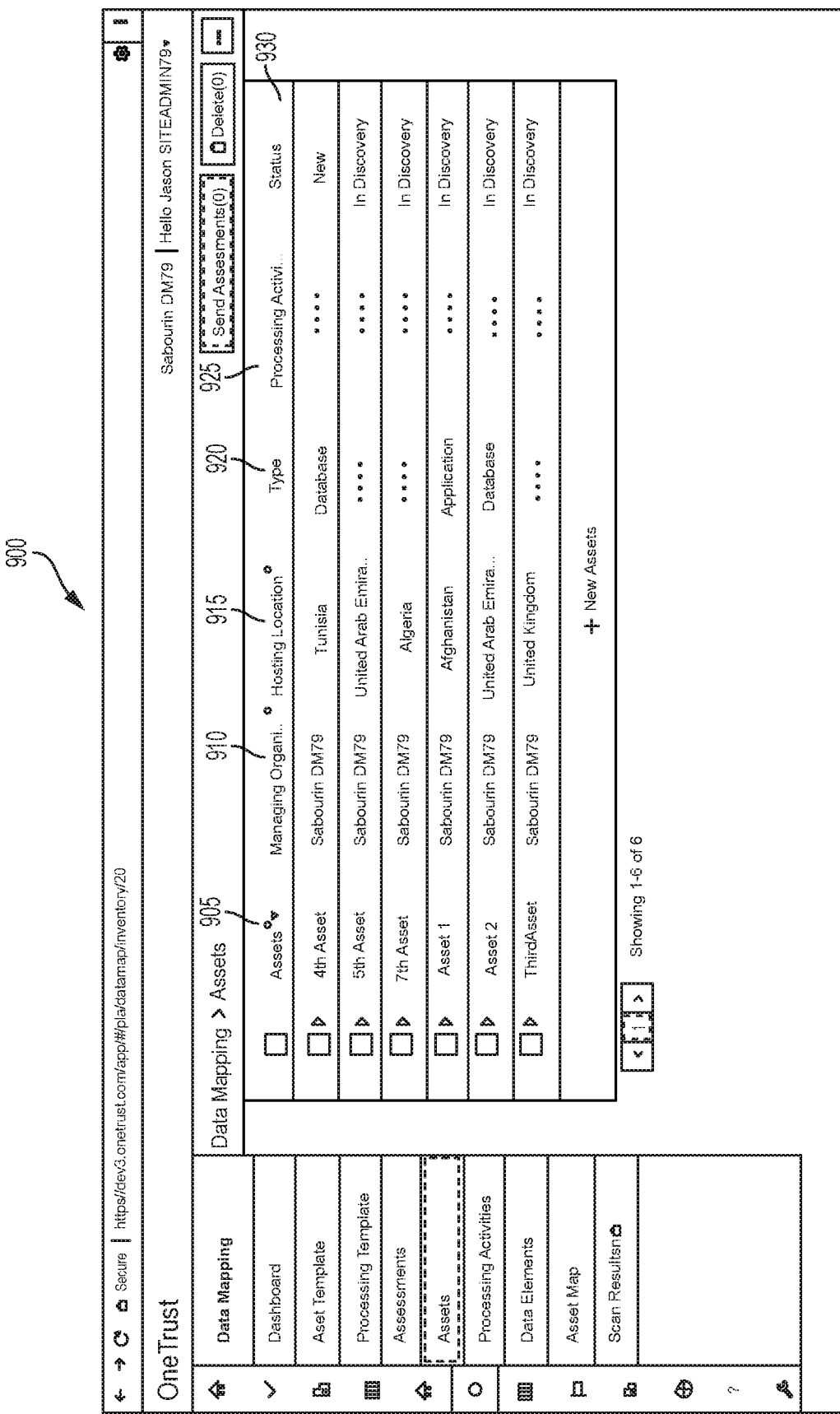

FIG. 9 depicts an exemplary screen display 900 that illustrates a data map of a plurality of assets 905 in tabular form (e.g., table form). As may be understood from this figure, a table that includes one or more inventory attributes of each particular asset 905 in the table may indicate, for example: (1) a managing organization 910 of each respective asset 905; (2) a hosting location 915 of each respective asset 905 (e.g., a physical storage location of each asset 905); (3) a type 920 of each respective asset 905, if known (e.g., a database, software application, server, etc.); (4) a processing activity 925 associated with each respective asset 905; and/or (5) a status 930 of each particular data asset 905. In various embodiments, the status 930 of each particular asset 905 may indicate a status of the asset 905 in the discovery process. This may include, for example: (1) a "new" status for a particular asset that has recently been discovered as an asset that processes, stores, or collects personal data on behalf of an organization (e.g., discovered via one or more suitable techniques described herein); (2) an "in discovery" status for a particular asset for which the system is populating or seeking to populate one or more inventory attributes, etc.

Figure 10:
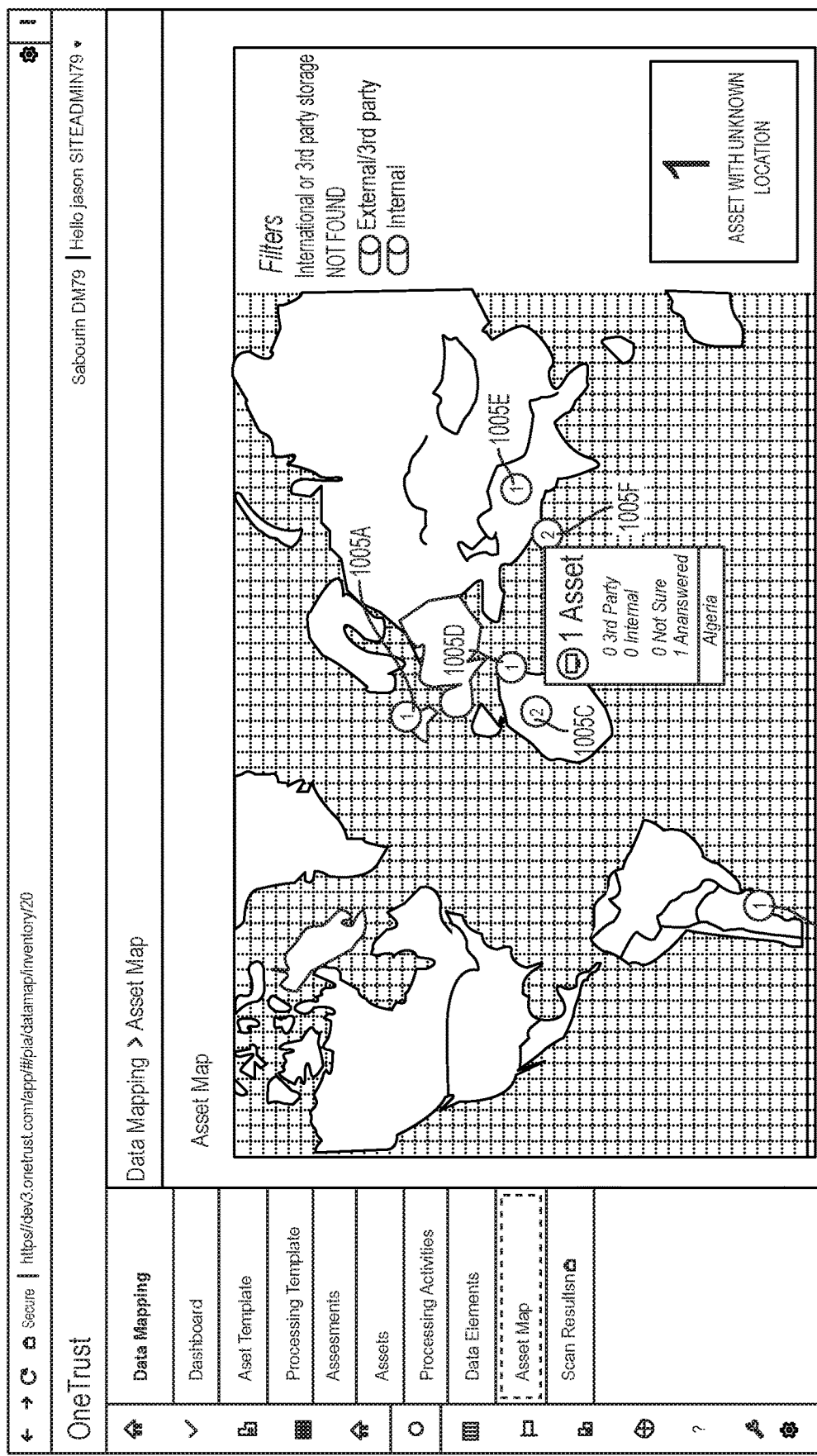

FIG. 10 depicts an exemplary data map 1000 that includes an asset map of a plurality of data assets 1005A-F, which may, for example, be utilized by a particular entity in the collection, storage, and/or processing of personal data. As may be understood in light of this disclosure, the plurality of data assets 1005A-F may have been discovered using any suitable technique described herein (e.g., one or more intelligent identity scanning techniques, one or more questionnaires, one or more application programming interfaces, etc.). In various embodiments, a data inventory for each of the plurality of data assets 1005A-F may define, for each of the plurality of data assets 1005A-F a respective inventory attribute related to a storage location of the data asset.

As may be understood from this figure, the system may be configured to generate a map that indicates a location of the plurality of data assets 1005A-F for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers or software applications that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data modeling techniques described herein to determine the location (e.g., such as pinging the asset, generating one or more questionnaires for completion by a suitable individual, etc.); and (3) update a data model associated with the asset to include the location.

Data Model Population Module

In particular embodiments, a Data Model Population Module 1100 is configured to: (1) determine one or more unpopulated inventory attributes in a data model; (2) determine one or more attribute values for the one or more unpopulated inventory attributes; and (3) modify the data model to include the one or more attribute values.

Figure 11:
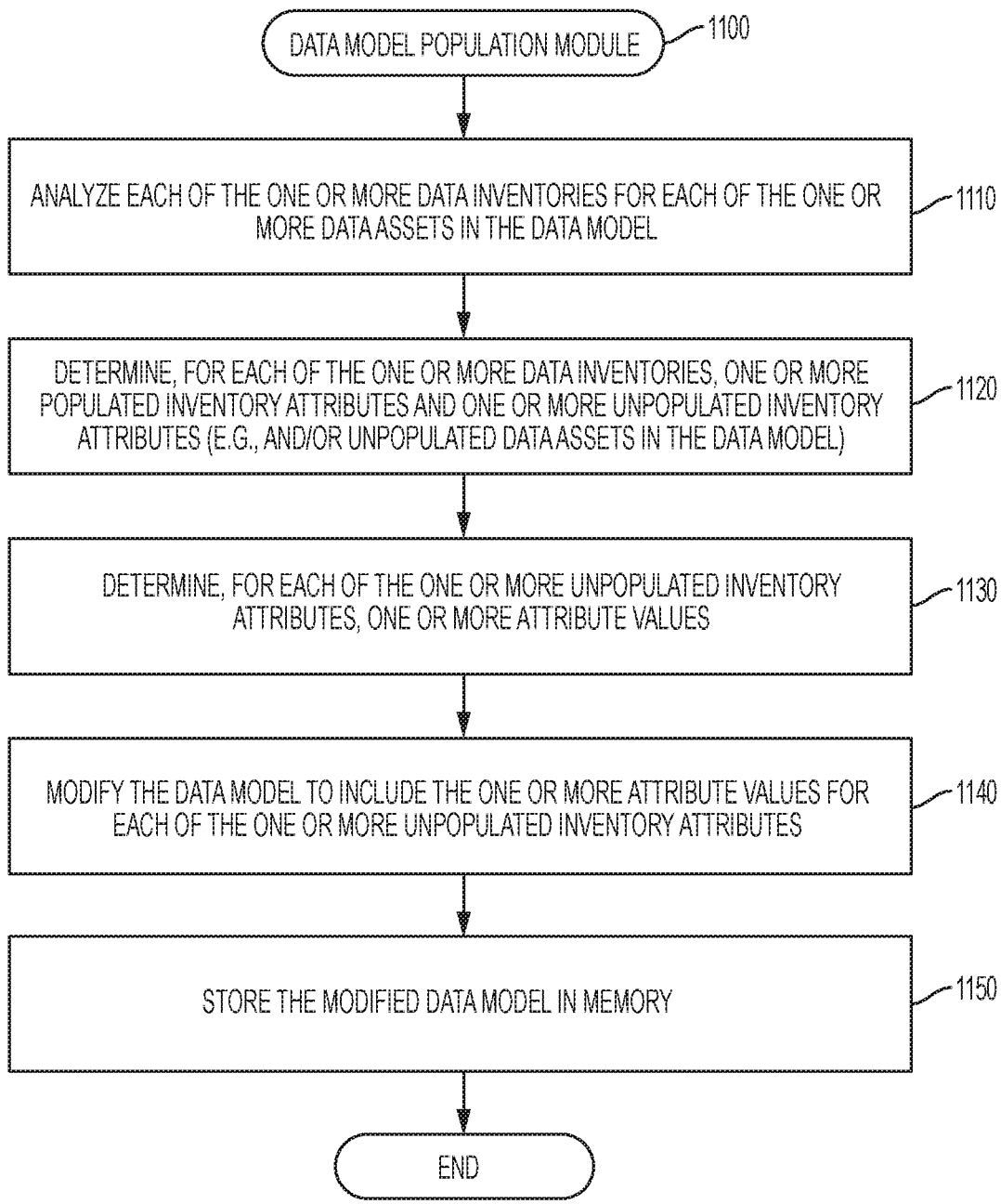
FIG. 11 is a flowchart showing an example of steps performed by a Data Model Population Module.

Turning to FIG. 11, in particular embodiments, when executing the Data Model Population Module 1100, the system begins, at Step 1110, by analyzing one or more data inventories for each of the one or more data assets in the data model. The system may, for example, identify one or more particular data elements (e.g., inventory attributes) that make up the one or more data inventories. The system may, in various embodiments, scan one or more data structures associated with the data model to identify the one or more data inventories. In various embodiments, the system is configured to build an inventory of existing (e.g., known) data assets and identify inventory attributes for each of the known data assets.

Continuing to Step 1120, the system is configured to determine, for each of the one or more data inventories, one or more populated inventory attributes and one or more unpopulated inventory attributes (e.g., and/or one or more unpopulated data assets within the data model). As a particular example related to an unpopulated data asset, when generating and populating a data model, the system may determine that, for a particular asset, there is a destination asset. In various embodiments, the destination asset may be known (e.g., and already stored by the system as part of the data model). In other embodiments, the destination asset may be unknown (e.g., a data element that comprises the destination asset may comprise a placeholder or other indication in memory for the system to populate the unpopulated inventory attribute (e.g., data element).

As another particular example, a particular storage asset may be associated with a plurality of inventory assets (e.g., stored in a data inventory associated with the storage asset). In this example, the plurality of inventory assets may include an unpopulated inventory attribute related to a type of personal data stored in the storage asset. The system may, for example, determine that the type of personal data is an unpopulated inventory asset for the particular storage asset.

Returning to Step 1130, the system is configured to determine, for each of the one or more unpopulated inventory attributes, one or more attribute values. In particular embodiments, the system may determine the one or more attribute values using any suitable technique (e.g., any suitable technique for populating the data model). In particular embodiments, the one or more techniques for populating the data model may include, for example: (1) obtaining data for the data model by using one or more questionnaires associated with a particular privacy campaign, processing activity, etc.; (2) using one or more intelligent identity scanning techniques discussed herein to identify personal data stored by the system and then map such data to a suitable data model; (3) using one or more application programming interfaces (API) to obtain data for the data model from another software application; and/or (4) using any other suitable technique. Exemplary techniques for determining the one or more attribute values are described more fully below. In other embodiments, the system may be configured to use such techniques or other suitable techniques to populate one or more unpopulated data assets within the data model.

Next, at Step 1140, the system modifies the data model to include the one or more attribute values for each of the one or more unpopulated inventory attributes. The system may, for example, store the one or more attributes values in computer memory, associate the one or more attribute values with the one or more unpopulated inventory attributes, etc. In still other embodiments, the system may modify the data model to include the one or more data assets identified as filling one or more vacancies left within the data model by the unpopulated one or more data assets.

Continuing to Step 1150, the system is configured to store the modified data model in memory. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Data Model Population Questionnaire Generation Module

In particular embodiments, a Data Population Questionnaire Generation Module 1200 is configured to generate a questionnaire (e.g., one or more questionnaires) comprising one or more questions associated with one or more particular unpopulated data attributes, and populate the unpopulated data attributes based at least in part on one or more responses to the questionnaire. In other embodiments, the system may be configured to populate the unpopulated data attributes based on one or more responses to existing questionnaires.

In various embodiments, the one or more questionnaires may comprise one or more processing activity questionnaires (e.g., privacy impact assessments, data privacy impact assessments, etc.) configured to elicit one or more pieces of data related to one or more undertakings by an organization related to the collection, storage, and/or processing of personal data (e.g., processing activities). In particular embodiments, the system is configured to generate the questionnaire (e.g., a questionnaire template) based at least in part on one or more processing activity attributes, data asset attributes (e.g., inventory attributes), or other suitable attributes discussed herein.

Figure 12:
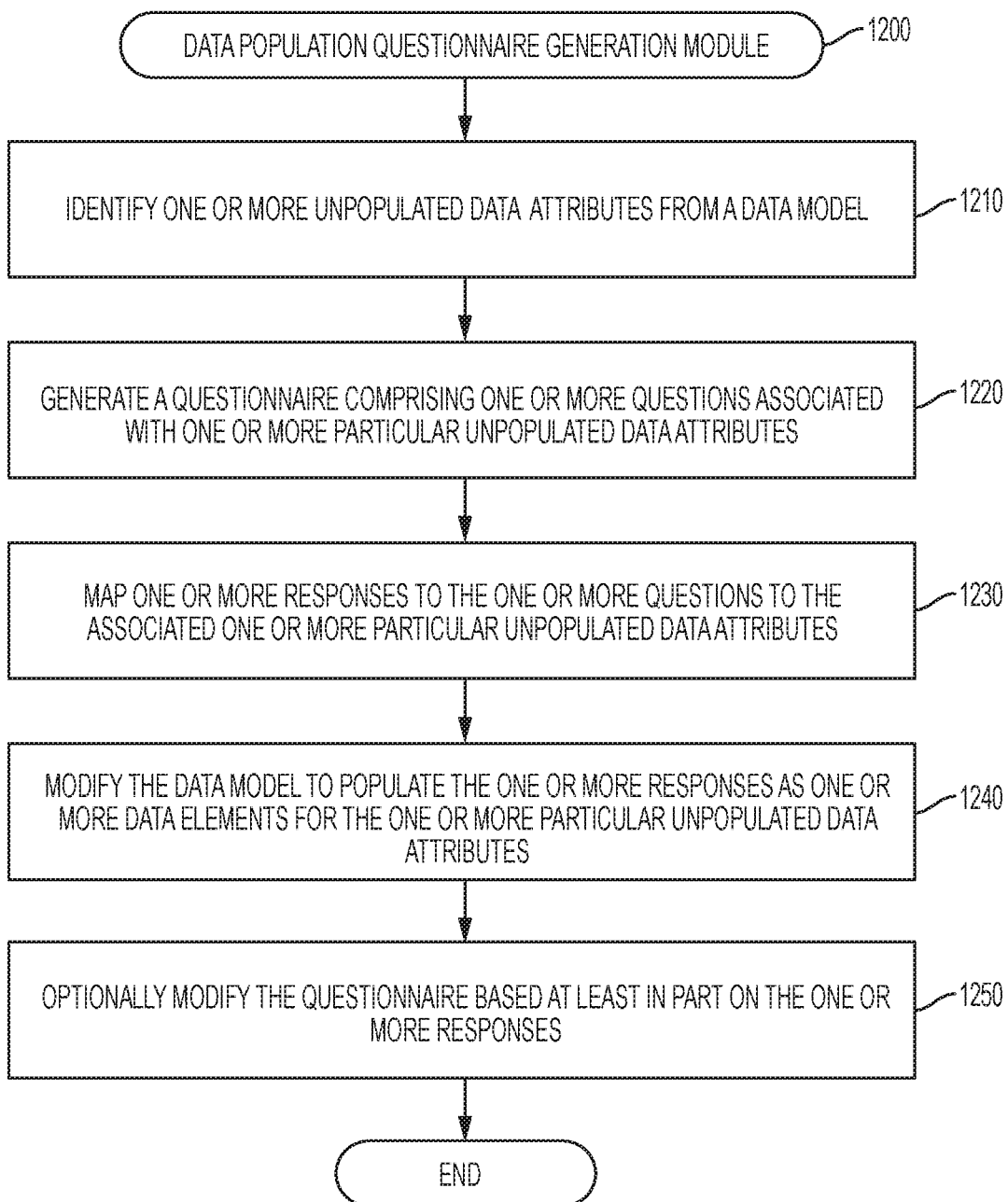
FIG. 12 is a flowchart showing an example of steps performed by a Data Population Questionnaire Generation Module.

Turning to FIG. 12, in particular embodiments, when executing the Data Population Questionnaire Generation Module 1200, the system begins, at Step 1210, by identifying one or more unpopulated data attributes from a data model. The system may, for example, identify the one or more unpopulated data attributes using any suitable technique described above. In particular embodiments, the one or more unpopulated data attributes may relate to, for example, one or more processing activity or asset attributes such as: (1) one or more processing activities associated with a particular data asset; (2) transfer data associated with the particular data asset (e.g., how and where the data stored and/or collected by the particular data asset is being transferred to and/or from); (3) personal data associated with the particular data assets asset (e.g., what type of personal data is collected and/or stored by the particular data asset; how, and from where, the data is collected, etc.); (4) storage data associated with the personal data (e.g., whether the data is being stored, protected and deleted); and (5) any other suitable attribute related to the collection, use, and transfer of personal data by one or more data assets or via one or more processing activities. In other embodiments, the one or more unpopulated inventory attributes may comprise one or more other pieces of information such as, for example: (1) the type of data being stored by the particular data asset; (2) an amount of data stored by the particular data asset; (3) whether the data is encrypted by the particular data asset; (4) a location of the stored data (e.g., a physical location of one or more computer servers on which the data is stored by the particular data asset); etc.

Continuing to Step 1220, the system generates a questionnaire (e.g., a questionnaire template) comprising one or more questions associated with one or more particular unpopulated data attributes. As may be understood in light of the above, the one or more particulate unpopulated data attributes may relate to, for example, a particular processing activity or a particular data asset (e.g., a particular data asset utilized as part of a particular processing activity). In various embodiments, the one or more questionnaires comprise one or more questions associated with the unpopulated data attribute. For example, if the data model includes an unpopulated data attribute related to a location of a server on which a particular asset stores personal data, the system may generate a questionnaire associated with a processing activity that utilizes the asset (e.g., or a questionnaire associated with the asset). The system may generate the questionnaire to include one or more questions regarding the location of the server.

Returning to Step 1230, the system maps one or more responses to the one or more questions to the associated one or more particular unpopulated data attributes. The system may, for example, when generating the questionnaire, associate a particular question with a particular unpopulated data attribute in computer memory. In various embodiments, the questionnaire may comprise a plurality of question/answer pairings, where the answer in the question/answer pairings maps to a particular inventory attribute for a particular data asset or processing activity.

In this way, the system may, upon receiving a response to the particular question, substantially automatically populate the particular unpopulated data attribute. Accordingly, at Step 1240, the system modifies the data model to populate the one or more responses as one or more data elements for the one or more particular unpopulated data attributes. In particular embodiments, the system is configured to modify the data model such that the one or more responses are stored in association with the particular data element (e.g., unpopulated data attribute) to which the system mapped it at Step 1230. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Continuing to optional Step 1250, the system may be configured to modify the questionnaire based at least in part on the one or more responses. The system may, for example, substantially dynamically add and/or remove one or more questions to/from the questionnaire based at least in part on the one or more responses (e.g., one or more response received by a user completing the questionnaire). For example, the system may, in response to the user providing a particular inventory attribute or new asset, generates additional questions that relate to that particular inventory attribute or asset. The system may, as the system adds additional questions, substantially automatically map one or more responses to one or more other inventory attributes or assets. For example, in response to the user indicating that personal data for a particular asset is stored in a particular location, the system may substantially automatically generate one or more additional questions related to, for example, an encryption level of the storage, who has access to the storage location, etc.

In still other embodiments, the system may modify the data model to include one or more additional assets, data attributes, inventory attributes, etc. in response to one or more questionnaire responses. For example, the system may modify a data inventory for a particular asset to include a storage encryption data element (which specifies whether the particular asset stores particular data in an encrypted format) in response to receiving such data from a questionnaire. Modification of a questionnaire is discussed more fully below with respect to FIG. 13.

Data Model Population via Questionnaire Process Flow

Figure 13:
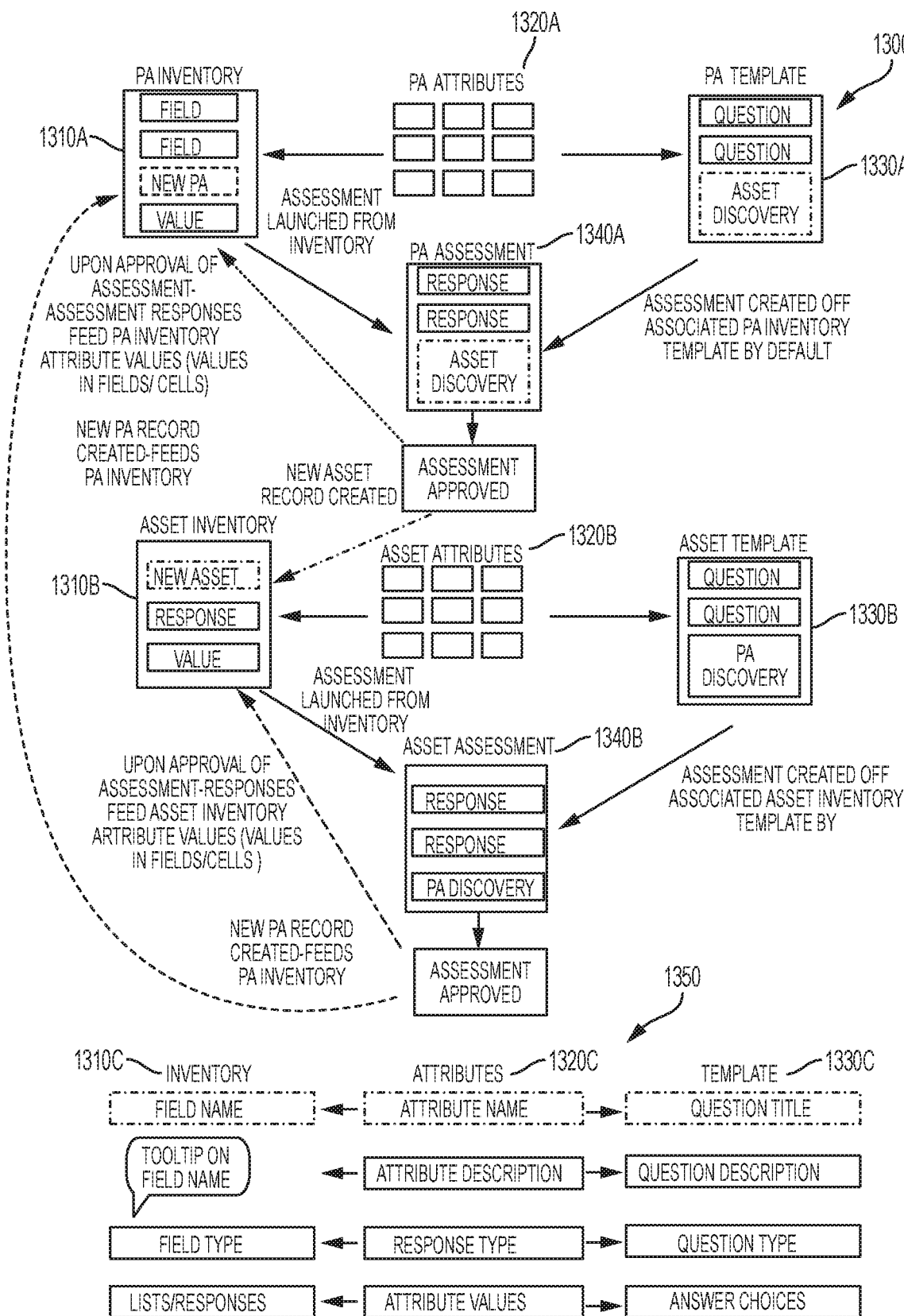
FIG. 13 is a process flow for populating a data inventory according to a particular embodiment using one or more data mapping techniques.

FIG. 13 depicts an exemplary process flow 1300 for populating a data model (e.g., modifying a data model to include a newly discovered data asset, populating one or more inventory attributes for a particular processing activity or data asset, etc.). In particular, FIG. 13 depicts one or more exemplary data relationships between one or more particular data attributes (e.g., processing activity attributes and/or asset attributes), a questionnaire template (e.g., a processing activity template and/or a data asset template), a completed questionnaire (e.g., a processing activity assessment and/or a data asset assessment), and a data inventory (e.g., a processing activity inventory and/or an asset inventory). As may be understood from this figure the system is configured to: (1) identify new data assets; (2) generate an asset inventory for identified new data assets; and (3) populate the generated asset inventories. Systems and methods for populating the generated inventories are described more fully below.

As may be understood from FIG. 13, a system may be configured to map particular processing activity attributes 1320A to each of: (1) a processing activity template 1330A; and (2) a processing activity data inventory 1310A. As may be understood in light of this disclosure, the processing activity template 1330A may comprise a plurality of questions (e.g., as part of a questionnaire), which may, for example, be configured to elicit discovery of one or more new data assets. The plurality of questions may each correspond to one or more fields in the processing activity inventory 1310A, which may, for example, define one or more inventory attributes of the processing activity.

In particular embodiments, the system is configured to provide a processing activity assessment 1340A to one or more individuals for completion. As may be understood from FIG. 13, the system is configured to launch the processing activity assessment 1340A from the processing activity inventory 1310A and further configured to create the processing activity assessment 1340A from the processing activity template 1330. The processing activity assessment 1340A may comprise, for example, one or more questions related to the processing activity. The system may, in various embodiments, be configured to map one or more responses provided in the processing activity assessment 1340A to one or more corresponding fields in the processing activity inventory 1310A. The system may then be configured to modify the processing activity inventory 1310A to include the one or more responses, and store the modified inventory in computer memory. In various embodiments, the system may be configured to approve a processing activity assessment 1340A (e.g., receive approval of the assessment) prior to feeding the processing activity inventory attribute values into one or more fields and/or cells of the inventory.

As may be further understood from FIG. 13, in response to creating a new asset record (e.g., which the system may create, for example, in response to a new asset discovery via the processing activity assessment 1340A described immediately above, or in any other suitable manner), the system may generate an asset inventory 1310B (e.g., a data asset inventory) that defines a plurality of inventory attributes for the new asset (e.g., new data asset).

As may be understood from FIG. 13, a system may be configured to map particular asset attributes 1320B to each of: (1) an asset template 1330BA; and (2) an asset inventory 1310A. As may be understood in light of this disclosure, the asset template 1330B may comprise a plurality of questions (e.g., as part of a questionnaire), which may, for example, be configured to elicit discovery of one or more processing activities associated with the asset and/or one or more inventory attributes of the asset. The plurality of questions may each correspond to one or more fields in the asset inventory 1310B, which may, for example, define one or more inventory attributes of the asset.

In particular embodiments, the system is configured to provide an asset assessment 1340B to one or more individuals for completion. As may be understood from FIG. 13, the system is configured to launch the asset assessment 1340B from the asset inventory 1310B and further configured to create the asset assessment 1340B from the asset template 1330B. The asset assessment 1340B may comprise, for example, one or more questions related to the data asset. The system may, in various embodiments, be configured to map one or more responses provided in the asset assessment 1340B to one or more corresponding fields in the asset inventory 1310B. The system may then be configured to modify the asset inventory 1310B (e.g., and/or a related processing activity inventory 1310A) to include the one or more responses, and store the modified inventory in computer memory. In various embodiments, the system may be configured to approve an asset assessment 1340B (e.g., receive approval of the assessment) prior to feeding the asset inventory attribute values into one or more fields and/or cells of the inventory.

FIG. 13 further includes a detail view 1350 of a relationship between particular data attributes 1320C with an exemplary data inventory 1310C and a questionnaire template 1330C. As may be understood from this detail view 1350, a particular attribute name may map to a particular question title in a template 1330C as well as to a field name in an exemplary data inventory 1310C. In this way, the system may be configured to populate (e.g., automatically populate) a field name for a particular inventory 1310C in response to a user providing a question title as part of a questionnaire template 1330C. Similarly, a particular attribute description may map to a particular question description in a template 1330C as well as to a tooltip on a fieldname in an exemplary data inventory 1310C. In this way, the system may be configured to provide the tooltip for a particular inventory 1310C that includes the question description provided by a user as part of a questionnaire template 1330C.

As may be further understood from the detail view 1350 of FIG. 13, a particular response type may map to a particular question type in a template 1330C as well as to a field type in an exemplary data inventory 1310C. A particular question type may include, for example, a multiple choice question (e.g., A, B, C, etc.), a freeform response, an integer value, a drop down selection, etc. A particular field type may include, for example, a memo field type, a numeric field type, an integer field type, a logical field type, or any other suitable field type. A particular data attribute may require a response type of, for example: (1) a name of an organization responsible for a data asset (e.g., a free form response); (2) a number of days that data is stored by the data asset (e.g., an integer value); and/or (3) any other suitable response type.

In still other embodiments, the system may be configured to map a one or more attribute values to one or more answer choices in a template 1330C as well as to one or more lists and/or responses in a data inventory 1310C. The system may then be configured to populate a field in the data inventory 1310C with the one or more answer choices provided in a response to a question template 1330C with one or more attribute values.

Exemplary Questionnaire Generation and Completion User Experience

Figure 14:
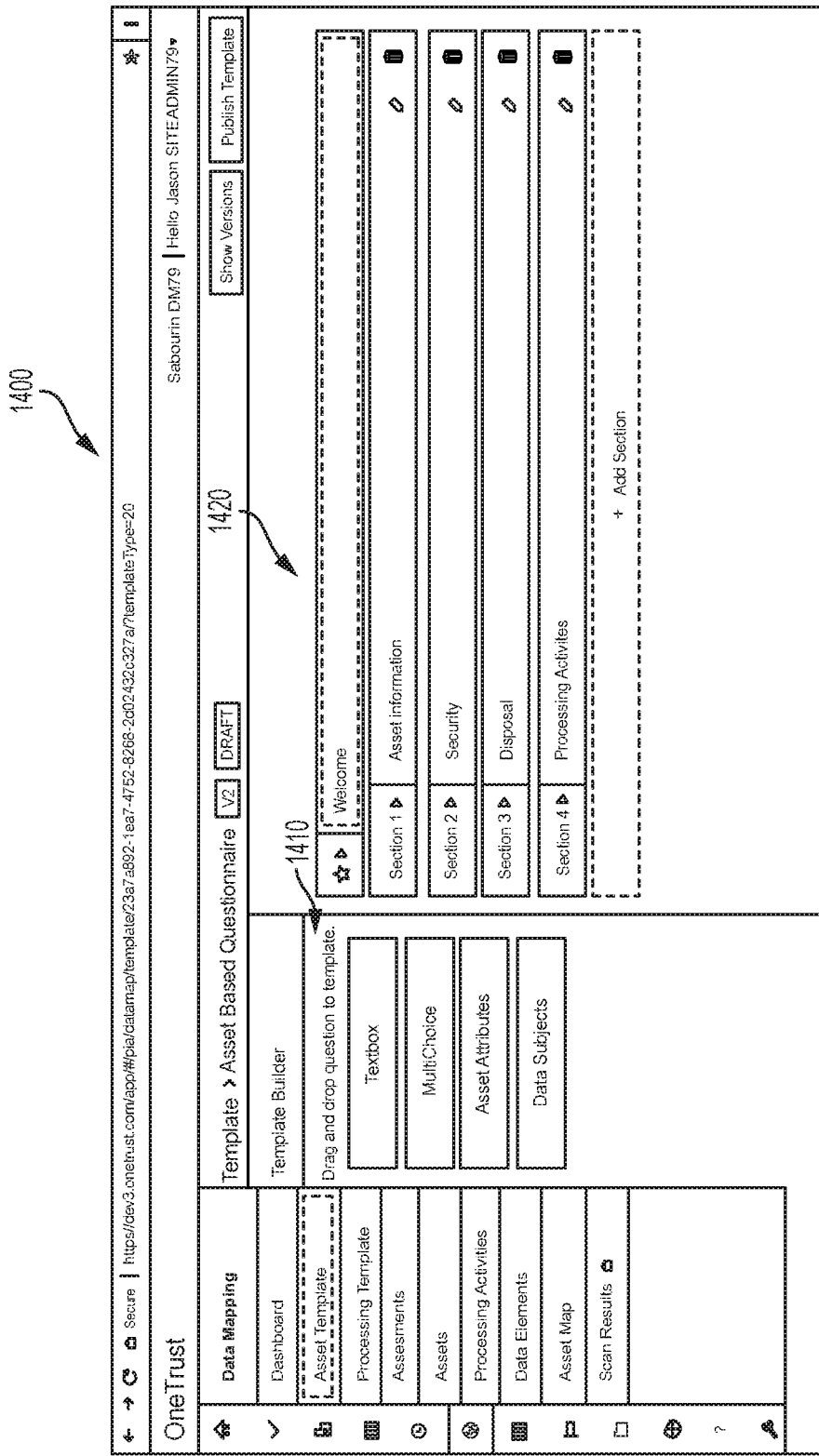

FIGS. 14-25 depict exemplary screen displays that a user may encounter when generating a questionnaire (e.g., one or more questionnaires and/or templates) for populating one or more data elements (e.g., inventory attributes) of a data model for a data asset and/or processing activity. FIG. 14, for example, depicts an exemplary asset based questionnaire template builder 1400. As may be understood from FIG. 14, the template builder may enable a user to generate an asset based questionnaire template that includes one or more sections 1420 related to the asset (e.g., asset information, security, disposal, processing activities, etc.). As may be understood in light of this disclosure, the system may be configured to substantially automatically generate an asset based questionnaire template based at least in part on the one or more unpopulated inventory attributes discussed above. The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 14, the system may provide a user with a draft and drop question template 1410, from which the user may select a question type (e.g., textbox, multiple choice, etc.).

A template for an asset may include, for example: (1) one or more questions requesting general information about the asset; (2) one or more security-related questions about the asset; (3) one or more questions regarding how the data asset disposes of data that it uses; and/or (4) one or more questions regarding processing activities that involve the data asset. In various embodiments, each of these one or more sections may comprise one or more specific questions that may map to particular portions of a data model (e.g., a data map).

Figure 15:
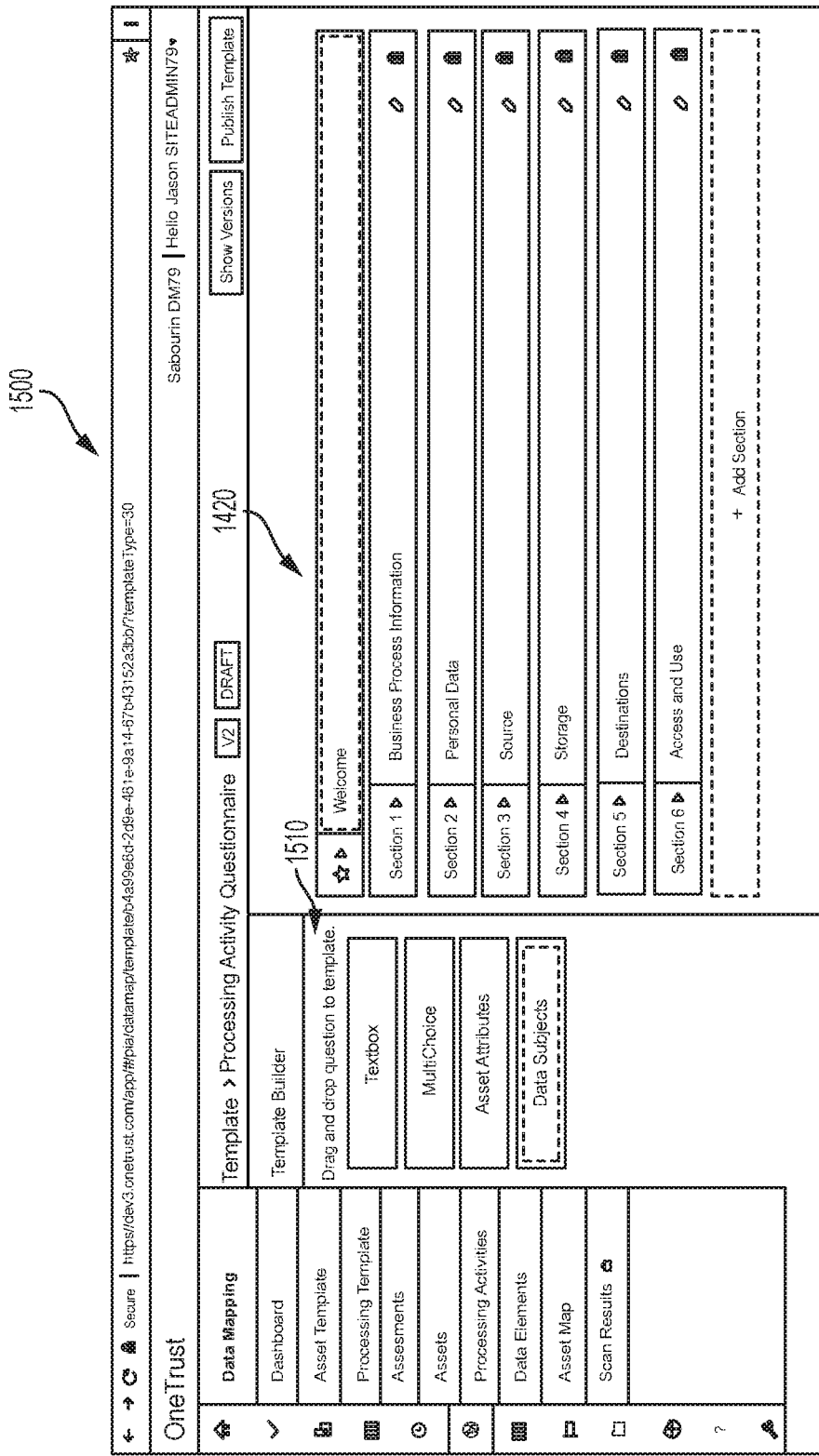

FIG. 15 depicts an exemplary screen display of a processing activity questionnaire template builder 1500. The screen display shown in FIG. 15 is similar to the template builder shown in FIG. 14 with respect to the data asset based template builder. As may be understood from FIG. 15, the template builder may enable a user to generate a processing activity based questionnaire template that includes one or more sections 1520 related to the processing activity (e.g., business process information, personal data, source, storage, destinations, access and use, etc.). As may be understood in light of this disclosure, the system may be configured to substantially automatically generate a processing activity based questionnaire template based at least in part on the one or more unpopulated inventory attributes related to the processing activity (e.g., as discussed above). The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 15, the system may provide a user with a draft and drop question template 1510, from which the user may select a question type (e.g., textbox, multiple choice, asset attributes, data subjects, etc.). The system may be further configured to enable a user to publish a completed template (e.g., for use in a particular assessment). In other embodiments, the system may be configured to substantially automatically publish the template.

In various embodiments, a template for a processing activity may include, for example: (1) one or more questions related to the type of business process that involves a particular data asset; (2) one or more questions regarding what type of personal data is acquired from data subjects for use by a particular data asset; (3) one or more questions related to a source of the acquired personal data; (4) one or more questions related to how and/or where the personal data will be stored and/or for how long; (5) one or more questions related to one or more other data assets that the personal data will be transferred to; and/or (6) one or more questions related to who will have the ability to access and/or use the personal data.

Figure 16:
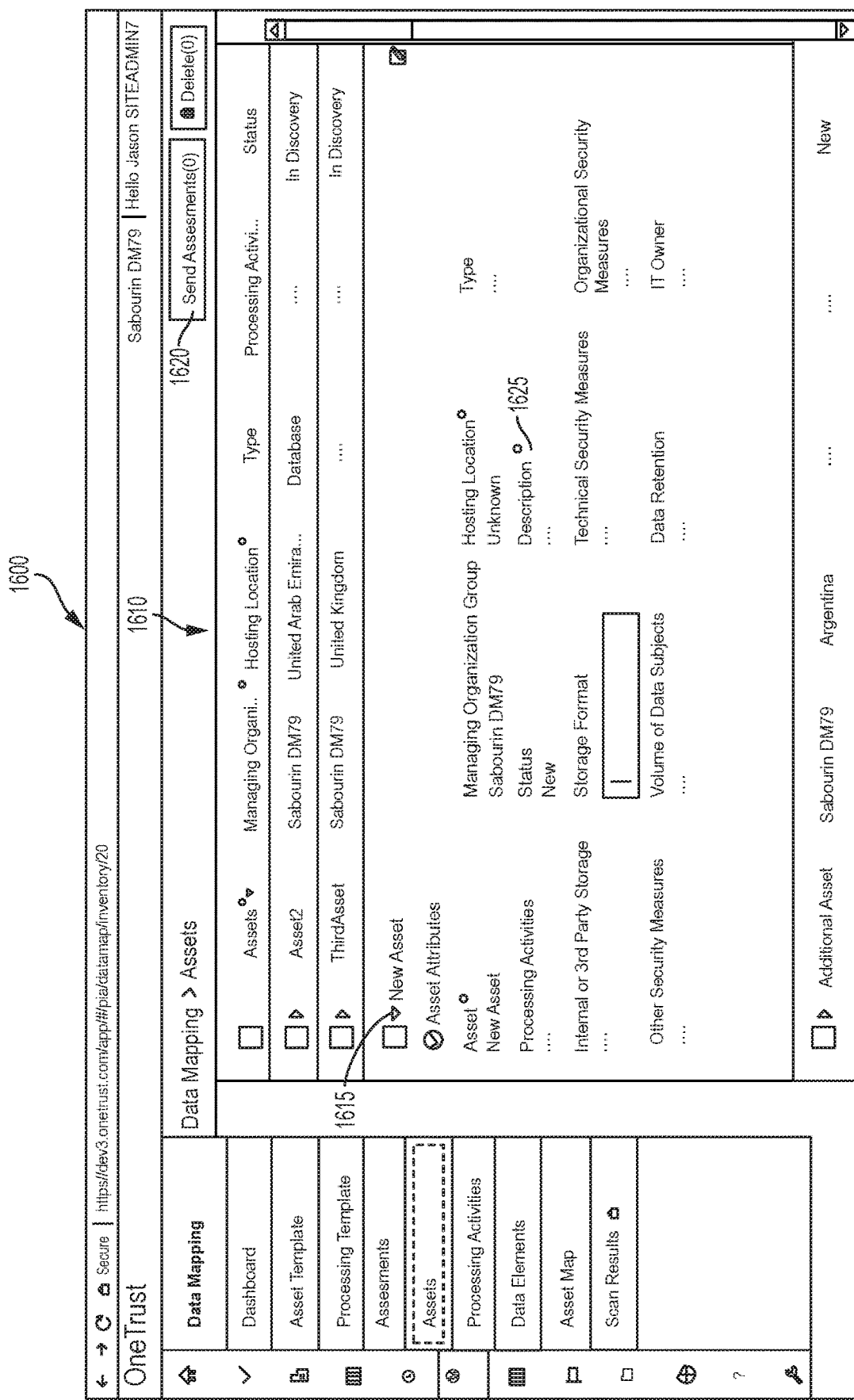

Continuing to FIG. 16, an exemplary screen display 1600 depicts a listing of assets 1610 for a particular entity. These may, for example, have been identified as part of the data model generation system described above. As may be understood from this figure, a user may select a drop down indicator 1615 to view more information about a particular asset. In the exemplary embodiment shown in FIG. 16, the system stores the managing organization group for the "New Asset", but is missing some additional information (e.g., such as a description 1625 of the asset). In order to fill out the missing inventory attributes for the "New Asset", the system, in particular embodiments, is configured to enable a user to select a Send Assessment indicia 1620 in order to transmit an assessment related to the selected asset to an individual tasked with providing one or more pieces of information related to the asset (e.g., a manager, or other individual with knowledge of the one or more inventory attributes).

In response to the user selecting the Send Assessment indicia 1620, the system may create the assessment based at least in part on a template associated with the asset, and transmit the assessment to a suitable individual for completion (e.g., and/or transmit a request to the individual to complete the assessment).

Figure 17:
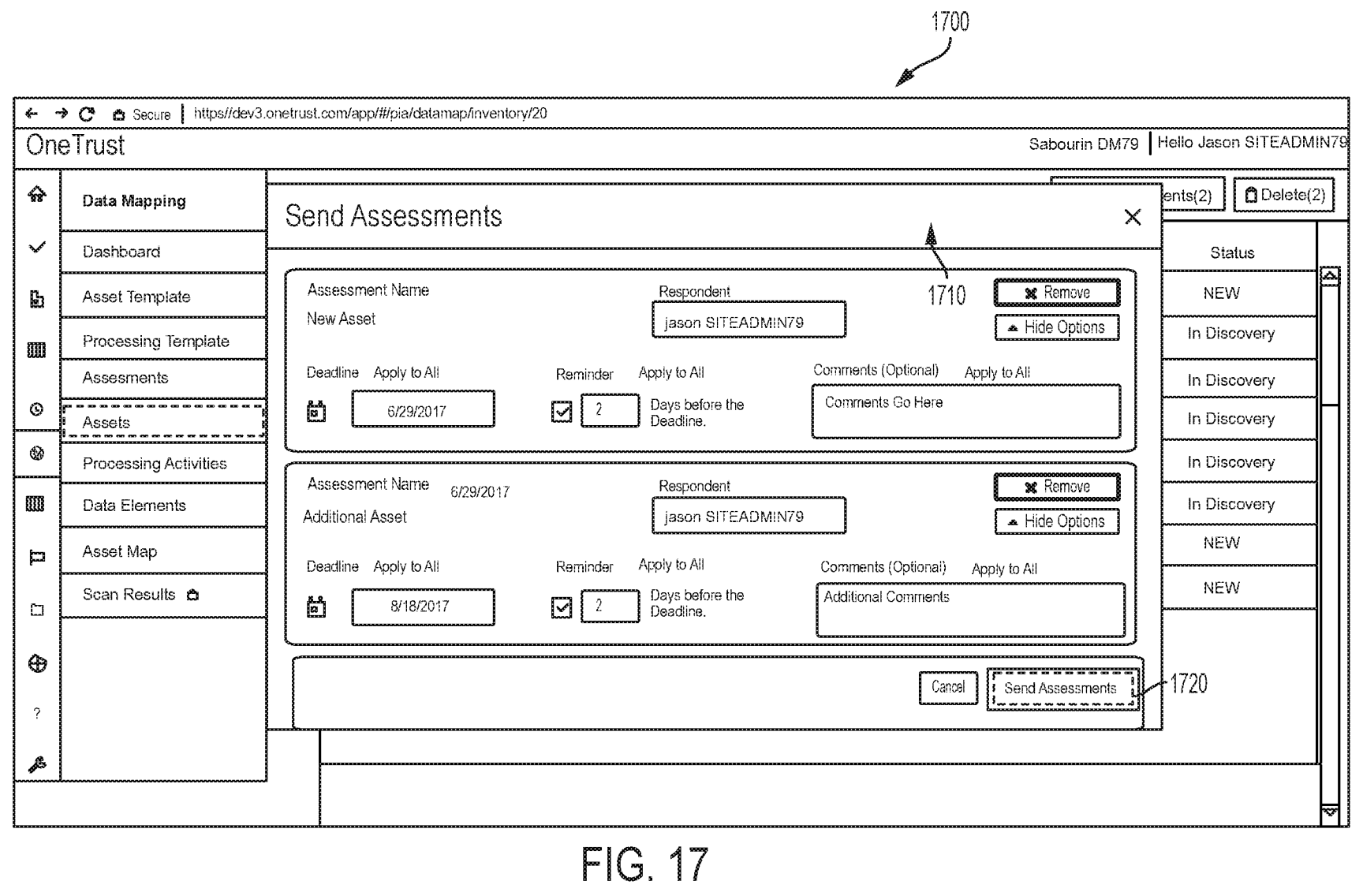

FIG. 17 depicts an exemplary assessment transmission interface 1700 via which a user can transmit one or more assessments for completion. As shown in this figure, the user may assign a respondent, provide a deadline, indicate a reminder time, and provide one or more comments using an assessment request interface 1710. The user may then select a Send Assessment(s) indicia 1720 in order to transmit the assessment.

Figure 18:
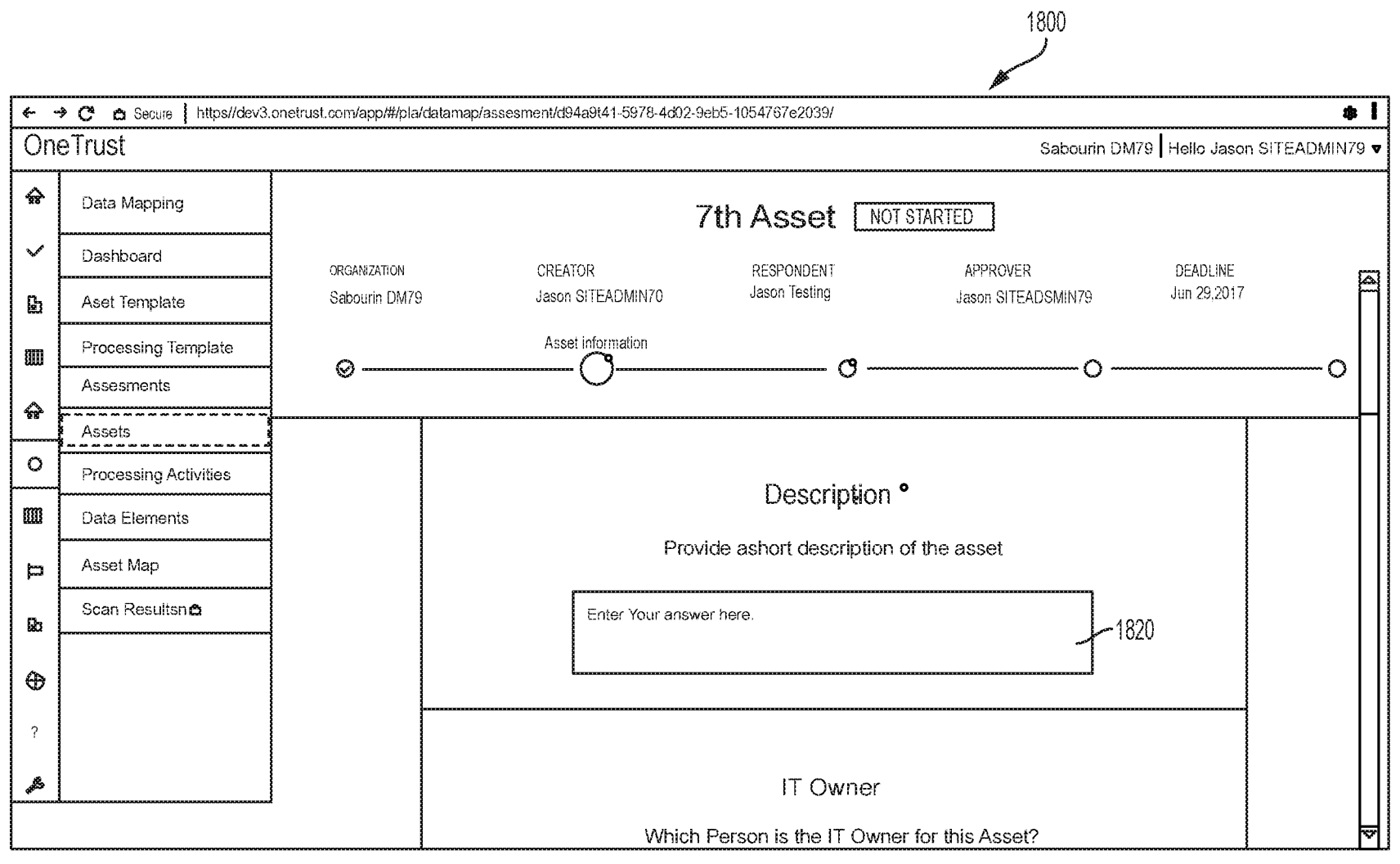
Figure 19:
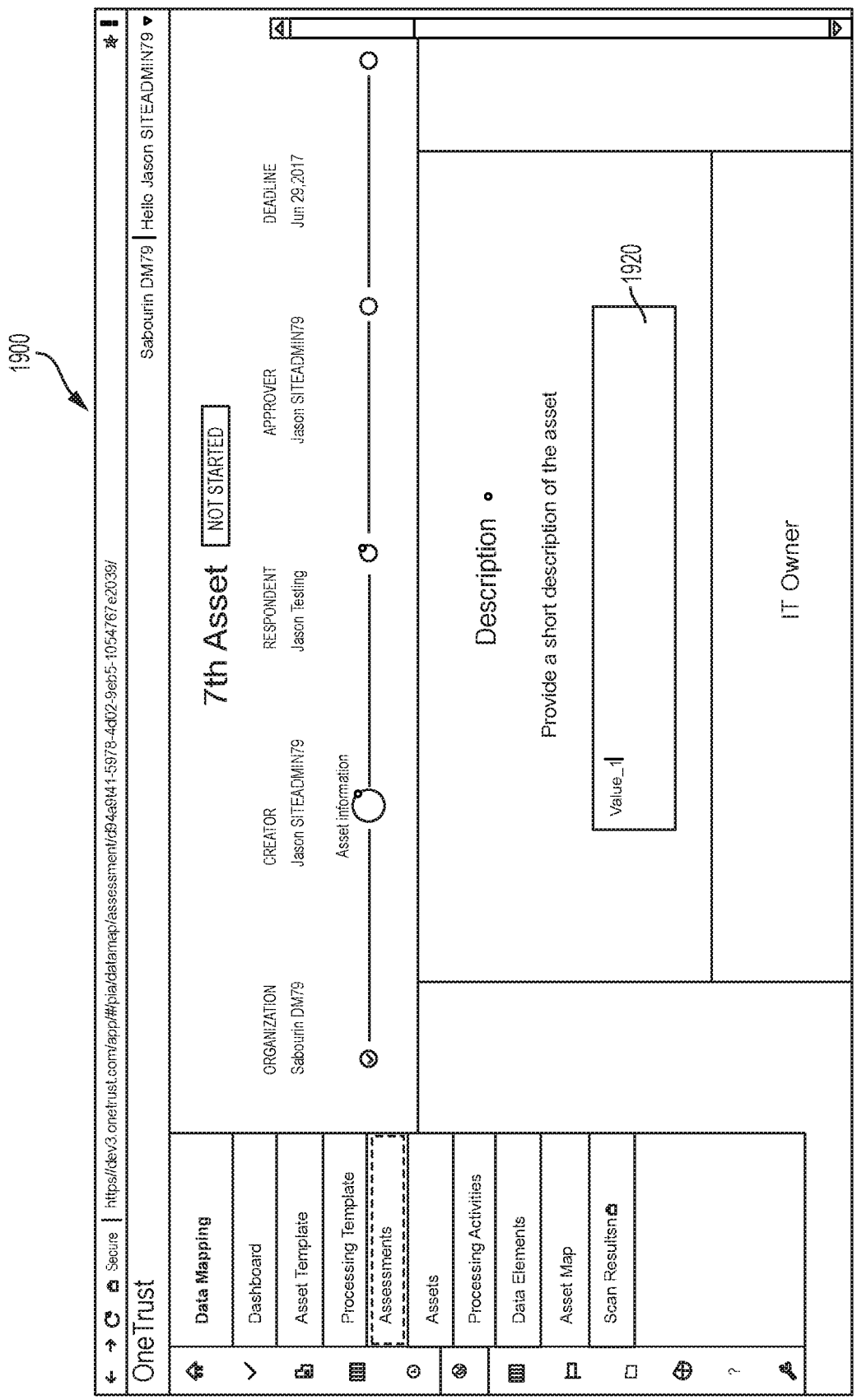

FIG. 18 depicts an exemplary assessment 1800 which a user may encounter in response to receiving a request to complete the assessment as described above with respect to FIGS. 16 and 17. As shown in FIG. 18, the assessment 1800 may include one or more questions that map to the one or more unpopulated attributes for the asset shown in FIG. 16. For example, the one or more questions may include a question related to a description of the asset, which may include a free form text box 1820 for providing a description of the asset. FIG. 19 depicts an exemplary screen display 1900 with the text box 1920 completed, where the description includes a value of "Value_1". As shown in FIGS. 18 and 19, the user may have renamed "New Asset" (e.g., which may have included a default or placeholder name) shown in FIGS. 16 and 17 to "7$^{th}$ Asset."

Continuing to FIG. 20, the exemplary screen display 2000 depicts the listing of assets 2010 from FIG. 16 with some additional attributes populated. For example, the Description 2025 (e.g., "Value_1") provided in FIG. 19 has been added to the inventory. As may be understood in light of this disclosure, in response to a user providing the description via the assessment shown in FIGS. 18 and 19, the system may be configured to map the provided description to the attribute value associated with the description of the asset in the data inventory. The system may have then modified the data inventory for the asset to include the description attribute. In various embodiments, the system is configured to store the modified data inventory as part of a data model (e.g., in computer memory).

Figure 21:
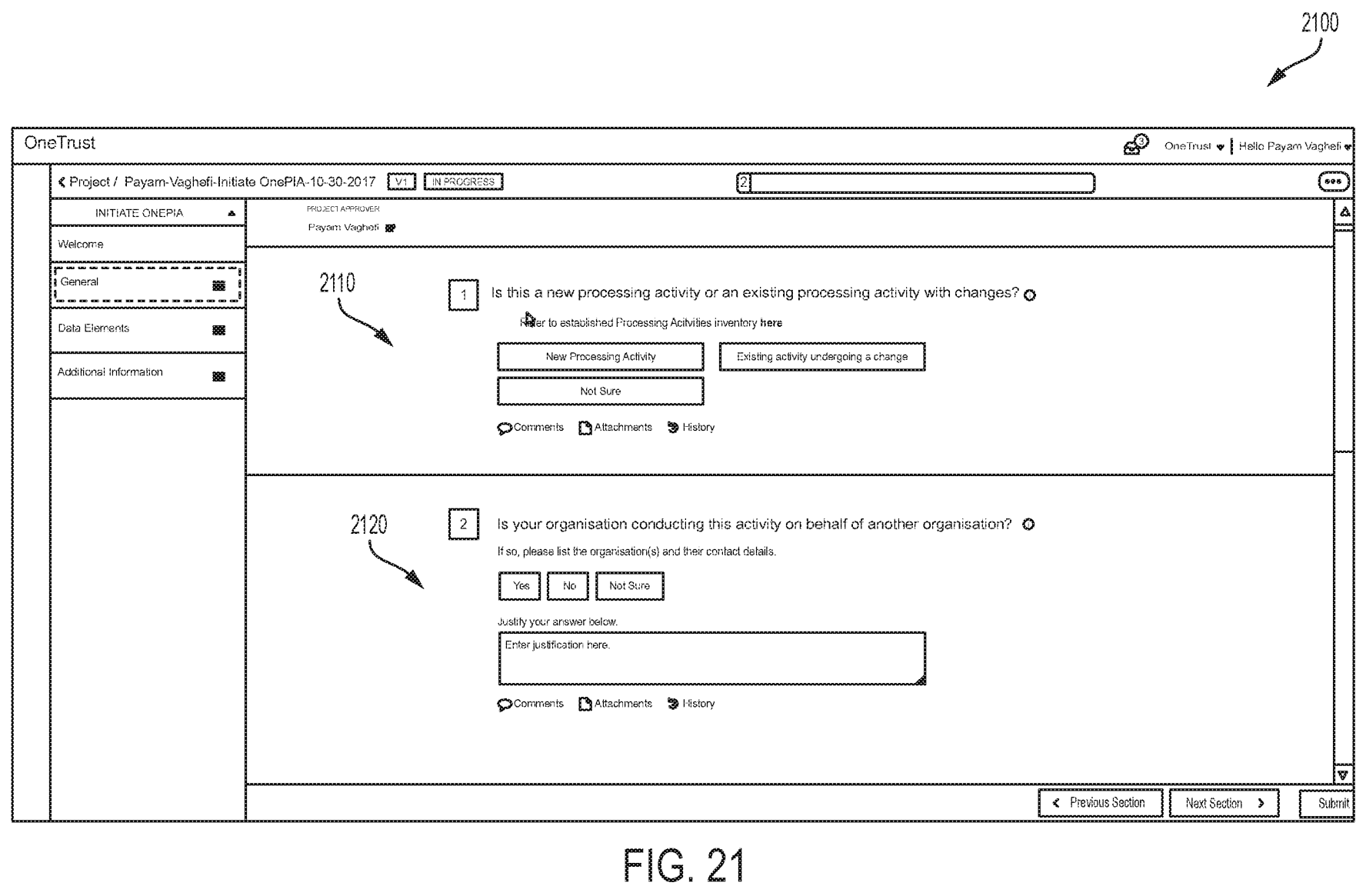

FIGS. 21-24 depict exemplary screen displays showing exemplary questions that make up part of a processing activity questionnaire (e.g., assessment). FIG. 21 depicts an exemplary interface 2100 for responding to a first question 2110 and a second question 2120. As shown in FIG. 21, the first question 2110 relates to whether the processing activity is a new or existing processing activity. The first question 2110 shown in FIG. 21 is a multiple choice question. The second question 2120 relates to whether the organization is conducting the activity on behalf of another organization. As shown in this figure, the second question 2120 includes both a multiple choice portion and a free-form response portion.

Figure 22:
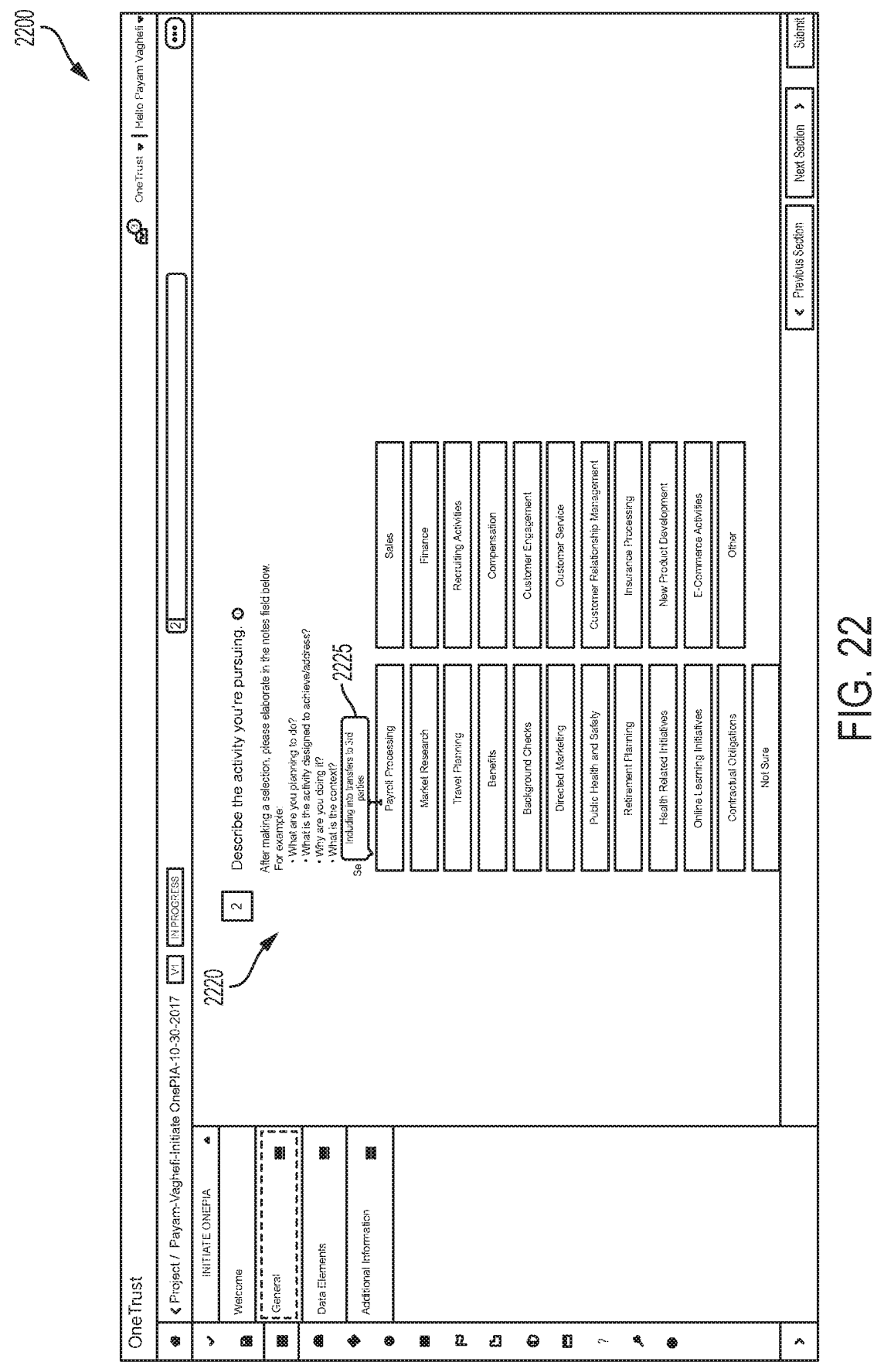

As discussed above, in various embodiments, the system may be configured to modify a questionnaire in response to (e.g., based on) one or more responses provided by a user completing the questionnaire. In particular embodiments, the system is configured to modify the questionnaire substantially on-the-fly (e.g., as the user provides each particular answer). FIG. 22 depicts an interface 2200 that includes a second question 2220 that differs from the second question 2120 shown in FIG. 21. As may be understood in light of this disclosure, in response to the user providing a response to the first question 2110 in FIG. 21 that indicates that the processing activity is a new processing activity, the system may substantially automatically modify the second question 2120 from FIG. 21 to the second question 2220 from FIG. 22 (e.g., such that the second question 2220 includes one or more follow up questions or requests for additional information based on the response to the first question 2110 in FIG. 21).

As shown in FIG. 22, the second question 2220 requests a description of the activity that is being pursued. In various embodiments (e.g., such as if the user had selected that the processing activity was an existing one), the system may not modify the questionnaire to include the second question 2220 from FIG. 22, because the system may already store information related to a description of the processing activity at issue. In various embodiments, any suitable question described herein may include a tooltip 2225 on a field name (e.g., which may provide one or more additional pieces of information to guide a user's response to the questionnaire and/or assessment).

Figure 23:
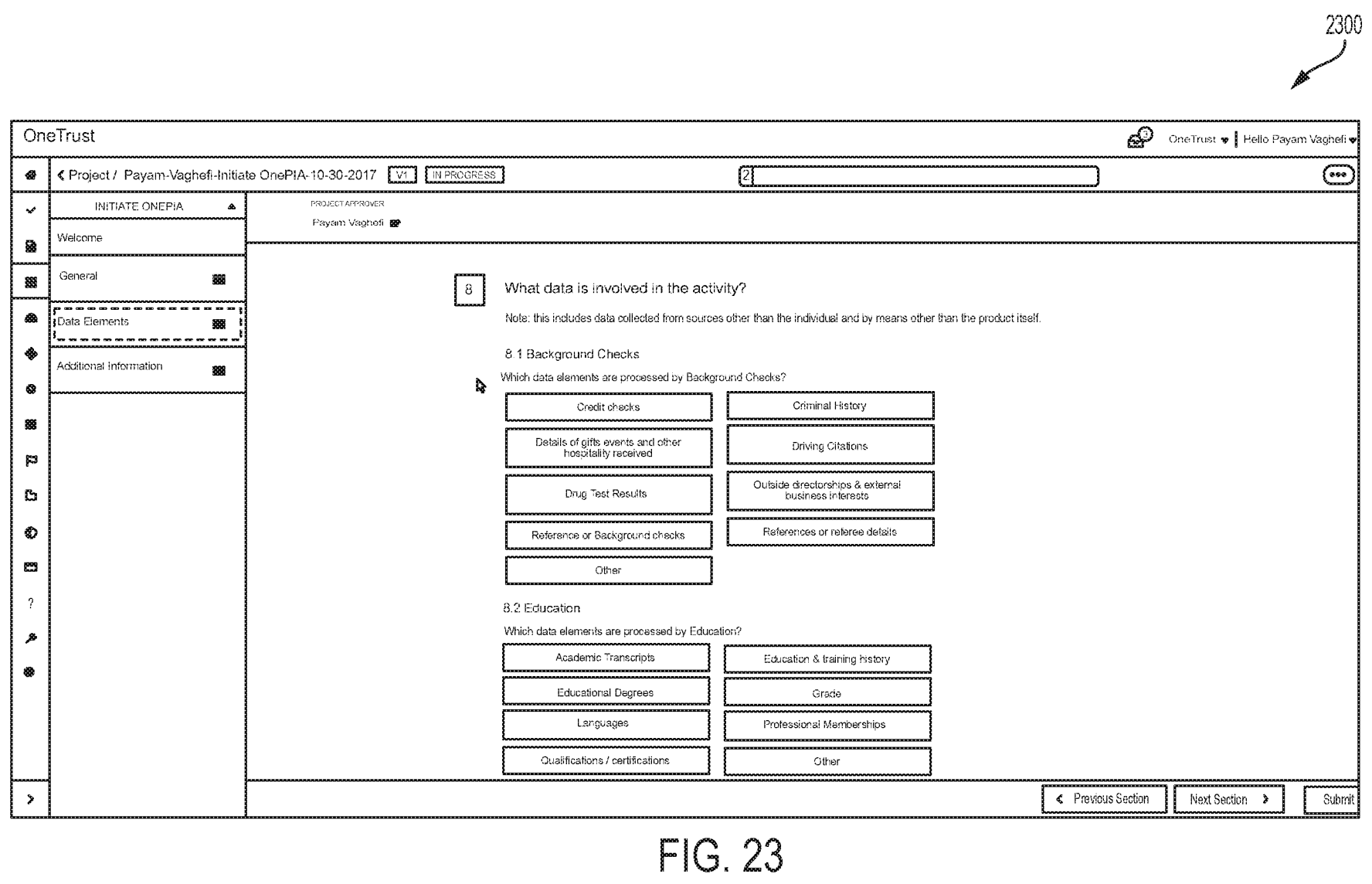
Figure 24:
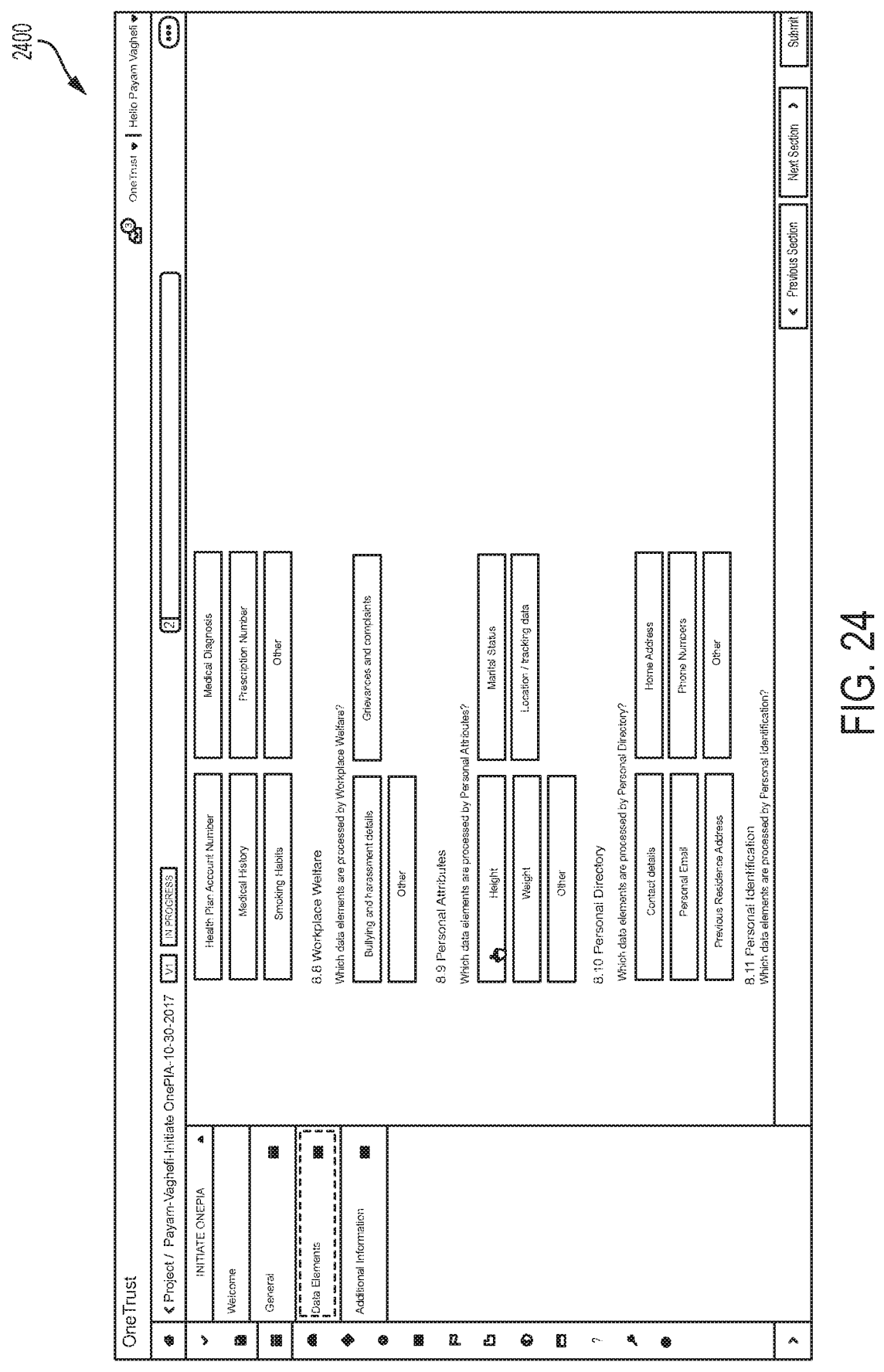

FIGS. 23 and 24 depict additional exemplary assessment questions. The questions shown in these figures relate to, for example, particular data elements processed by various aspects of a processing activity.

Figure 25:
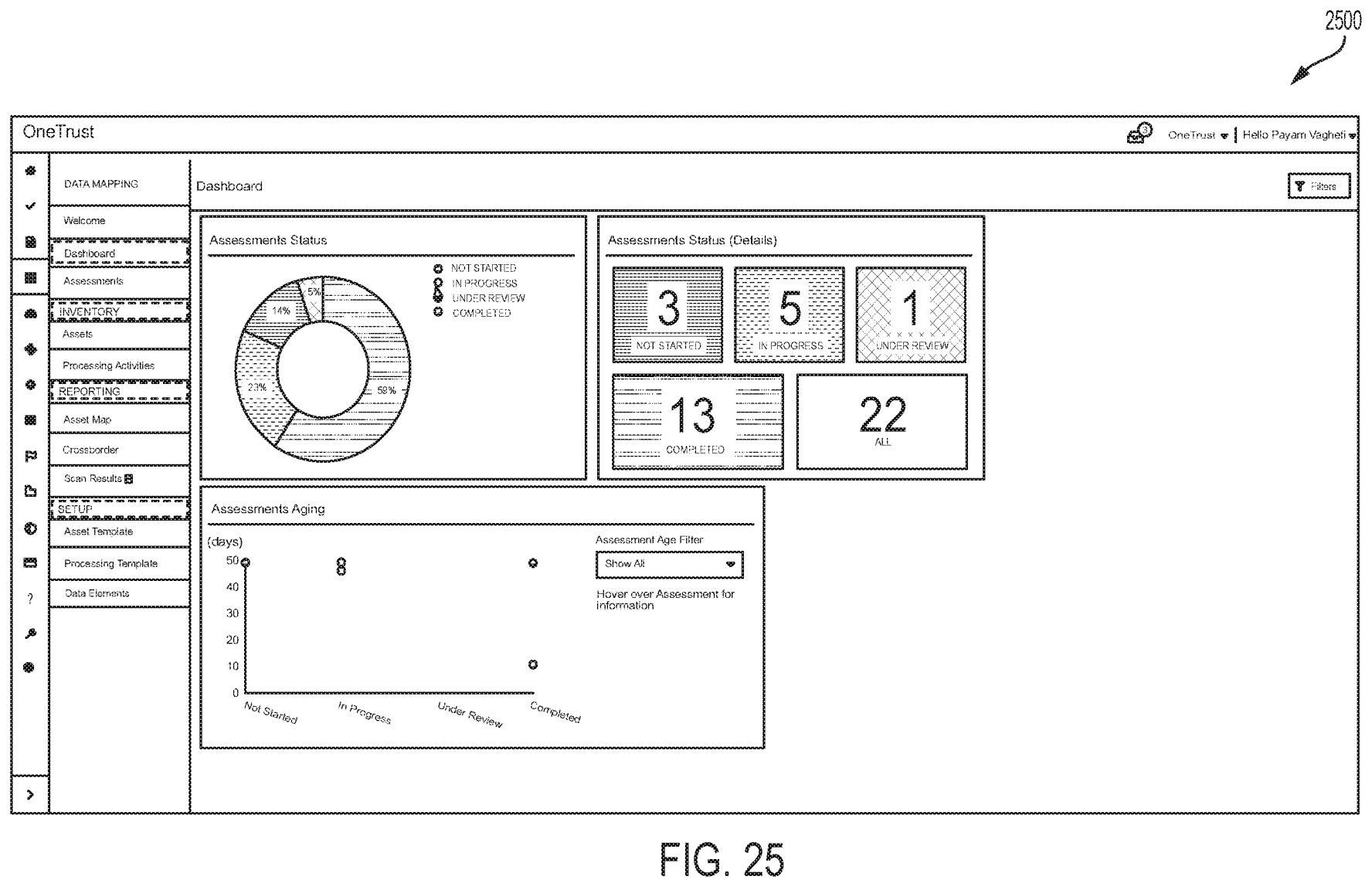

FIG. 25 depicts a dashboard 2500 that includes an accounting of one or more assessments that have been completed, are in progress, or require completion by a particular organization. The dashboard 2500 shown in this figure is configured to provide information relate to the status of one or more outstanding assessments. As may be understood in light of this disclosure, because of the volume of assessment requests, it may be necessary to utilize one or more third party organizations to facilitate a timely completion of one or more assessment requests. In various embodiments, the dashboard may indicate that, based on a fact that a number of assessments are still in progress or incomplete, that a particular data model for an entity, data asset, processing activity, etc. remains incomplete. In such embodiments, an incomplete nature of a data model may raise one or more flags or indicate a risk that an entity may not be in compliance with one or more legal or industry requirements related to the collection, storage, and/or processing of personal data.

Intelligent Identity Scanning Module

Figure 26:
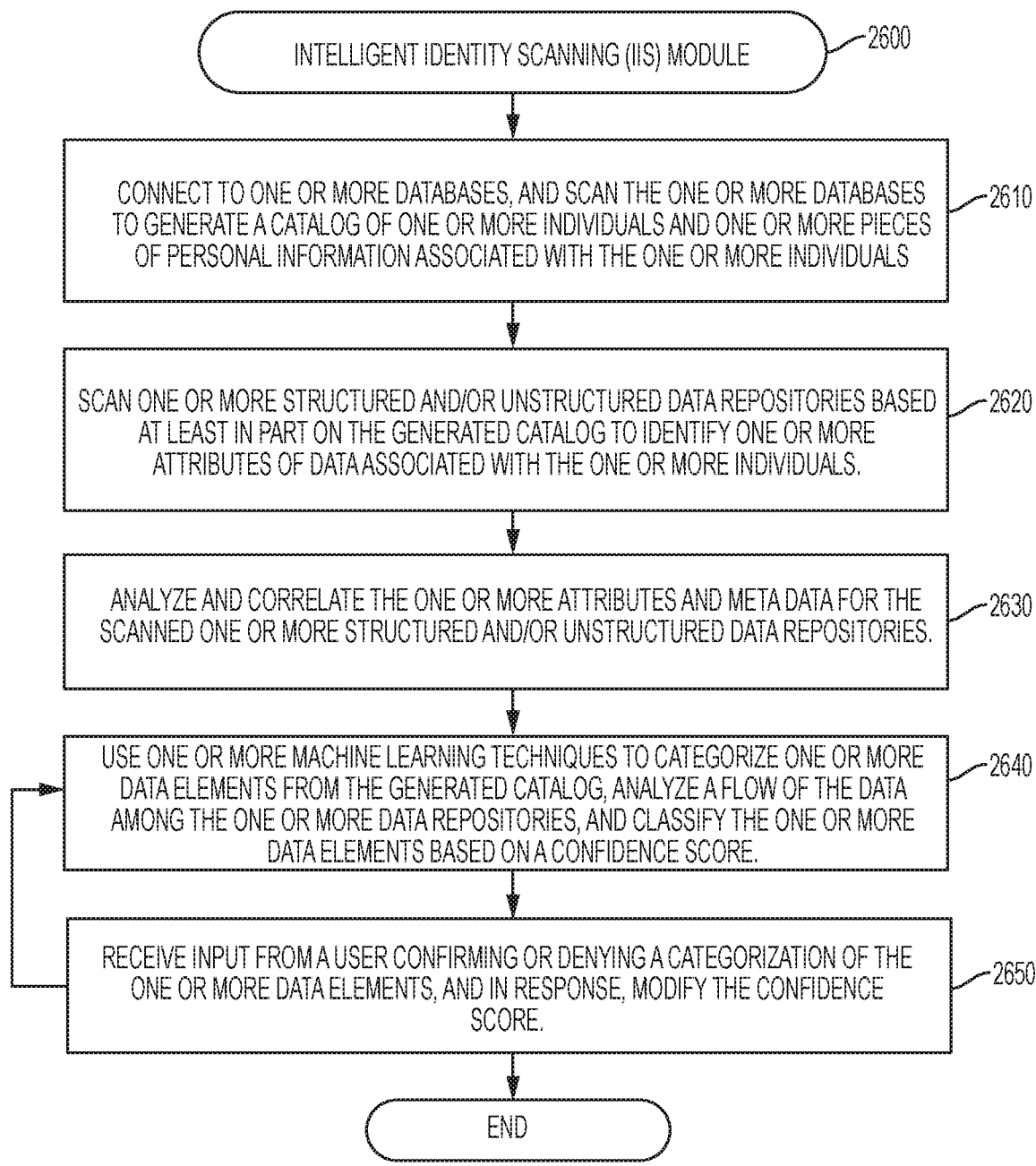
FIG. 26 is a flowchart showing an example of steps performed by an Intelligent Identity Scanning Module.

Turning to FIG. 26, in particular embodiments, the Intelligent Identity Scanning Module 2600 is configured to scan one or more data sources to identify personal data stored on one or more network devices for a particular organization, analyze the identified personal data, and classify the personal data (e.g., in a data model) based at least in part on a confidence score derived using one or more machine learning techniques. The confidence score may be and/or comprise, for example, an indication of the probability that the personal data is actually associated with a particular data subject (e.g., that there is at least an 80% confidence level that a particular phone number is associated with a particular individual.)

When executing the Intelligent Identity Scanning Module 2600, the system begins, at Step 2610, by connecting to one or more databases or other data structures, and scanning the one or more databases to generate a catalog of one or more individuals and one or more pieces of personal information associated with the one or more individuals. The system may, for example, be configured to connect to one or more databases associated with a particular organization (e.g., one or more databases that may serve as a storage location for any personal or other data collected, processed, etc. by the particular organization, for example, as part of a suitable processing activity. As may be understood in light of this disclosure, a particular organization may use a plurality of one or more databases (e.g., the One or More Databases 140 shown in FIG. 1), a plurality of servers (e.g., the One or More Third Party Servers 160 shown in FIG. 1), or any other suitable data storage location in order to store personal data and other data collected as part of any suitable privacy campaign, privacy impact assessment, processing activity, etc.

In particular embodiments, the system is configured to scan the one or more databases by searching for particular data fields comprising one or more pieces of information that may include personal data. The system may, for example, be configured to scan and identify one of more pieces of personal data such as: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable personal information discussed herein. In particular embodiments, the system is configured to scan for a particular type of personal data (e.g., or one or more particular types of personal data).

The system may, in various embodiments, be further configured to generate a catalog of one or more individuals that also includes one or more pieces of personal information (e.g., personal data) identified for the individuals during the scan. The system may, for example, in response to discovering one or more pieces of personal data in a particular storage location, identify one or more associations between the discovered pieces of personal data. For example, a particular database may store a plurality of individuals' names in association with their respective telephone numbers. One or more other databases may include any other suitable information.

The system may, for example, generate the catalog to include any information associated with the one or more individuals identified in the scan. The system may, for example, maintain the catalog in any suitable format (e.g., a data table, etc.).

In still other embodiments, in addition to connecting to a database, the system may be configured to: (1) access an application through one or more application programming interfaces (APIs); (2) use one or more screen scraping techniques on an end user page to identify and analyze each field on the page; and/or (3) connect to any other suitable data structure in order to generate the catalog of individuals and personal information associated with each of the individuals. In some embodiments, the system may be configured to analyze one or more access logs and applications set up through a system active directory or SSO portal for which one or more applications might contain certain data for user groups. The system may then be configured to analyze an email environment to identify one or more links to particular business applications, which may, for example, be in use by an entity and contain certain data. In still other embodiments, the system may be configured to analyze one or more system log files (Syslog) from a security environment to capture which particular applications an entity may be using in order to discover such applications.

Continuing to Step 2620, the system is configured to scan one or more structured and/or unstructured data repositories based at least in part on the generated catalog to identify one or more attributes of data associated with the one or more individuals. The system may, for example, be configured to utilize information discovered during the initial scan at Step 2610 to identify the one or more attributes of data associated with the one or more individuals.

For example, the catalog generated at Step 2610 may include a name, address, and phone number for a particular individual. The system may be configured, at Step 2620, to scan the one or more structured and/or unstructured data repositories to identify one or more attributes that are associated with one or more of the particular individual's name, address and/or phone number. For example, a particular data repository may store banking information (e.g., a bank account number and routing number for the bank) in association with the particular individual's address. In various embodiments, the system may be configured to identify the banking information as an attribute of data associated with the particular individual. In this way, the system may be configured to identify particular data attributes (e.g., one or more pieces of personal data) stored for a particular individual by identifying the particular data attributes using information other than the individual's name.

Returning to Step 2630, the system is configured to analyze and correlate the one or more attributes and metadata for the scanned one or more structured and/or unstructured data repositories. In particular embodiments, the system is configured to correlate the one or more attributes with metadata for the associated data repositories from which the system identified the one or more attributes. In this way, the system may be configured to store data regarding particular data repositories that store particular data attributes.

In particular embodiments, the system may be configured to cross-reference the data repositories that are discovered to store one or more attributes of personal data associated with the one or more individuals with a database of known data assets. In particular embodiments, the system is configured to analyze the data repositories to determine whether each data repository is part of an existing data model of data assets that collect, store, and/or process personal data. In response to determining that a particular data repository is not associated with an existing data model, the system may be configured to identify the data repository as a new data asset (e.g., via asset discovery), and take one or more actions (e.g., such as any suitable actions described herein) to generate and populate a data model of the newly discovered data asset. This may include, for example: (1) generating a data inventory for the new data asset; (2) populating the data inventory with any known attributes associated with the new data asset; (3) identifying one or more unpopulated (e.g., unknown) attributes of the data asset; and (4) taking any suitable action described herein to populate the unpopulated data attributes.

In particular embodiments, the system may, for example: (1) identify a source of the personal data stored in the data repository that led to the new asset discovery; (2) identify one or more relationships between the newly discovered asset and one or more known assets; and/or (3) etc.

Continuing to Step 2640, the system is configured to use one or more machine learning techniques to categorize one or more data elements from the generated catalog, analyze a flow of the data among the one or more data repositories, and/or classify the one or more data elements based on a confidence score as discussed below.

Continuing to Step 2650, the system, in various embodiments, is configured to receive input from a user confirming or denying a categorization of the one or more data elements, and, in response, modify the confidence score. In various embodiments, the system is configured to iteratively repeat Steps 2640 and 2650. In this way, the system is configured to modify the confidence score in response to a user confirming or denying the accuracy of a categorization of the one or more data elements. For example, in particular embodiments, the system is configured to prompt a user (e.g., a system administrator, privacy officer, etc.) to confirm that a particular data element is, in fact, associated with a particular individual from the catalog. The system may, in various embodiments, be configured to prompt a user to confirm that a data element or attribute discovered during one or more of the scans above were properly categorized at Step 2640.

In particular embodiments, the system is configured to modify the confidence score based at least in part on receiving one or more confirmations that one or more particular data elements or attributes discovered in a particular location during a scan are associated with particular individuals from the catalog. As may be understood in light of this disclosure, the system may be configured to increase the confidence score in response to receiving confirmation that particular types of data elements or attributes discovered in a particular storage location are typically confirmed as being associated with particular individuals based on one or more attributes for which the system was scanning.

Exemplary Intelligent Identity Scanning Technical Platforms

Figure 27:
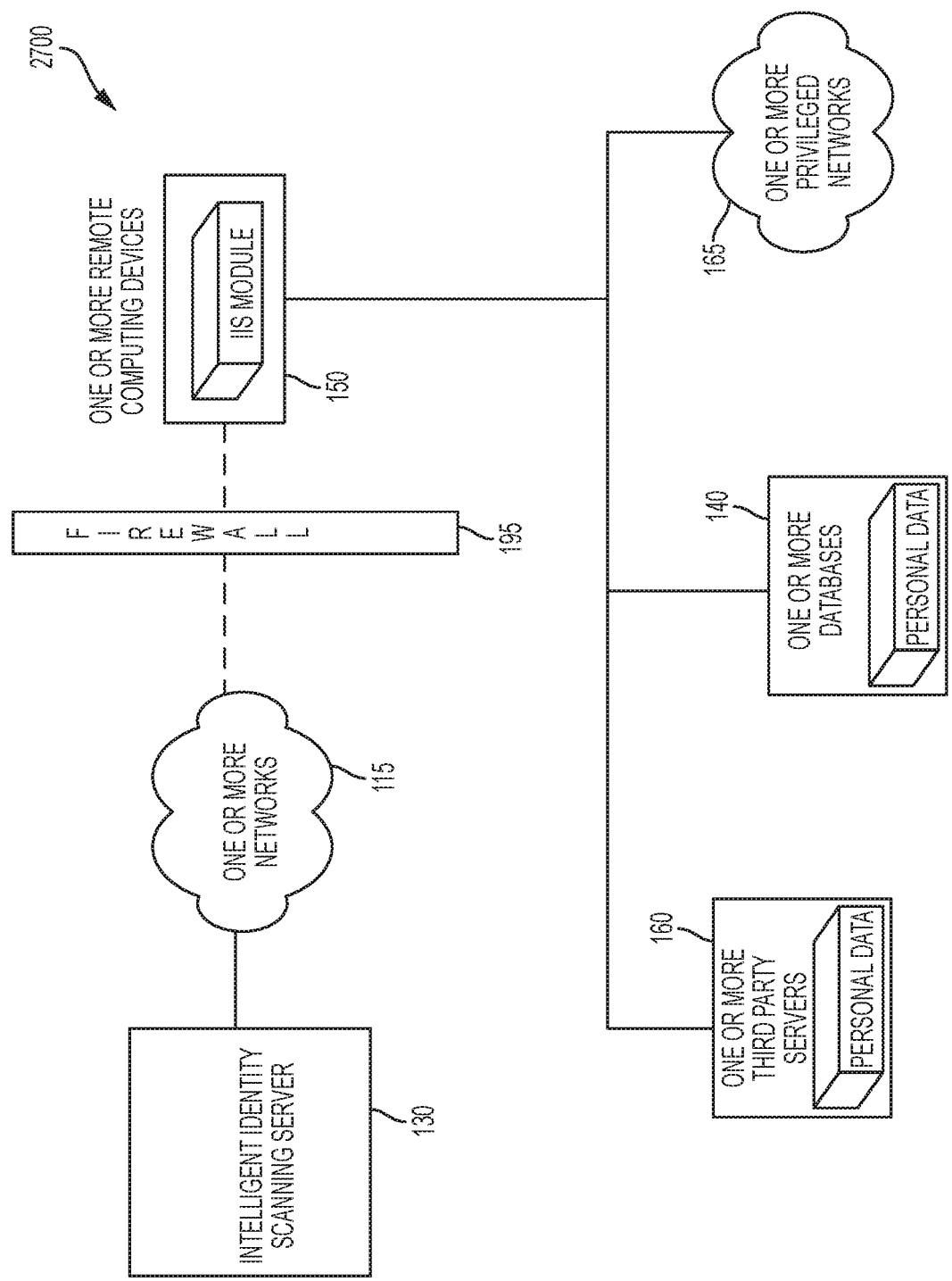
FIG. 27 is schematic diagram of network architecture for an intelligent identity scanning system 2700 according to a particular embodiment.

FIG. 27 depicts an exemplary technical platform via which the system may perform one or more of the steps described above with respect to the Intelligent Identity Scanning Module 2600. As shown in the embodiment in this figure, an Intelligent Identity Scanning System 2600 comprises an Intelligent Identity Scanning Server 130, such as the Intelligent Identity Scanning Server 130 described above with respect to FIG. 1. The Intelligent Identity Scanning Server 130 may, for example, comprise a processing engine (e.g., one or more computer processors). In some embodiments, the Intelligent Identity Scanning Server 130 may include any suitable cloud hosted processing engine (e.g., one or more cloud-based computer servers). In particular embodiments, the Intelligent Identity Scanning Server 130 is hosted in a Microsoft Azure cloud.

In particular embodiments, the Intelligent Identity Scanning Server 130 is configured to sit outside one or more firewalls (e.g., such as the firewall 195 shown in FIG. 26). In such embodiments, the Intelligent Identity Scanning Server 130 is configured to access One or More Remote Computing Devices 150 through the Firewall 195 (e.g., one or more firewalls) via One or More Networks 115 (e.g., such as any of the One or More Networks 115 described above with respect to FIG. 1).

In particular embodiments, the One or More Remote Computing Devices 150 include one or more computing devices that make up at least a portion of one or more computer networks associated with a particular organization. In particular embodiments, the one or more computer networks associated with the particular organization comprise one or more suitable servers, one or more suitable databases, one or more privileged networks, and/or any other suitable device and/or network segment that may store and/or provide for the storage of personal data. In the embodiment shown in FIG. 27, the one or more computer networks associated with the particular organization may comprise One or More Third Party Servers 160, One or More Databases 140, etc. In particular embodiments, the One or More Remote Computing Devices 150 are configured to access one or more segments of the one or more computer networks associated with the particular organization. In some embodiments, the one or more computer networks associated with the particular organization comprise One or More Privileged Networks 165. In still other embodiments, the one or more computer networks comprise one or more network segments connected via one or more suitable routers, one or more suitable network hubs, one or more suitable network switches, etc.

As shown in FIG. 27, various components that make up one or more parts of the one or more computer networks associated with the particular organization may store personal data (e.g., such as personal data stored on the One or More Third Party Servers 160, the One or More Databases 140, etc.). In various embodiments, the system is configured to perform one or more steps related to the Intelligent Identity Scanning Server 2600 in order to identify the personal data for the purpose of generating the catalog of individuals described above (e.g., and/or identify one or more data assets within the organization's network that store personal data)

As further shown in FIG. 27, in various embodiments, the One or More Remote Computing Devices 150 may store a software application (e.g., the Intelligent Identity Scanning Module). In such embodiments, the system may be configured to provide the software application for installation on the One or More Remote Computing Devices 150. In particular embodiments, the software application may comprise one or more virtual machines. In particular embodiments, the one or more virtual machines may be configured to perform one or more of the steps described above with respect to the Intelligent Identity Scanning Module 2600 (e.g., perform the one or more steps locally on the One or More Remote Computing Devices 150).

In various embodiments, the one or more virtual machines may have the following specifications: (1) any suitable number of cores (e.g., 4, 6, 8, etc.); (2) any suitable amount of memory (e.g., 4 GB, 8 GB, 16 GB etc.); (3) any suitable operating system (e.g., CentOS 7.2); and/or (4) any other suitable specification. In particular embodiments, the one or more virtual machines may, for example, be used for one or more suitable purposes related to the Intelligent Identity Scanning System 2700. These one or more suitable purposes may include, for example, running any of the one or more modules described herein, storing hashed and/or non-hashed information (e.g., personal data, personally identifiable data, catalog of individuals, etc.), storing and running one or more searching and/or scanning engines (e.g., Elasticsearch), etc.

In various embodiments, the Intelligent Identity Scanning System 2700 may be configured to distribute one or more processes that make up part of the Intelligent Identity Scanning Process (e.g., described above with respect to the Intelligent Identity Scanning Module 1800). The one or more software applications installed on the One or more Remote Computing Devices 150 may, for example, be configured to provide access to the one or more computer networks associated with the particular organization to the Intelligent Identity Scanning Server 130. The system may then be configured to receive, from the One or more Remote Computing Devices 150 at the Intelligent Identity Scanning Server 130, via the Firewall 195 and One or More Networks 115, scanned data for analysis.

In particular embodiments, the Intelligent Identity Scanning System 2700 is configured to reduce an impact on a performance of the One or More Remote Computing Devices 150, One or More Third Party Servers 160 and other components that make up one or more segments of the one or more computer networks associated with the particular organization. For example, in particular embodiments, the Intelligent Identity Scanning System 2700 may be configured to utilize one or more suitable bandwidth throttling techniques. In other embodiments, the Intelligent Identity Scanning System 2700 is configured to limit scanning (e.g., any of the one or more scanning steps described above with respect to the Intelligent Identity Scanning Module 2600) and other processing steps (e.g., one or more steps that utilize one or more processing resources) to non-peak times (e.g., during the evening, overnight, on weekends and/or holidays, etc.). In other embodiments, the system is configured to limit performance of such processing steps to backup applications and data storage locations. The system may, for example, use one or more sampling techniques to decrease a number of records required to scan during the personal data discovery process.

Figure 28:
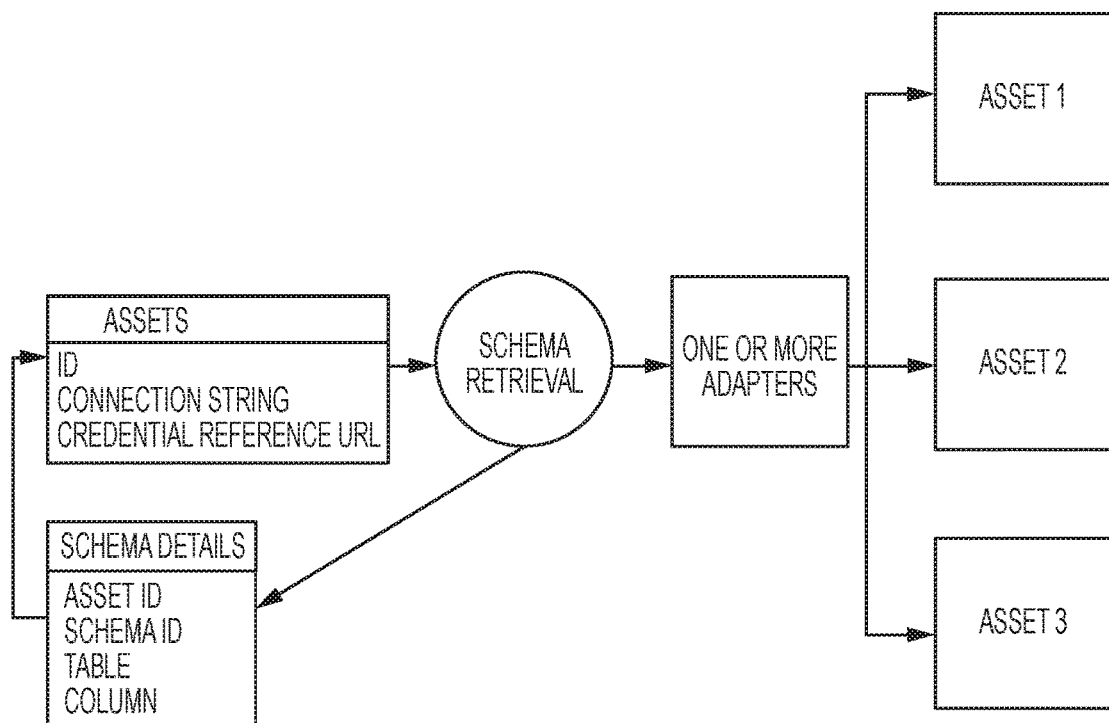
FIG. 28 is a schematic diagram of an asset access methodology utilized by an intelligent identity scanning system 2700 in various embodiments of the system.

FIG. 28 depicts an exemplary asset access methodology that the system may utilize in order to access one or more network devices that may store personal data (e.g., or other personally identifiable information). As may be understood from this figure, the system may be configured to access the one or more network devices using a locally deployed software application (e.g., such as the software application described immediately above). In various embodiments, the software application is configured to route identity scanning traffic through one or more gateways, configure one or more ports to accept one or more identity scanning connections, etc.

As may be understood from this figure, the system may be configured to utilize one or more credential management techniques to access one or more privileged network portions. The system may, in response to identifying particular assets or personally identifiable information via a scan, be configured to retrieve schema details such as, for example, an asset ID, Schema ID, connection string, credential reference URL, etc. In this way, the system may be configured to identify and store a location of any discovered assets or personal data during a scan.

Data Subject Access Request Fulfillment Module

Figure 29:
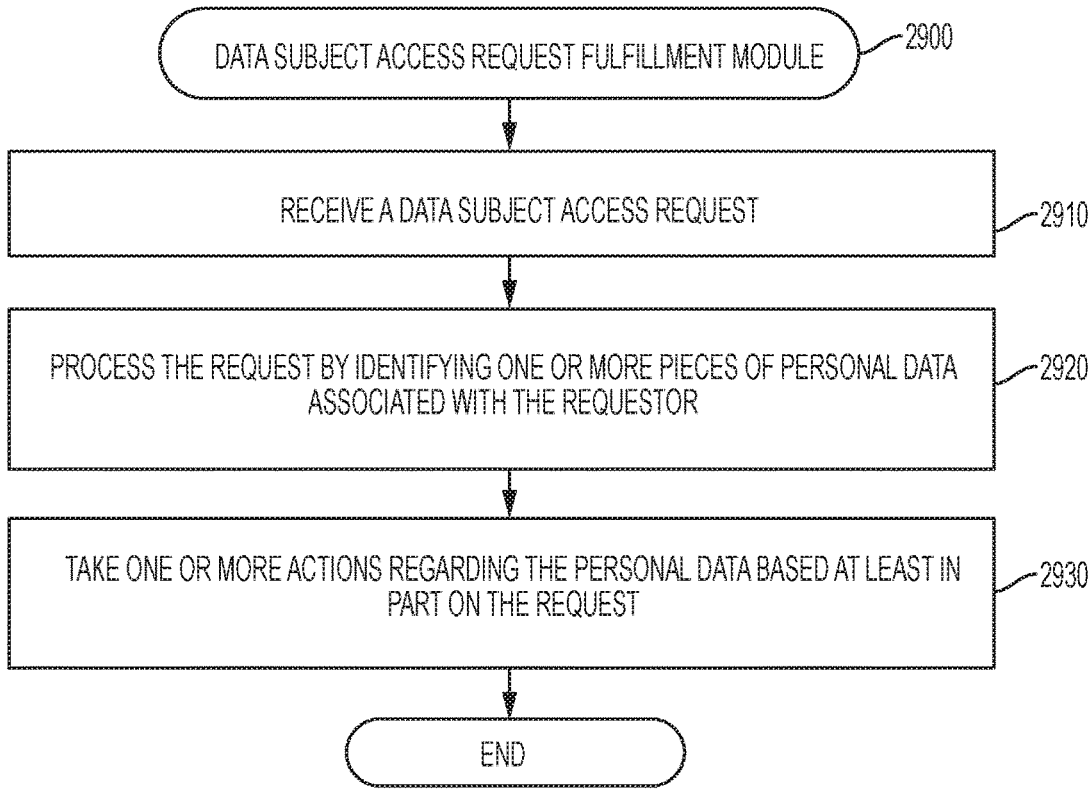
FIG. 29 is a flowchart showing an example of a processes performed by a Data Subject Access Request Fulfillment Module 2100 according to various embodiments.

Turning to FIG. 29, in particular embodiments, a Data Subject Access Request Fulfillment Module 2900 is configured to receive a data subject access request, process the request, and fulfill the request based at least in part on one or more request parameters. In various embodiments, an organization, corporation, etc. may be required to provide information requested by an individual for whom the organization stores personal data within a certain time period (e.g., 30 days). As a particular example, an organization may be required to provide an individual with a listing of, for example: (1) any personal data that the organization is processing for an individual, (2) an explanation of the categories of data being processed and the purpose of such processing; and/or (3) categories of third parties to whom the data may be disclosed.

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, a data subject access request fulfillment system may utilize one or more data model generation and population techniques (e.g., such as any suitable technique described herein) to create a centralized data map with which the system can identify personal data stored, collected, or processed for a particular data subject, a reason for the processing, and any other information related to the processing.

Turning to FIG. 21, when executing the Data Subject Access Request Module 2100, the system begins, at Step 2110, by receiving a data subject access request. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. In still other embodiments, the request may include a request based on any suitable right afforded to a data subject, such as those discussed above.

Continuing to Step 2120, the system is configured to process the request by identifying and retrieving one or more pieces of personal data associated with the requestor that are being processed by the system. For example, in various embodiments, the system is configured to identify any personal data stored in any database, server, or other data repository associated with a particular organization. In various embodiments, the system is configured to use one or more data models, such as those described above, to identify this personal data and suitable related information (e.g., where the personal data is stored, who has access to the personal data, etc.). In various embodiments, the system is configured to use intelligent identity scanning (e.g., as described above) to identify the requestor's personal data and related information that is to be used to fulfill the request.

In still other embodiments, the system is configured to use one or more machine learning techniques to identify such personal data. For example, the system may identify particular stored personal data based on, for example, a country in which a website that the data subject request was submitted is based, or any other suitable information.

In particular embodiments, the system is configured to scan and/or search one or more existing data models (e.g., one or more current data models) in response to receiving the request in order to identify the one or more pieces of personal data associated with the requestor. The system may, for example, identify, based on one or more data inventories (e.g., one or more inventory attributes) a plurality of storage locations that store personal data associated with the requestor. In other embodiments, the system may be configured to generate a data model or perform one or more scanning techniques in response to receiving the request (e.g., in order to automatically fulfill the request).

Returning to Step 2130, the system is configured to take one or more actions based at least in part on the request. In some embodiments, the system is configured to take one or more actions for which the request was submitted (e.g., display the personal data, delete the personal data, correct the personal data, etc.). In particular embodiments, the system is configured to take the one or more actions substantially automatically. In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Data Subject Access Request User Experience

Figure 31:
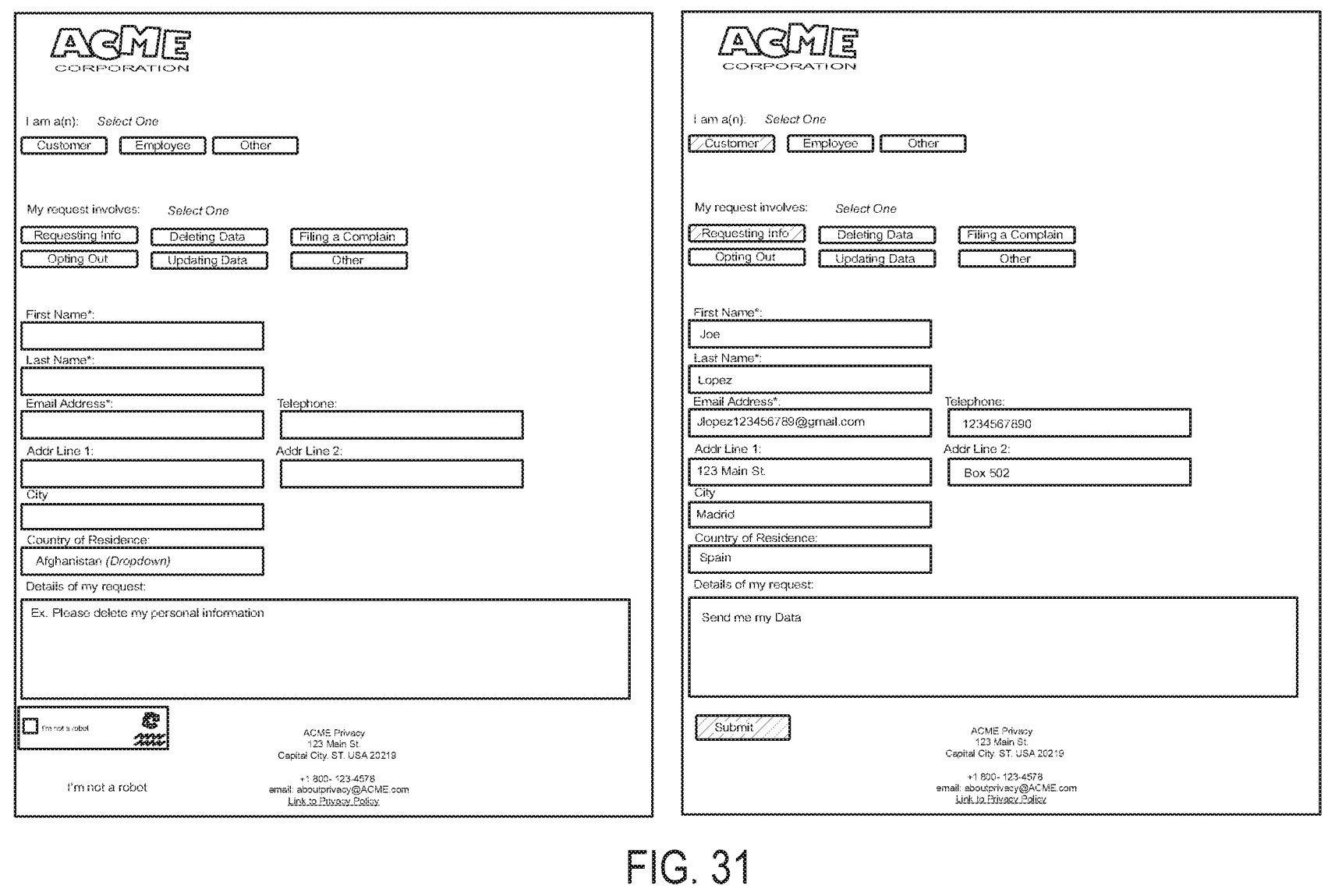

FIGS. 30-31 depict exemplary screen displays that a user may view when submitting a data subject access request. As shown in FIG. 30, a website 30000 associated with a particular organization may include a user-selectable indicia 3005 for submitting a privacy-related request. A user desiring to make such a request may select the indicia 3005 in order to initiate the data subject access request process.

FIG. 31 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; and/or (8) one or more details associated with the request.

As discussed in more detail above, a data subject may submit a subject access request, for example, to request a listing of any personal information that a particular organization is currently storing regarding the data subject, to request that the personal data be deleted, to opt out of allowing the organization to process the personal data, etc.

Alternative Embodiment

In particular embodiments, a data modeling or other system described herein may include one or more features in addition to those described. Various such alternative embodiments are described below.

Processing Activity and Data Asset Assessment Risk Flagging

In particular embodiments, the questionnaire template generation system and assessment system described herein may incorporate one or more risk flagging systems. FIGS. 32-35 depict exemplary user interfaces that include risk flagging of particular questions within a processing activity assessment. As may be understood from these figures, a user may select a flag risk indicia to provide input related to a description of risks and mitigation of a risk posed by one or more inventory attributes associated with the question. As shown in these figures, the system may be configured to substantially automatically assign a risk to a particular response to a question in a questionnaire. In various embodiments, the assigned risk is determined based at least in part on the template from which the assessment was generated.

In particular embodiments, the system may utilize the risk level assigned to particular questionnaire responses as part of a risk analysis of a particular processing activity or data asset. Various techniques for assessing the risk of various privacy campaigns are described in U.S. patent application Ser. No. 15/256,419, filed Sep. 2, 2016, entitled "Data processing systems and methods for operationalizing privacy compliance and assessing the risk of various respective privacy campaigns," which is hereby incorporated herein in its entirety.

CONCLUSION

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method of populating a data inventory with one or more data inventory attribute values, the method comprising:
    generating, by one or more processors, the data inventory for one or more data assets used in the collection or storage of personal data;
    storing, by the one or more processors, the data inventory in computer memory;
    modifying, by the one or more processors, the data inventory to include one or more data fields that each define a respective data inventory attribute of a plurality of data inventory attributes;
    determining, by the one or more processors, which of the one or more data fields of the data inventory are unpopulated data fields;
    determining, by the one or more processors, a respective data inventory attribute value for one or more of the unpopulated data fields, wherein determining the respective data inventory attribute value for the one or more of the unpopulated data fields comprises:
        requesting, by the one or more processors via an application programming interface to an application, data associated with the respective data inventory attribute value for the one or more of the unpopulated data fields,
        receiving, by the one or more processors from the application, the data associated with the respective data inventory attribute value for the one or more of the unpopulated data fields, and
        determining, by the one or more processors based at least in part on the data associated with the respective data inventory attribute value for the one or more of the unpopulated data fields, the respective data inventory attribute value for the one or more of the unpopulated data fields;
    in response to determining the respective data inventory attribute value for the one or more of the unpopulated data fields, modifying each of the one or more unpopulated data fields to include the respective data inventory attribute value; and
    storing the modified data inventory in the computer memory.

2. The computer-implemented data processing method of claim 1, wherein the application programming interface to the application comprises an interface to a third-party information technology system.

3. The computer-implemented data processing method of claim 1, wherein the application programming interface to the application comprises an interface to an application executing on a remote computing device.

4. The computer-implemented data processing method of claim 1 wherein the application programming interface to the application comprises an interface to a server storing data asset assessment information associated with the one or more data assets.

5. The computer-implemented data processing method of claim 4, wherein receiving the data associated with the respective data inventory attribute value for the one or more of the unpopulated data fields comprises receiving a subset of the data asset assessment information associated with the one or more data assets from the server.

6. The computer-implemented data processing method of claim 1, wherein the application programming interface to the application comprises an interface to a data repository,
wherein the method further comprises analyzing the respective data inventory attribute value for the one or more of the unpopulated data fields and correlating metadata for the data repository with the respective data inventory attribute value for the one or more of the unpopulated data fields.

7. The computer-implemented data processing method of claim 1, wherein the method further comprises using one or more machine learning techniques to categorize the data inventory attribute associated with the respective data inventory attribute value for the one or more of the unpopulated data fields.

8. The computer-implemented data processing method of claim 7, wherein the method further comprises requesting user feedback regarding the categorization of the data inventory attribute associated with the respective data inventory attribute value for the one or more of the unpopulated data fields.

9. The computer-implemented data processing method of claim 8, wherein the method further comprises assigning a confidence score to the respective data inventory attribute value for the one or more of the unpopulated data fields based, at least in part, on the categorization of the data inventory attribute associated with the respective data inventory attribute value for the one or more of the unpopulated data fields.

10. The computer-implemented data processing method of claim 1, wherein the method further comprises providing a software application for installation on a computing device that is networked with one or more data repositories,
wherein the application programming interface to the application comprises an interface to the software application for installation on the computing device that is networked with the one or more data repositories.

11. A data processing system for data inventory population comprising:
one or more processors;
computer memory; and
a non-transitory computer-readable medium storing computer-executable instructions that, when executed by the one or more processors, cause the one or more processors to perform operations comprising:
generating a data inventory for one or more data assets used in the collection or storage of personal data;
storing the data inventory in the computer memory;
modifying the data inventory to include one or more data fields that each define a respective data inventory attribute of a plurality of data inventory attributes;
determining which of the one or more data fields of the data inventory are unpopulated data fields;
determining a respective data inventory attribute value for one or more of the unpopulated data fields, wherein determining the respective data inventory attribute value for the one or more of the unpopulated data fields comprises:
requesting, via an application programming interface to an application, data associated with the respective data inventory attribute value for the one or more of the unpopulated data fields,
receiving, from the application, the data associated with the respective data inventory attribute value for the one or more of the unpopulated data fields, and
determining, based at least in part on the data associated with the respective data inventory attribute value for the one or more of the unpopulated data fields, the respective data inventory attribute value for the one or more of the unpopulated data fields;
in response to determining the respective data inventory attribute value for the one or more of the unpopulated data fields, modifying each of the one or more unpopulated data fields to include the respective data inventory attribute value; and
storing the modified data inventory in the computer memory.

12. The data processing system of claim 11, wherein the non-transitory computer-readable medium further stores computer-executable instructions that, when executed by the one or more processors, cause the one or more processors to perform operations comprising:
categorizing a data inventory attribute associated with the respective data inventory attribute value for the one or more of the unpopulated data fields based at least in part on a confidence score.

13. The data processing system of claim 11, wherein the one or more data assets used in the collection or storage of personal data comprises a plurality of interrelated data assets comprising one or more storage assets, one or more collection assets, and one or more transfer assets.

14. The data processing system of claim 11, wherein the data associated with the respective data inventory attribute value for the one or more of the unpopulated data fields comprises schema details associated with a data inventory attribute associated with the respective data inventory attribute value for the one or more of the unpopulated data fields.

15. The data processing system of claim 14, wherein the schema details comprise one or more schema details selected from a group consisting of:
an asset ID;
a Schema ID; and
a connection string.

16. The data processing system of claim 11, wherein the application programming interface to the application comprises an interface to a data repository, wherein the non-transitory computer-readable medium further stores computer-executable instructions that, when executed by the one or more processors, cause the one or more processors to perform operations comprising:
analyzing the data repository to determine whether the data repository is part of an existing data model of data assets; and
determining the respective data inventory attribute value for the one or more of the unpopulated data fields further based at least in part on whether the data repository is part of the existing data model of data assets.

17. The data processing system of claim 11, wherein the non-transitory computer-readable medium further stores computer-executable instructions that, when executed by the one or more processors, cause the one or more processors to perform operations comprising:
identifying a primary data asset from among the one or more data assets; and
determining the respective data inventory attribute value for the one or more of the unpopulated data fields further based at least in part on data associated with the primary data asset.

18. The data processing system of claim 11, wherein the non-transitory computer-readable medium further stores computer-executable instructions that, when executed by the one or more processors, cause the one or more processors to perform operations comprising:
determining a categorization for a data inventory attribute associated with the respective data inventory attribute value for the one or more of the unpopulated data fields based at least in part on a confidence score associated with the respective data inventory attribute value for the one or more of the unpopulated data fields.

19. The data processing system of claim 18, wherein the non-transitory computer-readable medium further stores computer-executable instructions that, when executed by the one or more processors, cause the one or more processors to perform operations comprising:
receiving input from a user confirming or denying the categorization for the data inventory attribute associated with the respective data inventory attribute value for the one or more of the unpopulated data fields; and
in response to receiving the input form the user, modifying the confidence score associated with the respective data inventory attribute value for the one or more of the unpopulated data fields.

20. The data processing system of claim 11, wherein the respective data inventory attribute value for the one or more of the unpopulated data fields is associated with a data inventory attribute selected from a group consisting of:
a storage asset inventory attribute;
a collection asset inventory attribute; and
a transfer asset inventory attribute.

* * * * *